United States Patent [19]

Givler

[11] Patent Number: 5,361,484
[45] Date of Patent: Nov. 8, 1994

[54] METHOD OF GUIDING A RIVET AROUND A CURVE

[75] Inventor: Gregory C. Givler, Issaquah, Wash.

[73] Assignee: The Boeing Company, Seattle, Wash.

[21] Appl. No.: 811,511

[22] Filed: Dec. 20, 1991

Related U.S. Application Data

[62] Division of Ser. No. 632,445, Dec. 21, 1990, Pat. No. 5,231,747.

[51] Int. Cl.⁵ ............................................. B23P 19/04
[52] U.S. Cl. .................................................... 29/525.2
[58] Field of Search ............. 29/809, 813, 787, 525.2; 198/380, 389, 397; 221/252, 258; 222/361; 227/112, 114, 116

[56] References Cited

U.S. PATENT DOCUMENTS

| | | | |
|---|---|---|---|
| 3,317,702 | 5/1967 | Mann | 198/389 X |
| 4,074,425 | 2/1978 | Hashimoto et al. | 29/813 |
| 4,182,030 | 1/1980 | Mullins | 198/389 X |
| 4,309,787 | 1/1982 | Lapohn | 29/787 X |

FOREIGN PATENT DOCUMENTS

383565  5/1973  U.S.S.R. ............................ 29/813

*Primary Examiner*—Peter Dungba Vo
*Attorney, Agent, or Firm*—J. Michael Neary

[57] ABSTRACT

A method of guiding rivets around a small radius curve includes sending the rivet through a rivet supply line into a rivet brake and staging tube where it is held until the rivet hole is drilled. The rivet is then blown into a curved, arched slot in a rivet guide shoe that fits into a recess in a movable shuttle body. The shuttle body is first moved to position a drill cavity in line with a drill which drills the hole. The shuttle is then moved to align the curved, arched slot in the rivet guide shoe with the rivet brake and staging tube to receive the rivet and convey it around the curved slot and into a rivet guide tube fitted into the far end of the slot. The rivet guide tube has an axial passage equal in diameter to the diameter of the curved, arched slot, so the rivet encounters no edges or other discontinuities in the transition from the slot to the guide tube. The rivet is guided into the guide tube by an ear on the upper end of the guide tube. The ear fits into the slot to form a smooth transition between the open bottom side of the slot and the cylindrical guide tube.

13 Claims, 31 Drawing Sheets

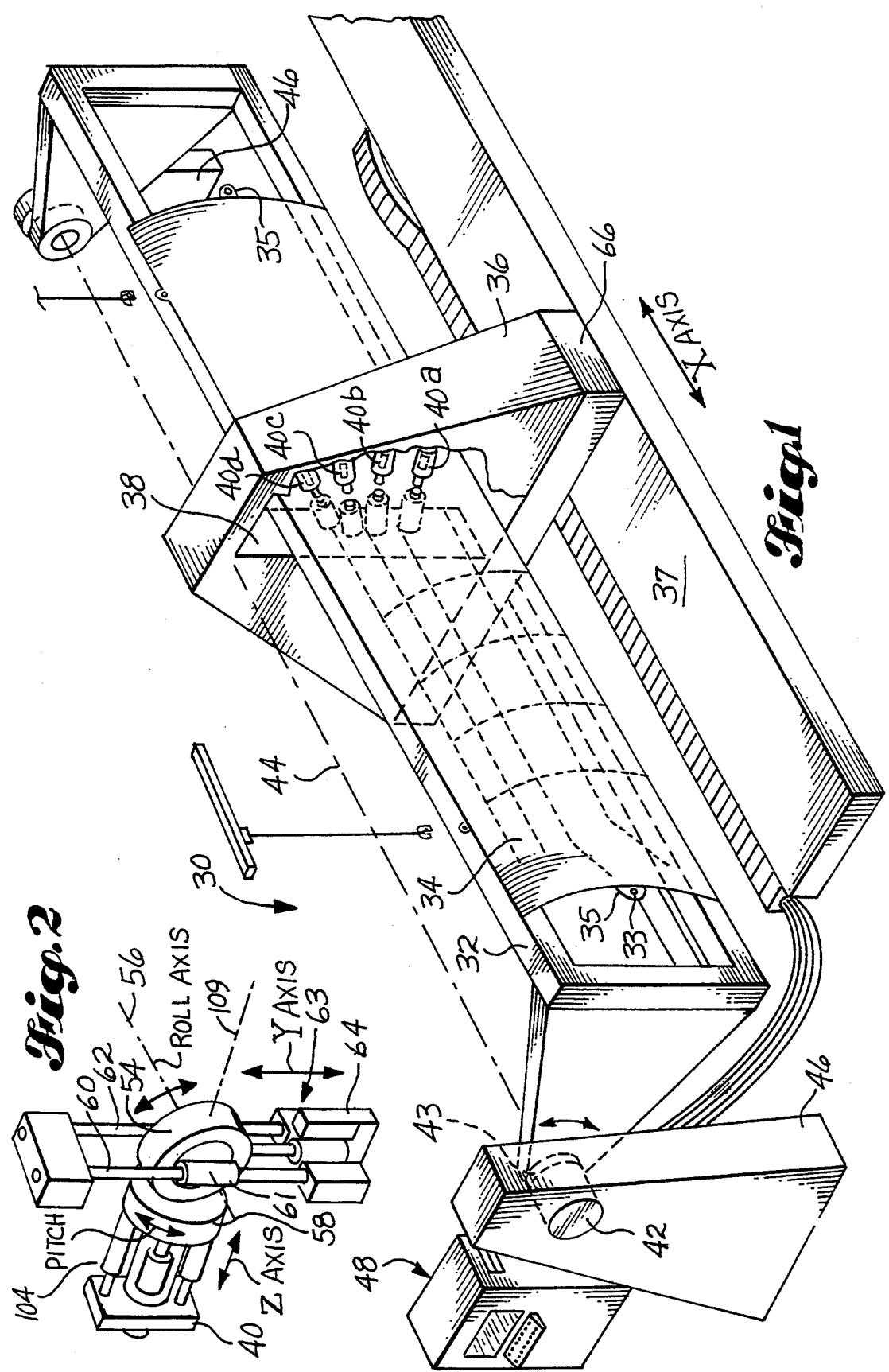

RIVET BLOW FEEDER

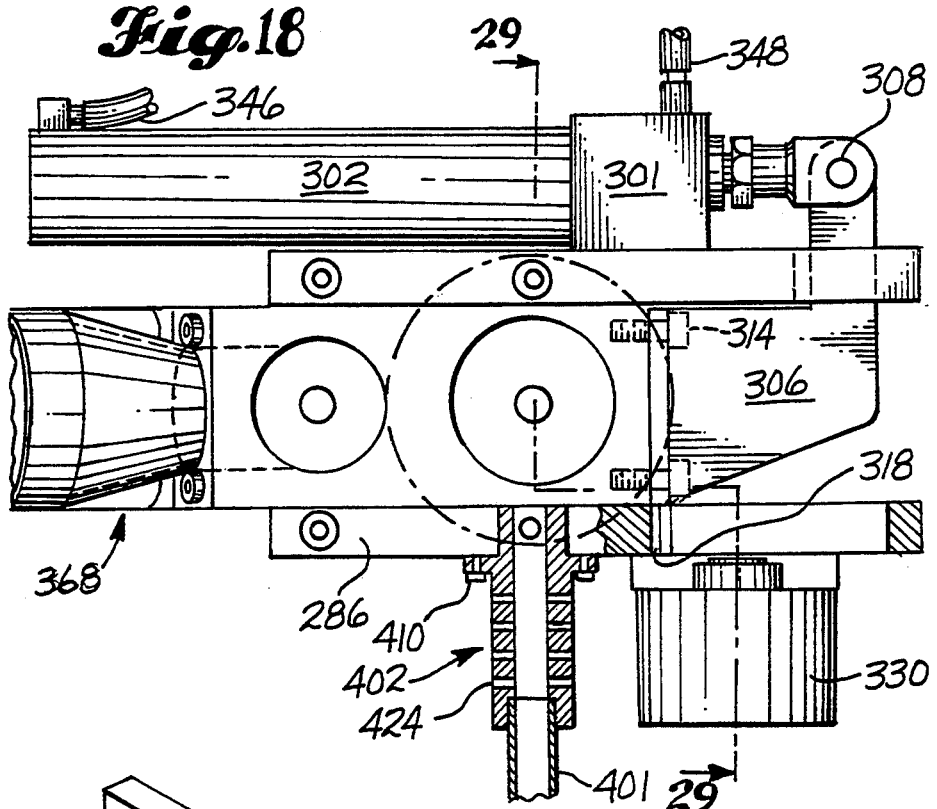
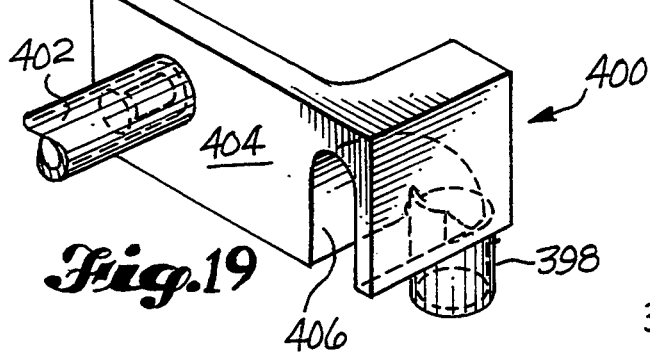
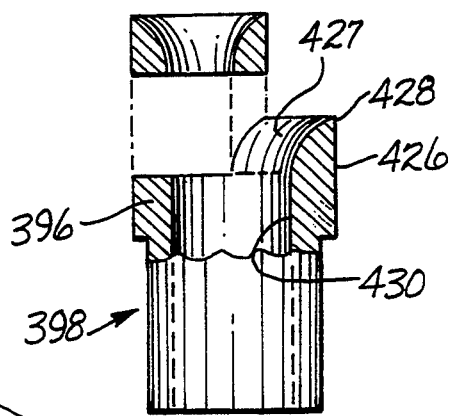
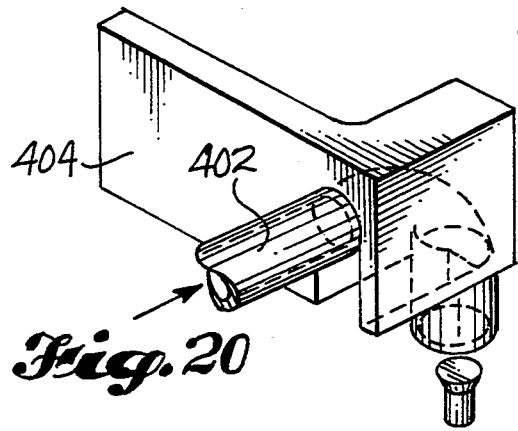

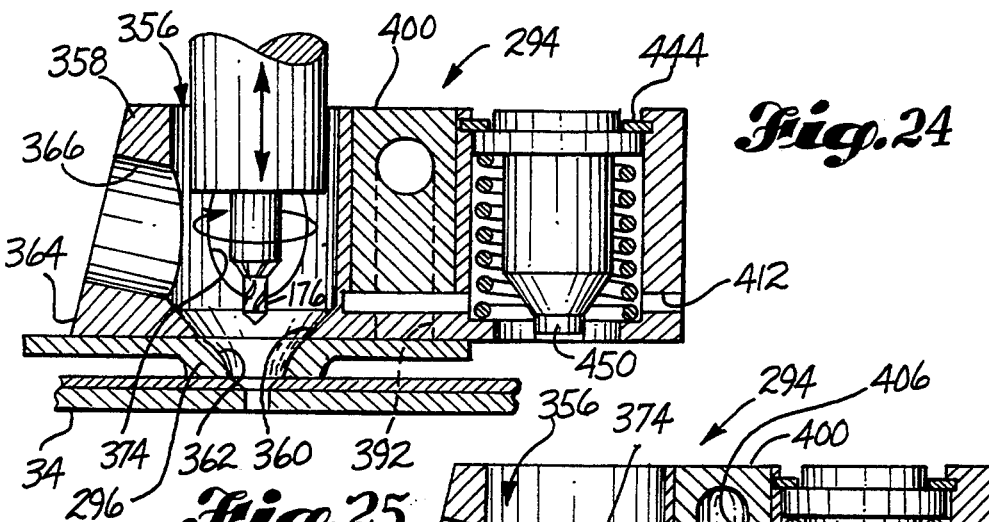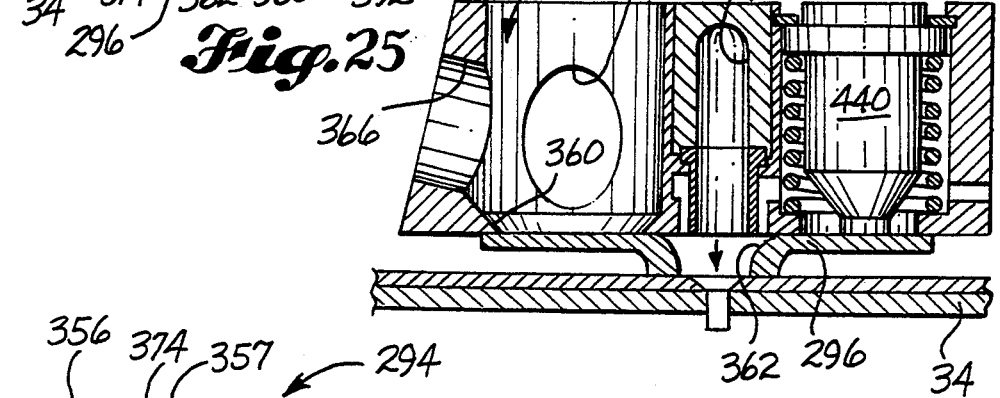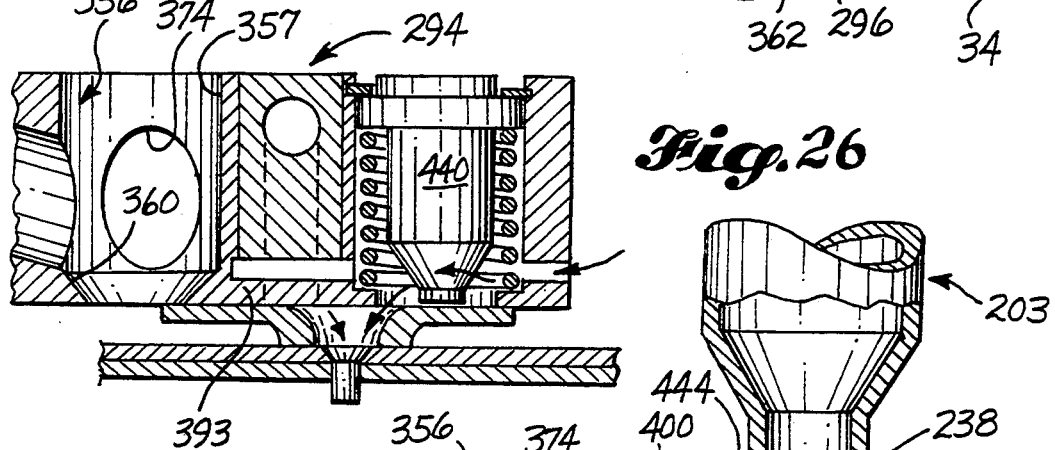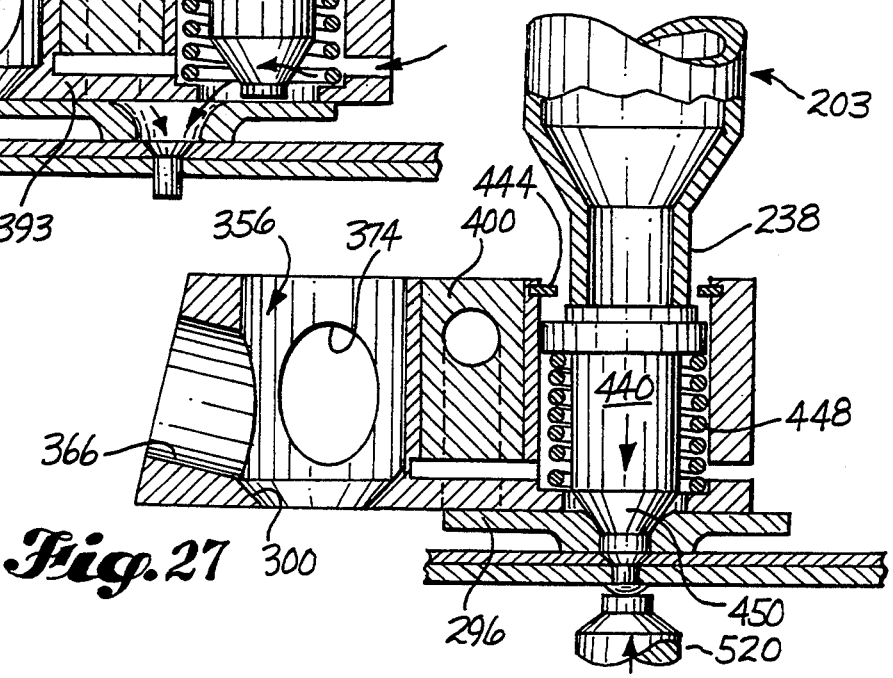

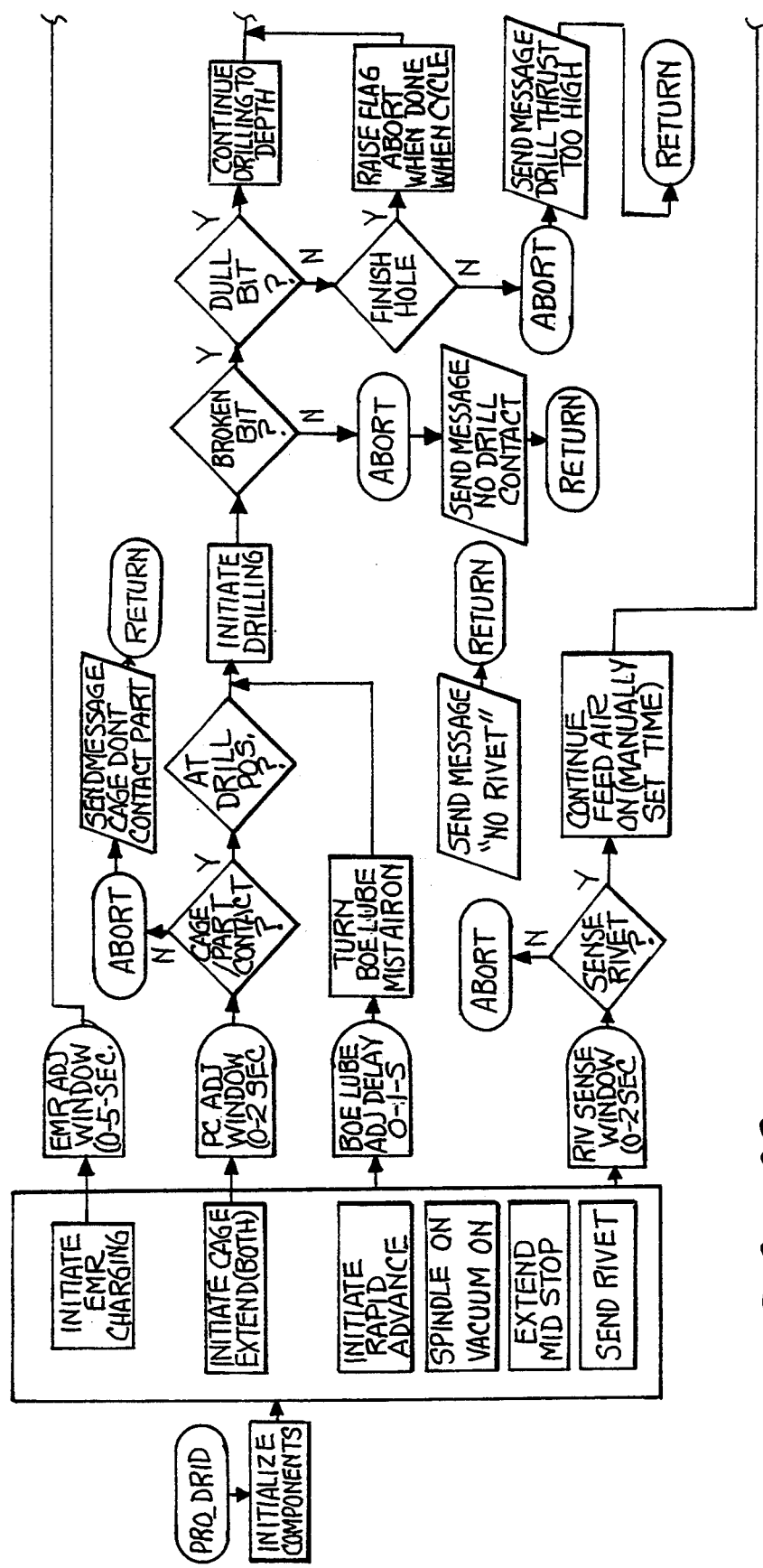

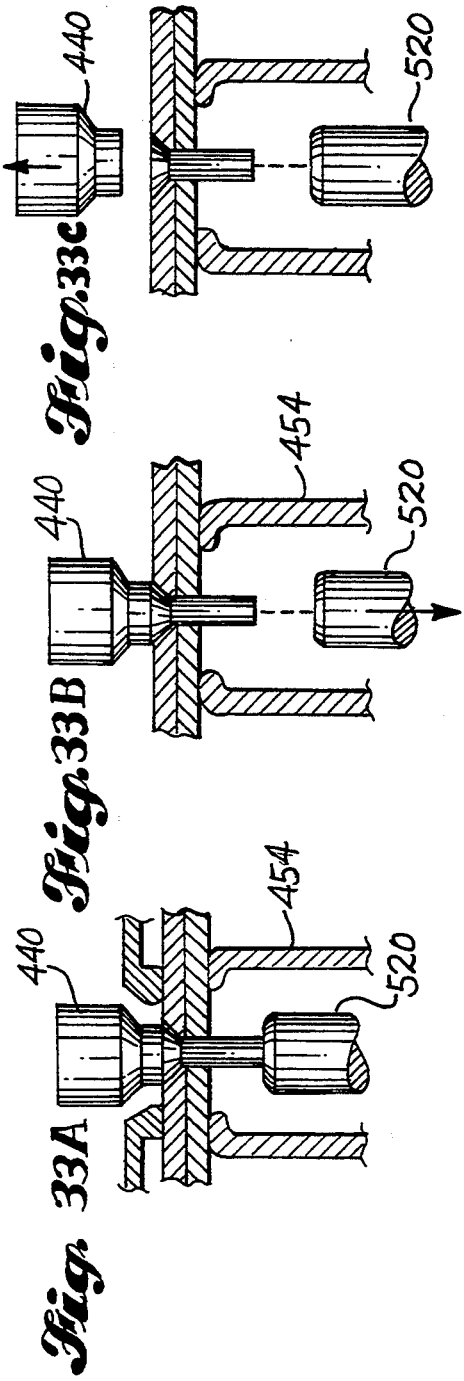
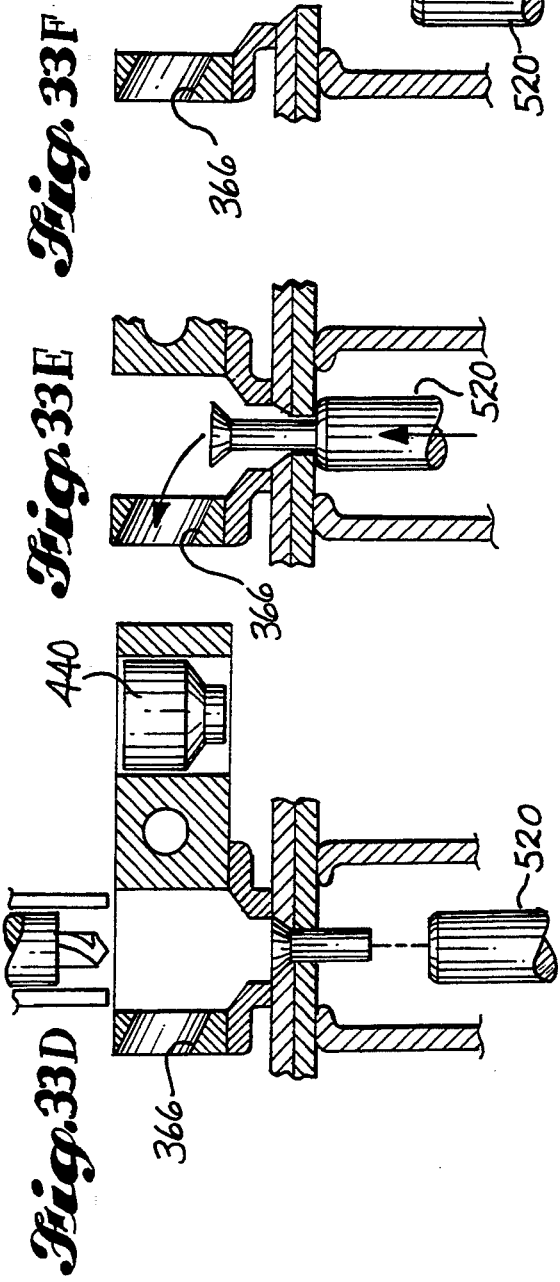

METHOD OF GUIDING A RIVET AROUND A CURVE

BACKGROUND OF THE INVENTION

This is a division of U.S. application Ser. No. 07/632,445 filed on Dec. 21, 1990 and entitled "Drill-/Rivet Machine", now U.S. Pat. No. 5,231,747.

This invention relates to a machine and its constituent components for drilling a hole in a workpiece, inserting a rivet in the hole, and upsetting the rivet, all without moving the lateral position of the machine or the workpiece, and to an assembly for supporting and positioning a plurality of said machines for working simultaneously on the workpiece.

Riveting machines are well known and in wide use throughout the aerospace industry as well as other industries. Rivets provide the best known technique for fastening an aerodynamic skin to a frame to provide a strong aerodynamically smooth surface. Rivets are also used in the interior structure of the aircraft since they are the lightest and least expensive method of fastening structural components together. However, inserting and upsetting rivets is a labor intensive process and for the most part is done manually, one rivet at a time. The work is extremely tedious and yet at the same time requires a highly skilled operator to produce quality rivets consistently, and highly skilled quality control inspectors to insure that all of the rivets meet the specifications of flushness, interference and button formation. These personnel costs substantially increase the cost of a riveting operation and tend to offset the inherent low cost of the rivet itself. The process appears susceptible to automation, and attempts have been made for many years to obtain the benefits of increased capacity and quality while reducing cost and rework, but attempts to develop automated riveting installations have been hampered by a multitude of practical problems which interfere with the smooth operation of an automated system, resulting in a requirement for continual manual intervention by skilled operators.

A riveting operation is often so noisy that, in a factory where large scale riveting is being done, hearing protection is mandatory. Much effort has gone into quieting the riveting process to protect employees from hearing damage, but the work place remains noisy and hearing protection remains mandatory. Hydraulic rivet squeezers are quiet, but they require massive mounting structures to withstand the reaction forces exerted by the hydraulic squeezer. The cost and size of these mounting structures prohibit their use in many applications.

The force to upset a rivet is typically on the order of five to fifty thousand pounds. This force must be exerted from both sides of the rivet, either by a reaction force through a large C-frame, a reaction mass, or an active force generator on both sides of the rivet. Hand-held pneumatic riveters are one simple solution but require two skilled operators, are not always repeatable, are noisy, and have been linked with carpel tunnel syndrome. The ideal riveter would be an electromagnetic, one or two blow riveter acting virtually simultaneously on both sides of the rivet.

A typical automated drill/rivet machine has a drill which will drill a hole into the workpiece and then shift to one side so that the rivet may be inserted. The rivet insertion mechanism then shifts to one side so the rivet may be upset by a rivet die acted on by a driver. The shifting of the drilling and insertion mechanisms is time consuming and requires extremely precise positioning mechanisms in order to maintain the necessary alignment of the drill, the rivet inserter, and the rivet die and driver. A preferable technique would be to perform all three functions from the same lateral position of the device so that no indexing of the major components is required. Some lateral movement will still be necessary to feed the rivet into the hole and position the die over the rivet so that the rivet can be upset. The moving structure for this lateral shifting should be made as light as possible so that it can be indexed from position to position quickly and with great precision.

The drill chips that are produced by the drilling operation are potentially troublesome because they can interfere with movement of the die shuttle mechanism and, if they get between the workpiece and the pressure foot which clamps the workpiece in place, the pressure foot will embed the chips into the workpiece and mar it and could affect drill or countersink depth. The conventional technique for disposing of chips is to provide a nozzle to blow the chips away from the work site or a suction hose to suck the chips off of the work piece after they have fallen onto it. These techniques reduce the problem by removing the majority of the drill chips, however there are always some chips that are not removed and these can cause problems and must be periodically removed from the work site by an operator with an air hose. A drill rivet machine would be much more reliable and produce a product with much fewer defects if a reliable chip removing system were available to remove all of the drill chips before they can even come into contact with the workpiece so that the workpiece and the work site are kept clean and free of drill chips.

The drill in the drilling operation must be periodically lubricated to preserve the life of the drill, to maintain hole quality, and to speed the drilling operation. However, in many applications the lubricant is considered a contaminant to the workpiece because it adversely affects the coatings on the workpiece or because of subsequent operations which must be free of lubricant on the surface. The best available technique for lubricating the drill without contaminating the workpiece is a lubricant spray mist system which blows a mist onto the drill and lubricates only the drill and not the workpiece. However, the mist tends to settle to some extent on the workpiece and therefore the mist lubrication system is not one hundred percent effective in maintaining the cleanliness of the workpiece. A lubrication system for a high speed drill rivet device should lubricate the drill before every drilling operation and should reliably protect the workpiece from contamination by the lubricant.

A drill rivet device must accomplish several operations and do so quickly and precisely. It would be desirable during drilling, rivet inserting, and rivet upsetting that the work-piece be clamped securely in a single unmoving position so that the axis of the machine remains aligned with the position at which the rivet is to be placed, despite reactive flexing of the holding fixture. The drill and the rivet upsetting device should be mounted for precise axial movement while the workpiece is held in a clamped position, but then must be mounted so that it can be retracted and the workpiece unclamped after the rivet is placed to enable the workpiece or the machine to be moved to the next position where the next rivet is to be placed. Ideally, all of these functions should be accomplished in a single small, light weight mechanism that would make it possible for the drill rivet machine to occupy only a small volume so that it does not interfere with other adjacent mechanisms.

Within the frame which guides the drill and the rivet upsetting mechanism, the axial movement of the drill and the riveter must be guided, cushioned, damped and positioned so that it accomplishes the functions for which it is intended at high speed and low impact. In an electromagnetic riveter, the impact created when the coil is energized should be absorbed in a recoil cushioning system which enables the machine to take advantage of the possibilities for low reaction force in the electromagnetic riveter. However, the translations involved must be held to a minimum to insure that no wasted motion occurs so the machine can operate at its highest possible cycle rate.

One of the factors that has delayed the development of automated riveting operations in the past has been the large mass of the equipment that must be moved and precisely indexed to the location at which a rivet is to be placed. Improvements have been made but the lateral movement of mechanisms remains a problem and causes the machine cycle time to be lower than it potentially could be. Exacerbating the problem is the multitude of functions which must be performed and the substantial precision with which these functions must occur in precise alignment over the rivet placement location. This precision often degrades as the machine ages and the guideways for the shuttle mechanisms wear.

One of the functions in an automatic riveting machine that must operate reliably is the rivet feeding and insertion device. In some applications, the rivet is fed to the machine from a rivet blow feeder through a rivet feed tube, in which the rivet can attain substantial velocity in order to sustain fast machine cycle times. If the rivet were to impact the workpiece at its maximum velocity in the feed tube, it could damage the work- piece in the marginal regions around the hole in which the rivet is to be inserted and could also damage the rivet itself. These dents and nicks in the rivet and the workpiece regions around the hole can influence the sealing of the rivet in the hole and also potentially prevent the rivet from entering the hole at all. Thus it is necessary to insure in an automated riveting operation that the rivet approaches the workpiece at a velocity that is fast enough to carry the rivet into the hole but not fast enough to damage the rivet or the workpiece.

Rivet attitude as it approaches the hole should be controlled so that it enters the hole without jamming against the edges of the hole or otherwise jamming in the feeding operation. In conventional rivet feeding systems, the rivet is held in a rivet gripper and is inserted in the hole. This system works well most of the time, although occasionally the rivet gets cocked in the hole and the rivet dies smash it in the cocked position, creating a difficult repair job. However, it does require a finite time for the rivet gripper to place the rivet in the hole, and is just one more thing to wear out of tolerance. A preferable system would have no moving parts for rivet insertion, and would be virtually instantaneous in the insertion of the rivet in the hole, for minimum machine cycle time.

The rivet, once seated in the hole, must remain in position until it is upset. Some rivet operations are performed in an upside-down orientation (that is, with the headed end of the rivet facing downward) and if the rivet is not held in position it could fall out before it is upset, or it could slide out of position and jam the feed mechanism or the rivet die shuttle. The holding system must function from the time the rivet is inserted until the time the rivet is upset so that the rivet is positively held in the correct position at all times.

The rivet feeding tube usually enters the machine from the side because the rivet die driver and drill are in an axial position and could interfere with the path of the rivet coming axially into the hole. Thus the rivet enters laterally into the machine and then follows a curved path to straightened its line of travel and align it with the hole, which is on the machine axis. The change in direction of the rivet is a tricky operation because several different types and sizes of rivets may be fed in a automatic riveting operation and although the rivet can be softer material such as aluminum it still can cause considerable wear in a curved feed path. Moreover, the tighter the bend that the rivet must execute in going from the lateral approach to the axial path of travel to enter the rivet hole, the more likely it is that the rivet will jam in the bend.

When the rivet exits the bend, it is in an unstable condition and must be straightened and stabilized so that when the rivet leaves the end of the feed structure and moves into the hole, it will travel in a stable condition and does not become canted, so that it enters the hole straight without becoming jammed diagonally in the hole.

A rivet is precisely sized for the thickness of the workpiece which it is to hold together and the stress which it is to carry. The impact energy of the rivet driver is designed to completely form the button end on the rivet and cause the desired degree of interference between the rivet shank and the hole, and between the rivet head and the surface of the workpiece, in the case of Briles rivets. Any substantial deviation from the design parameters will result in an improperly formed rivet or a damaged workpiece. For example, a rivet which is too long will have more material to be strained than the driver has energy to strain and therefore the rivet will be incompletely upset, resulting in a insufficiently formed button on the end of the rivet and inadequate degree of interference between the shank and the hole, and between the head and the surface of the workpiece. Similarly, a rivet which is too short will have an insufficient amount of rivet material to absorb the driver impact and therefore the rivet tail will be flattened and the energy in the driver will have to be absorbed by the workpiece, resulting in a deformed or a "dimpled" workpiece, or a rivet head pushed off of its countersink. These defects require rework which is expensive and slows the production output of the plant. It would be desirable to design a system for measuring the length of the rivet before it is upset to insure that these defects do not occur.

In the event that a rivet is detected that is too long or too short there should be some method for removing the missized rivet from the hole and disposing of it so that a properly sized rivet can be inserted. This operation should be done quickly and reliably so that the efficiency to be gained by an automatic riveting operation is not lost by these recovery operations. Ideally, the rivet measuring technique and the rivet removing and disposing technique can be incorporated in mechanisms which are part of the automatic drill/rivet device without adding undue complication or increased cost to the device.

An electromagnetic actuator for an electromagnetic riveter has a high amperage coil which develops considerable heat from electrical resistance over a period of use. The heat raises the electrical resistance of the coil and therefore the voltage must be raised, thereby reducing the efficiency of the operation. More importantly however the temperature of the coil must be held within certain limits to prevent the electrical insulation and other materials from reaching breakdown temperatures. The conventional methods for coil cooling employ an airflow through and around the coil to extract the heat and carry it away in the air stream. However, the direct cooling of the coil in this manner requires that the air be dry and of high purity. Water vapor in the air striking the hot coil can cause corrosion of the coil, and impurities in the air can collect in and around the coil to cause bridging of the coil windings. The air treatment system is reliable and available, but it is expensive, requires periodic maintenance and is bulky. An improved coil cooling method for an electromagnetic actuator, that does not require the expensive drying and filtering equipment, would be a great benefit to the operators of electromagnetic actuators in high power equipment such as an electromagnetic riveting machine.

The rivet forming technique for slug rivets includes striking the rivet on both ends simultaneously so that the rivet shank is deformed to provide shank/hole interference, and the rivet head is deformed to provide a properly formed button at each end of the rivet. This provides the optimum rivet strength. Headed rivets present a slightly more complicated problem. Headed rivets already have a head formed at one end of the rivet, normally tapered so that it fits into a countersunk hole in the surface of the workpiece. In order to provide the proper holding effect, the rivet must be installed in such a way as to insure that the head will engage the work-piece countersink with sufficient interference or pressure when the riveting operation is completed. With the old fashioned pneumatic riveting machines, which deliver multiple blows against the rivet, it was possible to determine by simple inspection when the rivet had been sufficiently deformed because the incremental amount of deformation created in the rivet by each blow is so small that a skilled operator could inspect the rivet and see that the operation was complete for that rivet. Additionally, he could tell by the sound and feel of the machine when the rivet was deformed sufficiently to create an acceptable rivet. However, the situation for electromagnetic riveters is more complicated because the entire rivet upset operation must be accomplished in one or two blows, so the blows must be timed and powered to accomplish the entire rivet upset operation completely. The prior art has always delivered the identical blow to both sides of the rivet because of the apparently logical assumption that identical blows will prevent asymmetric effects on the rivet and prevent damage to the workpiece. However, we have discovered that the functions to be performed at each end of the rivet are considerably different from each other and therefore the blow to be delivered to the rivet should be tailored to the function which it is to perform. Since these functions are different for different kinds of rivets, the parameters of the blow to be delivered need to be adjusted in each case.

A riveting machine which drills holes in a workpiece, inserts a rivet and upsets the rivet, all automatically and at high speed, should be under precise automatic control and provide feedback to the controller that every operation has been completed before the next operation can be started so that the danger of jamming or damaging the machine by clashing of subcomponents is minimized. This implies that the machine be provided with sensors which indicate when a operation has been completed and with automated control rules which cause the machine to automatically halt when a failure has occurred to prevent massive damage to the machine or workpiece. The suite of sensors should be as simple and reliable as possible to minimize the cost and maintenance requirements, and should provide all the sensing operations necessary to generate the feedback data needed for the machine to function reliably. Finally, when a failure occurs, the sensor and control system should provide information to the operator or the maintenance personnel as to the cause of the failure was so that corrective action can be taken to identify the problem, clear the blockage or make any repairs that are necessary.

The bearing support at the lower end of the drill and the EMR driver in a concentric arrangement is a desirable function because without it the drill tends to wander and produce a misplaced or misshapen hole, and because the driver should produce its force pulse at exactly the right location to minimize the chances of damaging the machine or the workpiece. The prior art techniques for accomplishing these functions include special drills with bearing surfaces, but that is an expensive approach that requires the stocking of special parts whose unavailability would make the machine unusable. Moreover, they also typically require the stacking of tolerances and clearances which are additive and can result in excessive play at the free end of the drill or the driver.

The coil of the EMR is electrically insulated from, but in mechanical contact with a transducer of high electrical conductivity. The convention arrangement is to put the coil in contact with the transducer and the transducer in contact with the driver, so that when a burst of current is sent through the coil it will create a rapidly increasing magnetic field which will induce a current in the transducer, which in turn generates an opposing magnetic field and creates a strong repulsive force between the transducer and the coil. The transducer forces the driver against the rivet die to upset the rivet. Arrangements of this type have worked well for numerous years but suffer from the placement of the heavy cable that carries the large amperage current to the coil. Since the coil recoils away from the transducer and the driver along with the recoil mass, a substantial translation of the coil occurs, which means that cable must be capable of withstanding this severe whipping motion. The cable thus must be reinforced and strengthened so that it does not suffer damage from fatigue effects of these continual sharp translations. It would be desirable if the coil could be mounted in such a manner that it experiences a very small translation so that the extra reinforcement in strengthening of the cable would be unnecessary.

Maintenance of an electromagnetic riveter, particularly when it is incorporated in a concentric drill/rivet machine, can require substantial nonproductive time during which the machine is being disassembled, serviced, and then reassembled. It would be of great practical value if the disassembly time could be reduced and the machine designed in modules that could be replaced with new modules when worn, so that the nonproductive time could be reduced or eliminated altogether.

SUMMARY OF THE INVENTION

Accordingly, it is an object of this invention to provide an improved drill/rivet machine with a concentric drill and driver that can operate reliably with high precision and at a high cycle rate to obtain improved production capacity and reduced cost.

It is another object of this invention to provide a chip suction apparatus for preventing contact of the drill chips with the workpiece, and for removing all of the drill chips so the workpiece and equipment are maintained substantially free of drill chips to prevent interference by the chips with the operation of the device, and to prevent embedding of the chips in the workpiece by the pressure foot.

It is still another object of this invention to provide an improved vacuum mist lubrication system for a drill, for blowing mist lubrication on the drill and maintaining the workpiece free of lubricant.

It is a further object of this invention to provide a frame for a drill/rivet machine which allows the workpiece to be securely clamped in the required position while the drill, shuttle and riveter can move freely and precisely to their required positions.

It is yet a further object of the invention is to provide an improved pneumatic recoil cushioning, damping and positioning system that enables the machine to work smoothly, quickly and quietly by holding the translations to the shortest possible and minimizing the recoil forces so that the mechanism can be small, lightweight, nimble and inexpensive.

It is still a further object of this invention to provide an improved rivet insertion device that enables insertion of the rivet into the hole drilled by the machine in a manner that does not cause damage to the rivet nose or to the marginal portions of the workpiece around the hole, and which holds the rivet in the hole in all positions until the riveter upsets the rivet.

A still further object of the invention is to provide an improved method of detecting rivets which are too long or too short before the rivet is upset, and for removing and discarding the outsized rivets so that a correctly sized rivet can be inserted.

A yet further object of the invention is to provide an improved method of cooling an electromagnetic actuator coil which does not require specially filtered or dried air so that ordinary filtered room air can be used and the conventional expensive air treatment system is unnecessary.

A still yet further object of the invention is to provide electrical adjustments to the electromagnetic actuator circuit to adjust the force pulse acting on the two ends of the rivet so that the correct pulse is delivered to each end of the rivet to optimally perform the riveting function at that end.

Still a further object of the invention is to provide an improved sensor suite and a method of operating the drill/rivet machine using feedback from the sensors to insure that the multiple operations of the drill/rivet device can be performed in rapid sequence without damaging the machine or the workpiece in the case of a failure or a jam in the operation.

Yet another still further object of the invention is to provide an improved bearing system for supporting the lower end of the rivet driver and the drill to insure axial alignment and close tolerance concentricity of the drill and the driver.

Another object of the invention is to provide an improved electromagnetic riveter having a coil which experiences a very short translation so that the cable to the coil can be attached to a stationary mount and does not need expensive and bulky special reinforcement to enable it to withstand whipping motions caused by long coil translations of high velocity.

Still another object of the invention is to provide an improved drill/rivet machine that is configured for fast and easy disassembly so that maintenance can be done on the machine with minimal or no time in which the machine is taken out of productive service.

These and other objects of the invention are attained in the preferred embodiments disclosed herein of an assembly having ganged concentric drill/rivet machines disposed on a frame which can move longitudinally with respect to the workpiece, itself held on a movable frame, and wherein the electromagnetic riveters can be moved along the frame so that the spacing between the riveters can be varied. Each of these riveters includes an electromagnetic actuator which is cooled by contact with a finned transducer so that heat is transferred from the coil to the transducer. The transducer fins efficiently transfer heat to an airflow blowing around the transducer and across the fins to provide the heat extraction path for the coil and the transducer. The power supply for the electro-magnetic actuator coil has a time delay so that the riveter on the tail side of the rivet lifts the head of the rivet out of the countersink before the headed side of the rivet is struck, to insure that the force of the riveter is delivered to the rivet and is not absorbed by the workpiece, so the rivet shank is upset to provide proper interference with the hole in the workpiece. Alternatively or additionally, the riveter power supplies have different capacitances so that the current pulse to the electromagnetic actuators powering the drivers on the two sides of the rivet can be adjusted to balance the force on both sides of the rivet despite differences in driver stroke, driver work requirements, driver momentum, and coil/transducer separation, all of which affect the requirements for the force pulse exerted by the driver on the rivet, and through the rivet on the panel, so that sufficient force is delivered to properly deform the rivet without dimpling the workpiece.

DESCRIPTION OF THE DRAWINGS

The invention and its many attendant objects and advantages will become more clear upon reading the following description of the preferred embodiment in conjunction with the following drawings, wherein:

FIG. 1 is an isometric view of a positioner for holding and positioning large aircraft body panels for drilling and riveting by ganged drill/rivet machines;

FIG. 2 is an isometric view of a motive apparatus for moving and orienting the end effectors on the carrier of the positioner shown in FIG. 1;

FIG. 18 is a plan view of the shuttle shown in FIG. 15 with the die cavity aligned with the axis of the machine;

FIG. 19 is a perspective view of the rivet guide shoe in the shuttle, showing the rivet guide chute offset from the rivet brake and staging tube in the shuttle, with a rivet held in a rivet staging tube in preparation for feeding into the rivet guide chute;

FIG. 20 is a figure similar to FIG. 19, but with the rivet staging tube aligned with the rivet guide chute and showing the rivet having passed through the tube and the chute, and jumping the gap toward the workpiece;

FIG. 21 is an elevation, partly in section, of the rivet guide tube shown in FIG. 15, and illustrating a method of manufacturing the tapered lip;

FIG. 24 is a sectional elevation of the shuttle showing the drill cavity of the shuttle aligned with the machine axis, and the drill just finished drilling a hole in the workpiece;

FIG. 25 is a sectional elevation of the shuttle after retraction of the drill and shifting of the shuttle body to align the rivet insert station with the machine axis, and showing the line of travel of a rivet into the hole drilled in the workpiece;

FIG. 26 is a sectional elevation of the shuttle showing the shuttle moving from the rivet insert position to the rivet die position and showing the path of airflow into the pressure foot to hold the rivet in place during movement of the shuttle;

FIG. 27 is a sectional elevation of the shuttle showing the rivet die station aligned with a machine axis and showing a portion of the driver acting on the rivet die to upset the rivet;

FIGS. 33A–F is a series of schematic diagrams showing the rivet recovery sequence;

DESCRIPTION OF THE PREFERRED EMBODIMENT

Figure 3:
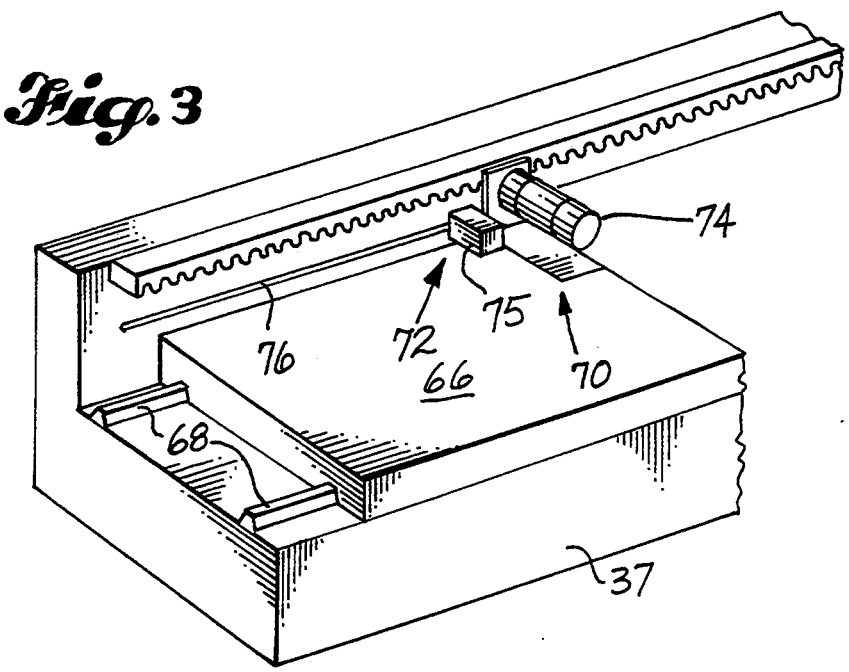
FIG. 3 is an isometric view of a motive mechanism for moving the position of the carrier shown in FIG. 1.

Turning now to the drawings, wherein like reference characters designate identical or corresponding parts, and more particularly to FIG. 1 thereof, an airplane body panel fabrication positioner 30 is shown having a positioner frame 32 on which an aircraft body panel 34 is mounted for riveting, for example, of body stringers to an aluminum body skin. A plurality of locating ears 35 project from the edges of the body panel 34 and a key indexing hole 33 is drilled in each ear for use in precisely locating the panel on the frame. The body panel will be referred to generically hereinafter as a workpiece and could be a body panel, a wing panel, or numerous other parts of the airplane that require riveting operations.

A carrier 36 is shown mounted on a machine base 37 for movement longitudinally therealong relative to the frame 32. The carrier 36 has a central opening 38 through which the frame 32 and the workpiece 34 extend. A number of pairs of end effectors 40 are mounted on the carrier 36 on both sides of the opening 38, facing the workpiece 34. Each pair of end effectors includes one unit that has a concentric drill/rivet machine, and an opposed unit that has just an electromagnetic riveter. These units will be describe in detail below. Four pairs of opposed end effectors 40 are shown but the number is limited only by the space provided on the carrier 36. Theoretically as many pairs of opposed end effectors 40 could be provided on the carrier as there are lines of rivets to be placed.

The frame 32 is mounted on a pair of pivots 42 for rotation by a panel roll device 43 about a pivotal axis 44 to rotate the workpiece 34 up and down between the opposed pairs of end effectors 40 to correctly present it to be acted upon by them. The two pivots 42 are each mounted in an upright stanchion 46, and the radius from the pivotal axis 44 to the workpiece is equal to the radius of curvature of the workpiece, so the spacing between the end effectors 40 and the surface of the workpiece does not change significantly when the workpiece is moved. A conventional sensor (not shown) reads the angular position of the pivot 42, from which the position of the workpiece 34 can be computed by a controller 48.

As shown in FIG. 2, each of the pairs of end effectors 40 supported by the carrier 36 includes a mounting cage 104 for movement toward and away from the workpiece. The cage 104 will be described in detail below. Each end effector 40 can be rotated on a roll device 54 about a roll axis 56 to normalize the axis 109 of the end effector to the surface of the workpiece on a plane through the pivotal axis. If desired, a wrist device 58 can be used to rotate the end effector 40 about its own axis 109. Two parallel rods 60 and 62 of an elevator 63 are mounted in the carrier for each end effector 40, and means such as a ball screw connection 61 between the rods and the end effector 40 provides vertical translation for the end effector parallel or tangent to the plane of the workpiece when the rods are rotated by an elevator driver 64. The rods 60 and 62 are also used in conjunction with the roll device 54 to align the opposed pairs of end effectors when the roll angle about the axis 56 is changed. In this way, the workpiece and/or the end effectors 40 can be moved to position a drill/rivet machine at a perpendicular orientation to the workpiece anywhere that a rivet is to be placed.

Movement of the carrier 36 along the machine base 37 is accomplished by the mechanism shown in FIG. 3, The carrier 36 has a carrier plinth 66 which is grooved on its underside to receive a pair of machine ways 68 on which the carrier 36 is guided and supported for movement along the X axis, parallel to the axis of rotation 44. The carrier plinth 66 runs on roller bearings or air bearings for smooth, low friction motion under control of a motive system 70. There are two separate elements of the motive system 70: a linear encoder 72, and an integrated unit 74 having a motor, gearbox, pinion and brake. The pinion of the integrated unit 74 engages a gear rack 76 located on the machine base with its gear teeth facing downward to prevent dirt from collecting in and clogging the gear teeth. The motor drives the pinion through the gearbox to move the carrier to the right or left on the machine base 37, and when the controller 48 deenergizes the motor, the brake automatically stops the motor at precisely that position without coasting to a stop at some indeterminate position.

The linear encoder 72 includes a reader unit 75 and an encoded strip 76 which is encoded with optical or magnetic position information that can be read by the reader unit to provide the controller 48 with feedback information concerning the position of the carrier 36 on the machine base 37.

Figure 5:
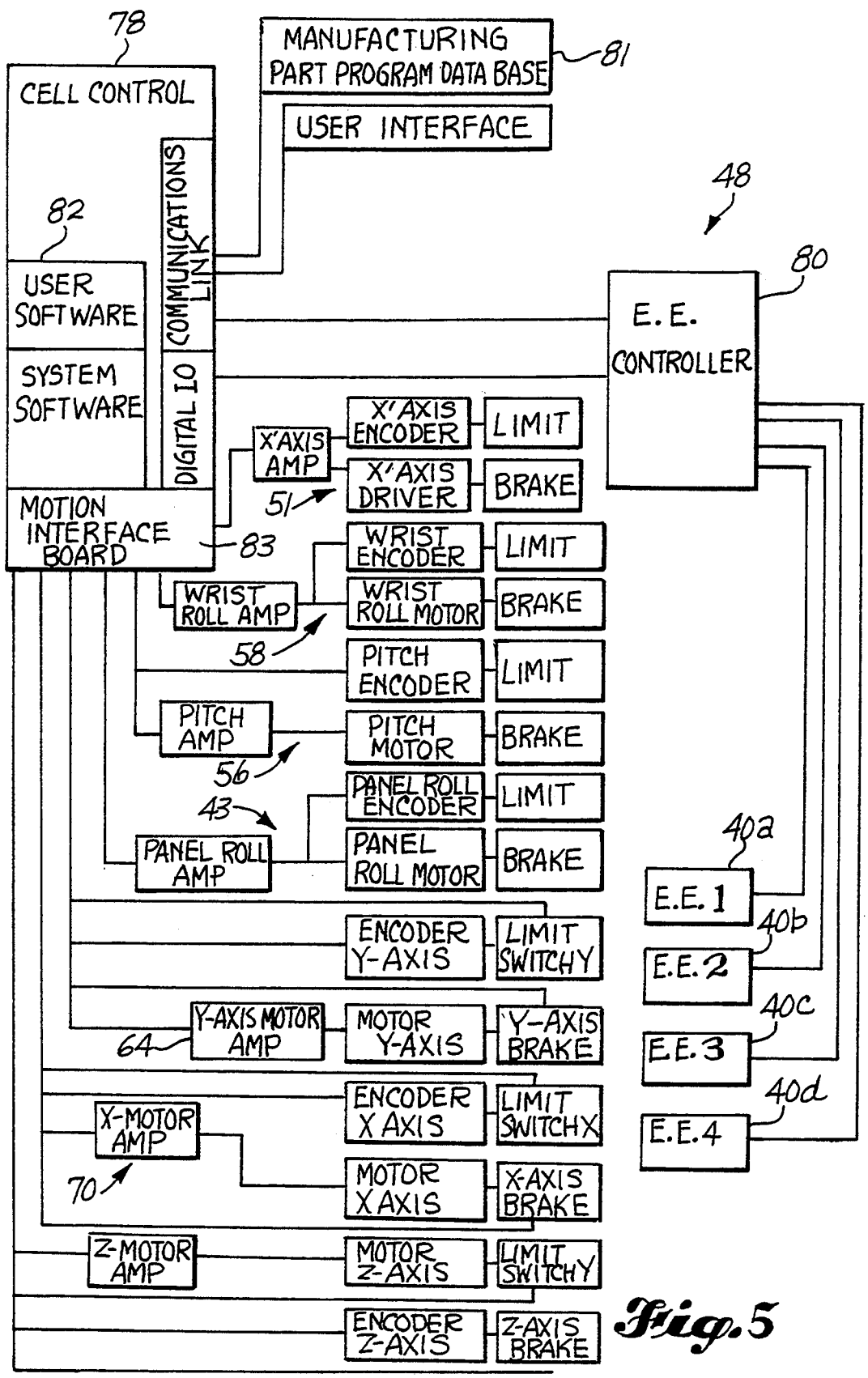
FIG. 5 is a schematic diagram of a control system for controlling the positioner shown in FIG. 1.

The system controller 48, shown schematically in FIG. 5, includes a cell control 78 which controls the movement of the positioner frame 32 and the carrier 36, and also provides signals for coordinating the functions of an end effector controller 80 which can be physically located in the same cabinet with the system controller 48 and which controls the operation of the cage 104 and the drill/rivet machine of the end effector 40. The system controller 48 will be described here, and the end effector controller 80 will be described later in connection with FIGS. 34 and 35.

A data set for fastener locations for each panel to be processed in the apparatus of FIG. 1 is converted to a part program off line and is stored in a part program data base 81 that can be loaded into the system controller 48 when that part is mounted on the frame 32. The system controller "knows" where the panel is on the frame by virtue of the key indexing holes 33 in the locating ears 35 which are used to precisely position the panel on the frame 32. With the panel positioned correctly on the frame 32 and the data set for the fastener locations loaded into the controller 48, the controller can position the panel with respect to the end effectors, and the end effectors can position themselves to accurately drill holes, place rivets and upset the rivets within a position tolerance of ±0.2 mm. The commands to move and orient the machine and the end effectors 40 are generated by user software 82 in the system controller 78 and transmitted through a motion interface board 83 which coordinates the commands to the machine motive devices and confirms that the motion has been properly executed through feedback signals from each of the motive devices, to be explained below.

An example of a typical panel on which this machine operates is an airplane fuselage panel on which longitudinal stringers and circumferential shear ties are riveted. For installing the shear ties, the panel is positioned with respect to the end effectors 40 primarily using the X-axis and panel roll axis. The end effectors would be positioned by their yaw, roll and pitch devices to be perpendicular to the cylindrical panel, and would normally not need to be moved since the stringers run in straight longitudinal lines parallel to the X-axis, and the shear ties run in arcs around the panel parallel to an arc subscribed on the panel by a radius rotated around the axis 44.

The controller 48 first moves the carrier 36 to a station file and rotates the frame 32 to position the panel about the axis of rotation 44 so that the end effectors 40 are correctly positioned at a shear tie location. The end effectors 40 then clamp and drill, insert rivets, and upset the rivets as will be described in detail hereinafter. The circumferential spacing between the rivets in the shear ties and between the stringers can be adjusted using the rods 60 and 62 and the rotation of the frame about the axis of rotation 44. In most cases, this adjustment is be done only once for each run down the panel by the carrier 36.

For riveting the stringers to the panel, the end effectors 40 are set to the proper circumferential spacing between the stringers around the panel using the rods 60 and 62 to position the end effectors on the Y-axis. The panel is rolled about the axis 44 to position the end effectors 40 on the stringer centerlines, and the end effectors are operated as before to clamp, drill, insert rivets and upset the rivets. After each operation, the carrier is indexed down the X-axis to the next rivet location and the process repeated until all the rivets have been placed. The entire panel can thus be riveted without operator intervention whatsoever.

In the case of complex contour parts, it is sometimes necessary to reposition the pairs of end effectors individually for each rivet since it is necessary that the pairs of end effectors 40 each be normal to the surface of the workpiece when drilling and riveting. This is the exceptional case, however; most riveting can be done by moving and operating the end effectors 40 together in ganged style.

Figure 4:
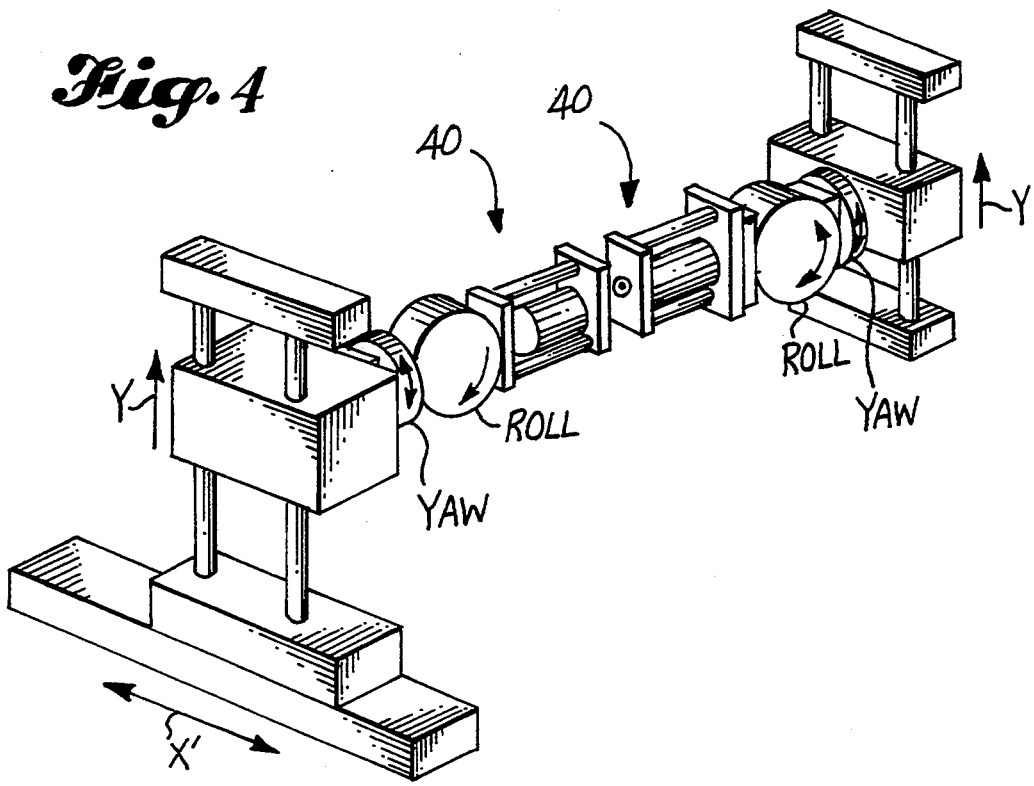
FIG. 4 is an alternative motive system for moving and orienting the end effectors shown in FIG. 1.

A complex contour part may occasionally require that the axis of the end effector pairs be positioned at a slightly non-perpendicular angle to the axis of rotation 44. If the machine shown in FIG. 1 is to be used to rivet such a part, another end effector motive system, shown in FIG. 4 would be mounted in the carrier 36 for each pair of end effectors 40. The motive system in FIG. 4 adds an additional axis X' which enables the two end effectors in each pair to be moved relative to the carrier 36 in the X-direction. In the case of a complex contour part in which the contour varies in the X-direction, the yaw motor can be rotated in opposite directions on the two end effectors in each pair, and the roll motors can be rotated by the amount needed to normalize the end effectors with the panel surface. Then the X' axis motor can be operated in opposite directions on each side to align the axes of the end effectors so that they abut at the panel for supported drilling and riveting.

Figure 6:
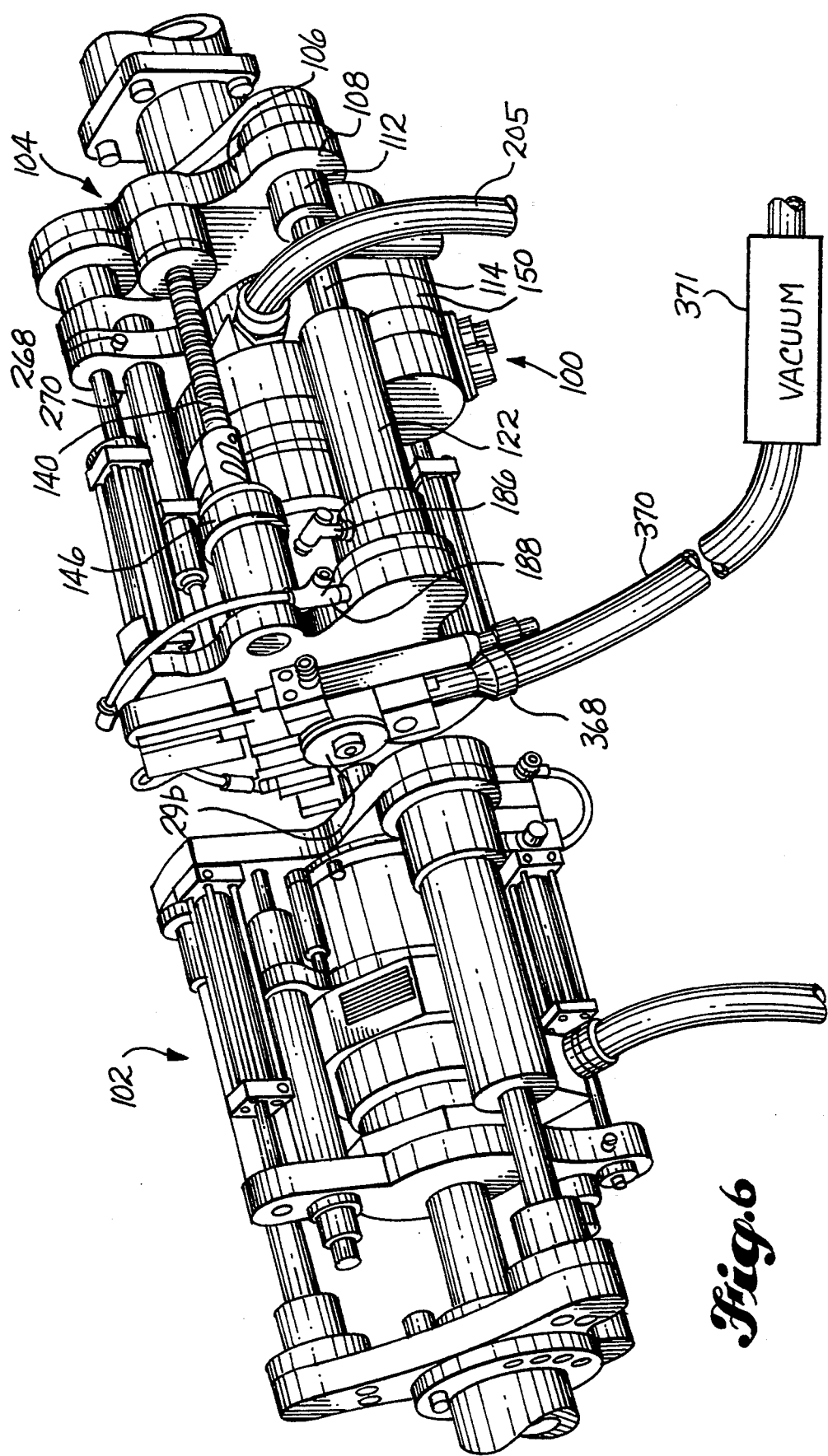
FIG. 6 is an isometric view of one of the pairs of drill/rivet machines which are mounted on the end effectors shown in FIG. 1.

Turning now to FIG. 6, a pair of opposed end effectors 40 is shown, separated from the carrier 36. The pair of opposed end effectors 40 includes a drill/rivet unit 100 and a rivet bucking unit 102. The rivet bucking unit 102 is similar to the drill/rivet unit 100, with the exception that it does not include the elements pertaining to the drilling function, and it does not have a shuttle, all of which will be described in detail below. Since the rivet bucking unit 102 is otherwise similar, it will be described only insofar as it differs from the drill/river unit 100.

Figure 7:
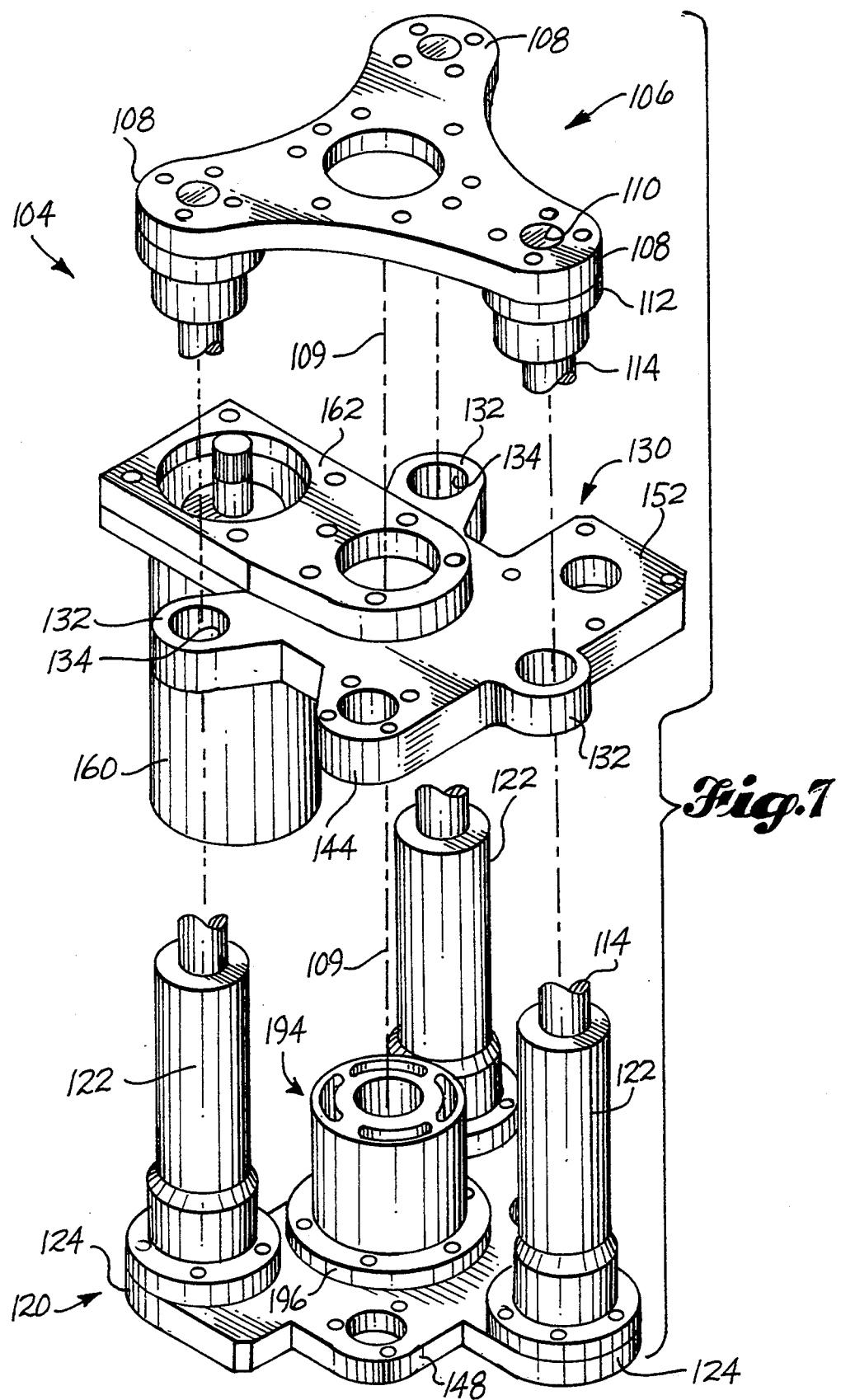
FIG. 7 is an exploded isometric view of a cage on which the components of the drill/rivet device are mounted.
Figure 11:
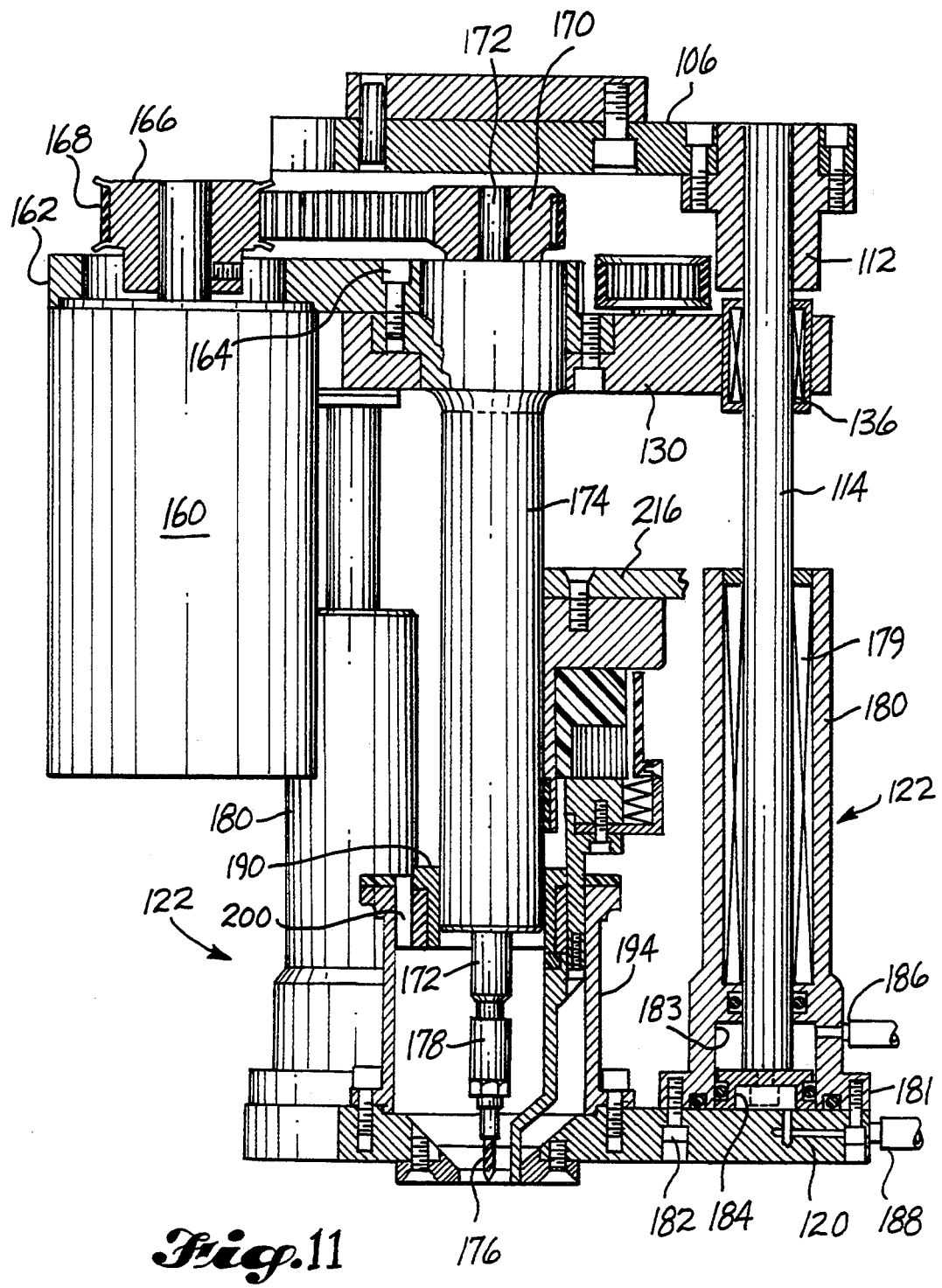
FIG. 11 is a sectional elevation of a portion of the right hand unit along lines 11—11 in FIG. 6, showing the drill motor, the cage cylinders, and half of the electromagnetic riveter.

The drill/rivet unit 100 includes a cage 104, shown in an exploded perspective view in FIG. 7 and in partial cross section in FIG. 11. The drill/rivet components and the other motive and sensing components for operating the drill/rivet components are mounted on the cage. In addition, the cage itself is designed to extend and retract toward and away from the workpiece to clamp the workpiece firmly between pressure feet to hold the parts of the workpiece clamped tightly together while they are being drilled and riveted by the drill/rivet components.

Figure 9:
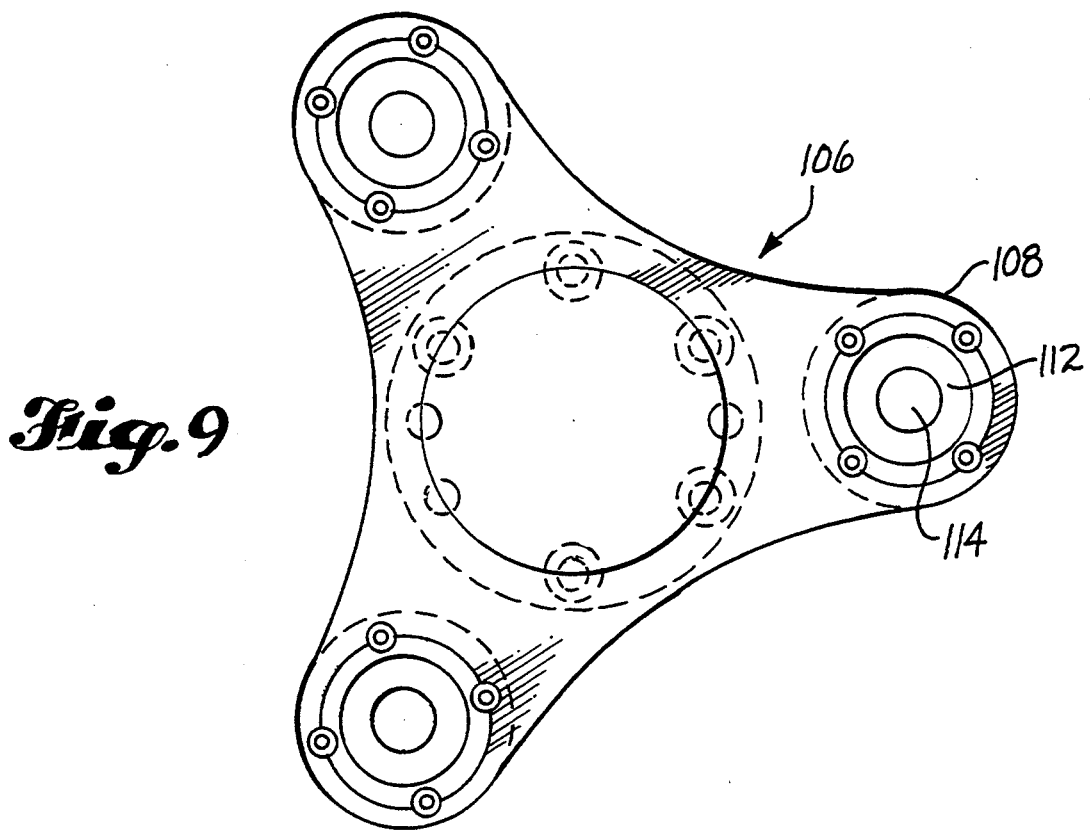
FIG. 9 is a plan view of the top plate of the cage shown in FIG. 7.

The cage 104 includes a top plate 106, as shown in FIGS. 7 and 9, having three lobes 108 spaced approximately equally around a central axis 109. Each of the lobes 108 has a hole 110 in which a plinth 112 is mounted. Each plinth 112 receives and rigidly supports a guide rod 114. A bottom plate 120 is mounted on the other end of the rods 114 by use of three cage cylinders 122 which are secured to the bottom plate 120, one each on each of three lobes 124 arranged at approximately equal angular positions about the central axis 109 and corresponding in position to the lobes 108 on the top plate 106. The bottom plate 120 on both units 100 and 102 can move axially along the rods 114 a limited distance to enable the machine to clamp a workpiece between pressure feet on the rivet bucking unit 102 and the drill/rivet unit 100, as will be described in more detail below.

Figure 8:
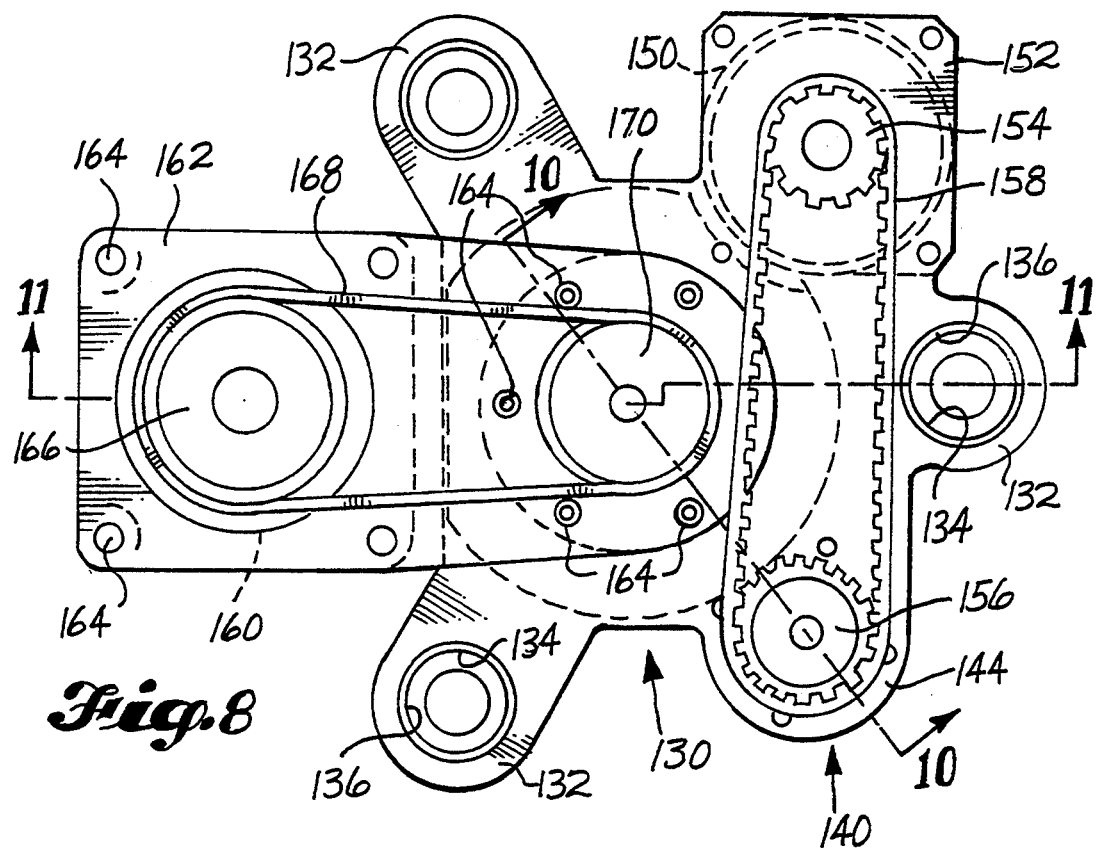
FIG. 8 is a plan view of the middle plate of the cage shown in FIG. 7, showing the drill motor and lead screw assembly attached.
Figure 10:
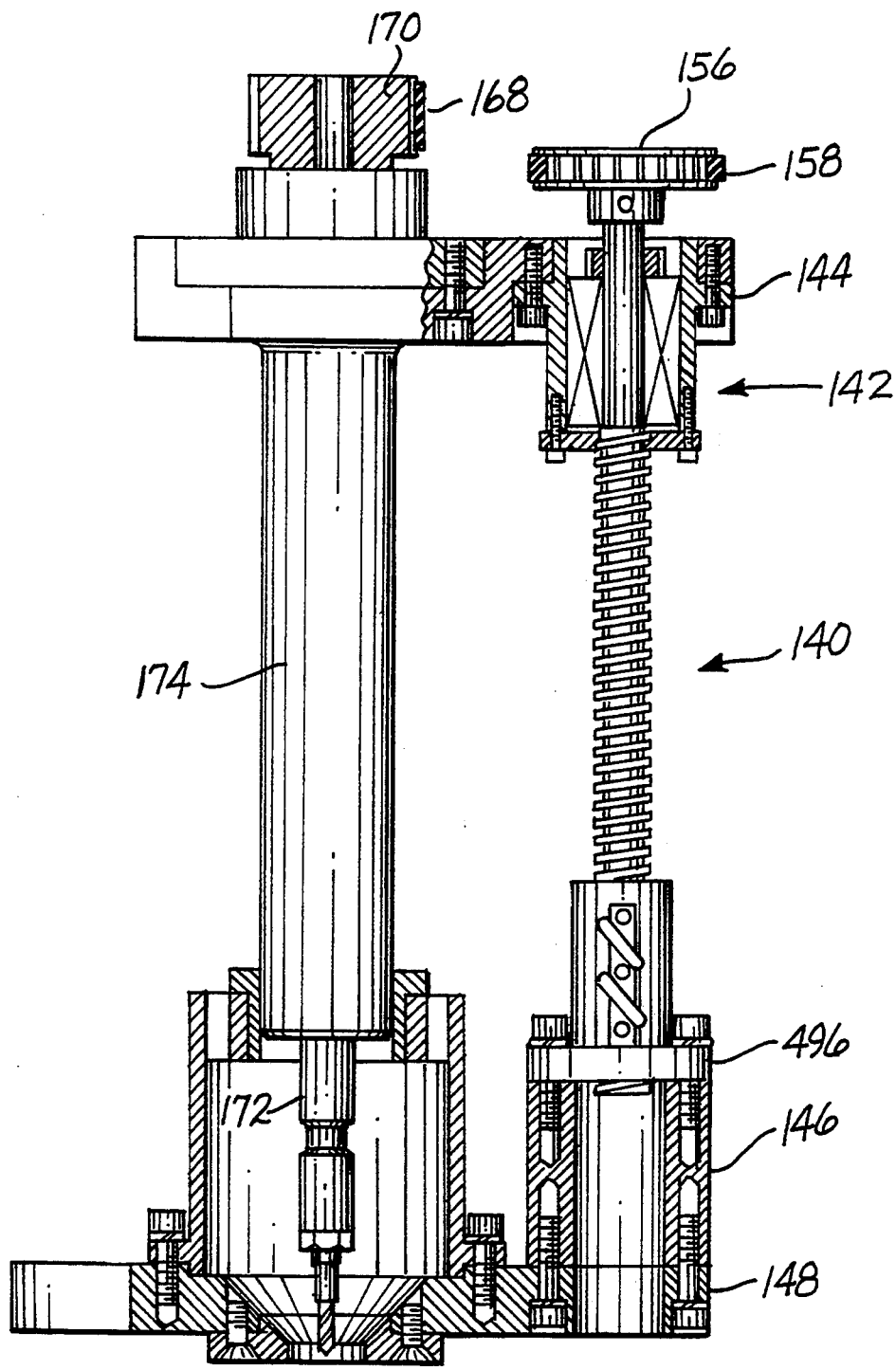
FIG. 10 is a sectional elevation of a portion of the right hand unit along lines 10—10 in FIG. 6, showing the ball screw for plunging the drill.

A middle plate 130 is slidably mounted on the rods 114 for axial movement between the top plate 106 and the bottom plate 120. The middle plate 130 supports the components of a drill, shown partially in FIG. 8 and in FIG. 11., including a drill motor 160, a feed motor 150, and a ball screw drill feed system 140, all of which are provided by EOA Systems, Inc. of Dallas, Tex. Three lobes 132 on the middle plate 130 correspond in position to the lobes 108 and 124 on the top plate 106 and bottom plate 120, respectively. Each of the lobes 132 has an opening 134 in which is mounted a bearing 136 by which the middle plate 130 is supported on the rods 114. The position of the middle plate 130 between the top plate 106 and the bottom plate 120 is controlled by the ball screw 140, shown in FIG. 10, supported in a bearing 142 mounted on a lobe 144 on the middle plate 130, and on a cylindrical receptacle 146 mounted on a corner 148 on the bottom plate 120. The ball screw is driven by the motor 150 mounted on an integral plate 152 projecting from the middle plate 130. The motor 150 drives the ball screw 140 through a pair of cog wheels 154 and 156 on the motor 150 and lead screw 140 respectively, through the agency of a cog belt 158.

The drill motor 160 is mounted on an attachment plate 162 which is fastened to the middle plate 130 by screws 164. The motor 160 drives a cog wheel 166 which is shown in FIG. 11 acting through a cog belt 168 to drive another cog wheel 170 attached to a spindle 172 mounted for rotation inside a drill quill 174 mounted on the attachment plate 162. This makes it possible to dismount the entire drill unit for service or repair by merely removing the screws 164 and lifting the plate 162 and the attached drill motor and drill quill 174 out of the cage 104. A drill bit 176 is mounted in a collet 178 secured to the lower end of the drill spindle 172 for drilling holes in the workpiece, as will be described in more detail below.

Figure 12:
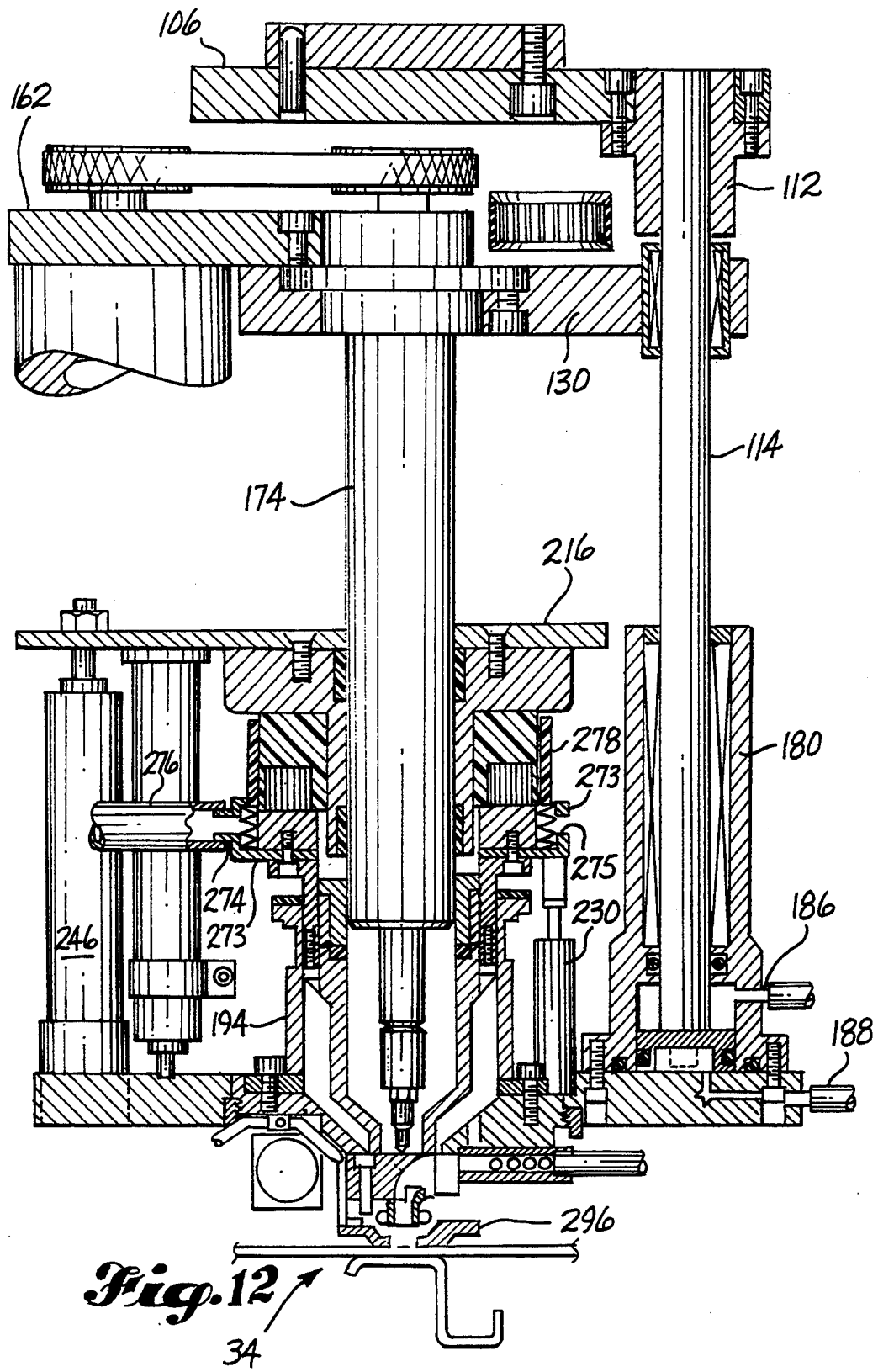
FIG. 12 is a sectional elevation of the electromagnetic riveter mounted in the cage of the drill/rivet machine.

Each cage cylinder 122, as shown in more detail in FIGS. 11 and 12, includes an upper extension cylinder 180 having a bearing system 179 to support the guide rod 114 while allowing it to move axially in the cage cylinder 122. The lower end of the cage cylinder 122 has a flange 181 by which the cage cylinder 122 is fastened to the bottom plate 120 by screws 182. The lower end of the cage cylinder 122 is enlarged slightly and bored out at the bottom to provide a cylinder 183 which receives a piston 184 secured to the lower end of the guide rod 114. An air fitting 186 is connected to the lower end of the cage cylinder 122 communicating with the cylinder 183 above the piston 184 for moving the cylinder and the attached bottom plate 120 upward relative to the guide rod 114, away from the workpiece. A similar fitting 188 communicates with the cylinder 183 below the piston 184 for extending the cylinder 122 and the attached bottom plate 120 downward relative to the guide rod 114, toward the workpiece.

Each of the three cage cylinders 122 is identical to the cage cylinder shown in cross section in FIGS. 11 and 12, and the fittings 186 and 188 of each cylinder are each connected, respectively, to a single air supply line controlled by a single solenoid air valve (to be described in more detail below), so that when the lower part of the cylinder 183 in each of the cage cylinders 122 is pressurized with air through the air fitting 188, all three cylinders 122 move vertically downward simultaneously, pushing the bottom plate 120 toward the workpiece positioned between the opposing contact surfaces of the drill rivet unit 100 and the rivet bucking unit 102, as will be described in more detail below.

Figure 13:
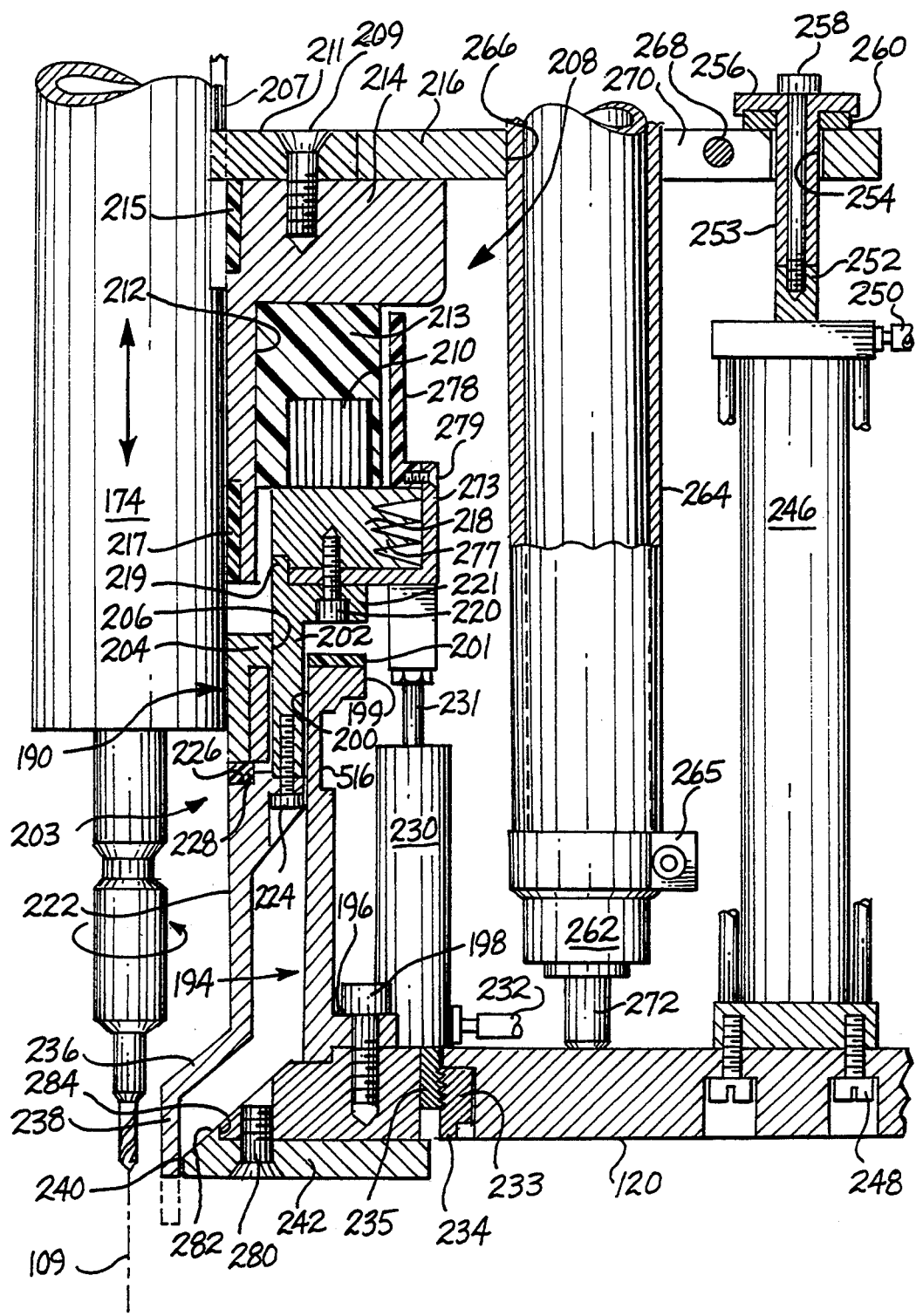
FIG. 13 is an enlarged sectional elevation of the electromagnetic riveter with its recoil, damping and popback cylinders.
Figure 14:
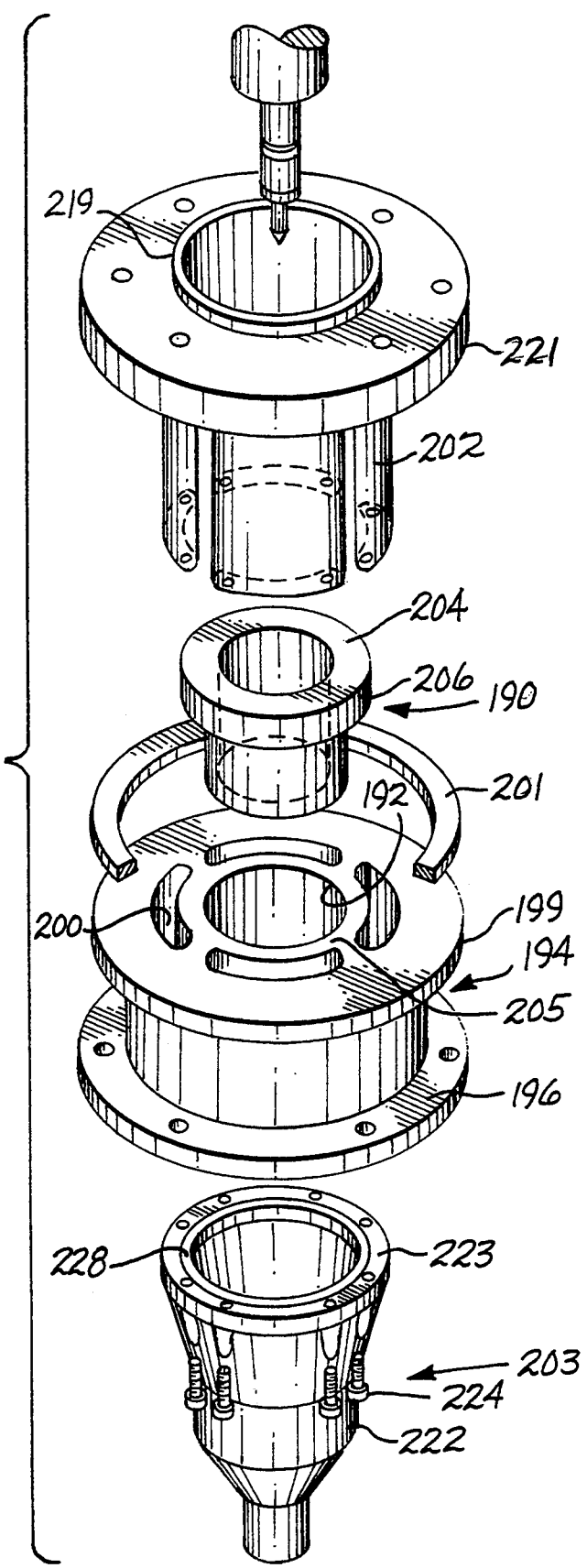
FIG. 14 is an exploded perspective view of the support member and bearing for the drill quill and the driver of the electromagnetic riveter.

The lower end of the drill quill 174 is laterally supported in a cylindrical bearing 190 as the quill moves vertically while drilling a hole in the workpiece. The bearing 190, as best shown in FIGS. 13 and 14, is mounted in an axially extending cylindrical bore 192 in a quill bearing support member 194 which is attached to the bottom plate 120 with screws 198 through a lower flange 196. The quill bearing support member 194 has an upper flange 199 to which is bonded a rubber bumper disc 201, and has a series of axially extending arcuate slots 200 disposed concentrically around the bore 192 for receiving a segmented upper portion 202 of a driver 203 for an electromagnetic riveter to be described below. The cylindrical bearing 190 has a flange 204 which seats on the top surface 205 of the support member 194 between the bore 192 and the arcuate slots 200. The flange 204 has an outside peripheral cylindrical surface 206 which extends radically just slightly beyond the inside peripheral edge of the arcuate slots 200 and acts as a radial bearing for the segmented upper portion 202 of the driver.

As best shown in FIG. 13, an electromagnetic riveter 208 is concentrically disposed around the drill quill 174. The upper section of the electromagnetic riveter 208 has a high amperage annular flat coil 210 made in accordance with U.S. Pat. No. 4,146,858 or can be a commercially available coil, such as made by Electroimpact, Inc. of Seattle, Wash. The coil is potted into a recess 212 in a recoil mass 214 with an epoxy potting compound 213, and is connected to a power cable 205 (shown in FIG. 6.) The recoil mass 214 is secured to a support plate 216 and is designed to slide axially relative to the drill quill 174 on annular phenolic sleeve bearings 215 and 217 set into upper and lower recesses in the recoil mass 214. A key 211 is attached to the recoil mass 214 by a screw 209 and fits into a longitudinal keyway 207 in the drill quill 174 to guide the axial movement of the recoiling portions of the electromagnetic riveter and prevent the support plate 216 and its attached electromagnetic riveter from rotating as it moves axially.

The lower half of the electromagnetic actuator has a transducer 218, which is a thick copper plate, in contact with, but electrically insulated from, the coil 210. When a power supply circuit, to be described below, is 'fired' to send a burst of high amperage current through the coil 210, a rapidly changing magnetic field is generated which induces strong eddy currents in the conductive material of the transducer 218. These eddy currents in turn generate an opposing magnetic field which creates a repulsive force between the coil 210 and the transducer 218, causing them to separate with great force.

The upper portion 202 of the driver 203 has a small lip 219 which is used to accurately locate the transducer 218 concentrically on the top of the driver 203. The driver 203 is fastened to the transducer 218 by screws 220 through a flange 221 on the top of the driver upper portion 202. The driver 203 has a lower cylindrical portion 222, shown in FIG. 14, which is fastened by screws 224 through a lower flange 223 on the top of the driver lower portion 222 to the upper segmented portion 202.

A recess 226 is provided on the top inside edge of the lower portion 222 of the driver 203 to receive an annular square ring 228 which is bonded into the recess to provide a resilient bumper and fixes the upper limit of the travel of the driver 203. The square ring 228 is made of 90 durometer nitrile to absorb and uniformly distribute the impact when the driver is returned to its uppermost position by a pop back cylinder 230 after the electromagnetic riveter has "fired".

The pop-back cylinder 230 has a piston rod 231, attached to an internal piston, which exerts an upward force on the transducer 218 and the attached driver 203 when the pop-back cylinder 230 is pressurized through an air line 232 under control of an air solenoid valve, to be described below. The pop-back cylinder 230 is fastened to the bottom plate 120 by a nut 233 having a hex extension 234. The nut 233 is threaded onto a cylindrical threaded extension 235 on the bottom of the pop-back cylinder 230 which extends into a stepped hole in the bottom plate 120 to hold the pop-back cylinder in place.

The lower end of the driver lower portion 222 is tapered inwardly at 236 and terminates in a lower cylindrical portion 238 which fits snugly in and is guided by an opening 240 in a top wall 242 of a shuttle carrier 244. The shuttle carrier will be described in detail below in connection with FIG. 15.

A recoil cylinder 246 is fastened to the bottom plate 120 by screws 248. The recoil cylinder 246 is a single acting, spring return cylinder controlled by a pressure regulating solenoid (to be described below) delivering air to the cylinder 246 through an air line 250. A piston rod 252 extends through a hole 254 in the support plate 216. A piston rod extension 253 is fastened to the piston rod 252 by a screw 258. An enlarged head 256 on the piston rod extension 253 engages the top surface of the support plate 216 through a 90 durometer urethene washer 260 to cause the piston to compress, so that when the recoil mass 214 and the attached parts of the electromagnetic riveter 208 recoil upwardly when the coil 210 is energized and forcably repelled from the transducer 218, the plate 216 is driven upwardly, raising the piston rod 252 and its attached piston in the cylinder 246, compressing gas in the cylinder 246, thereby absorbing and storing in the recoil cylinder the energy of the recoiling portions of the electro- magnetic riveter 208 when it is actuated.

A damping cylinder 262 is held in a metal sleeve 264 and clamped therein by a clamp 265 at the lower end of the sleeve 264. The sleeve 264 and damping cylinder 262 are clamped in a hole 266 in the support plate 216 by a screw 268, threaded into the support plate 216 and squeezing a slot 270 in the support plate 216 closed onto the sleeve 264. The damping cylinder 262 has a plunger 272 which bears against the bottom plate 120 and serves to damp the return motion of the recoiled portions of the electromagnetic riveter 208 which are being returned to the start position by the recoil cylinder 246.

The current through the coil 210 is on the order of about 5–10 kA for a pulse of about 1–2 milliseconds and generates about 35 watt-hours of resistive heating each time the coil is fired. The conventional cooling technique can be supplemented or replaced with a simplified cooling scheme which relies on contact and conductive heat transfer between the coil 210 and the transducer 218. Since the transducer 218 is made of copper and has a high thermal conductivity, it will tend to conduct heat away from the coil when it is in contact with the lower face of the coil, where most of the current flows and where most of the heat is generated. By cooling the transducer 218 instead of directly cooling the coil 210, ordinary plant air can be used and the special drying and filtering systems required for direct air cooling of the coil 210 are not required.

As shown in FIG. 12, the coil cooling system includes a shroud 273 around the transducer 218, and a fitting 274 for admission of cooling air to one side of the coil through a supply line 276. The other side of the shroud 278 has an opening 275 to permit the exhaust of cooling air which had been heated by heat transfer from the transducer 218 to the cooling air flow around both sides of the transducer. The transducer is provided with radial fins 277 which extend around the entire circumference to enhance the heat transfer from the transducer to the air flow in the space between the transducer and the shroud 273, although the fins are milled off opposite the fitting 274 and the opening 275 to facilitate air movement at the inlet and outlet of the shroud. An additional shroud 278 is screwed to the top of the shroud 273 with screws 279 to protect the coil 210 from dirt or accidental contact.

Figure 15:
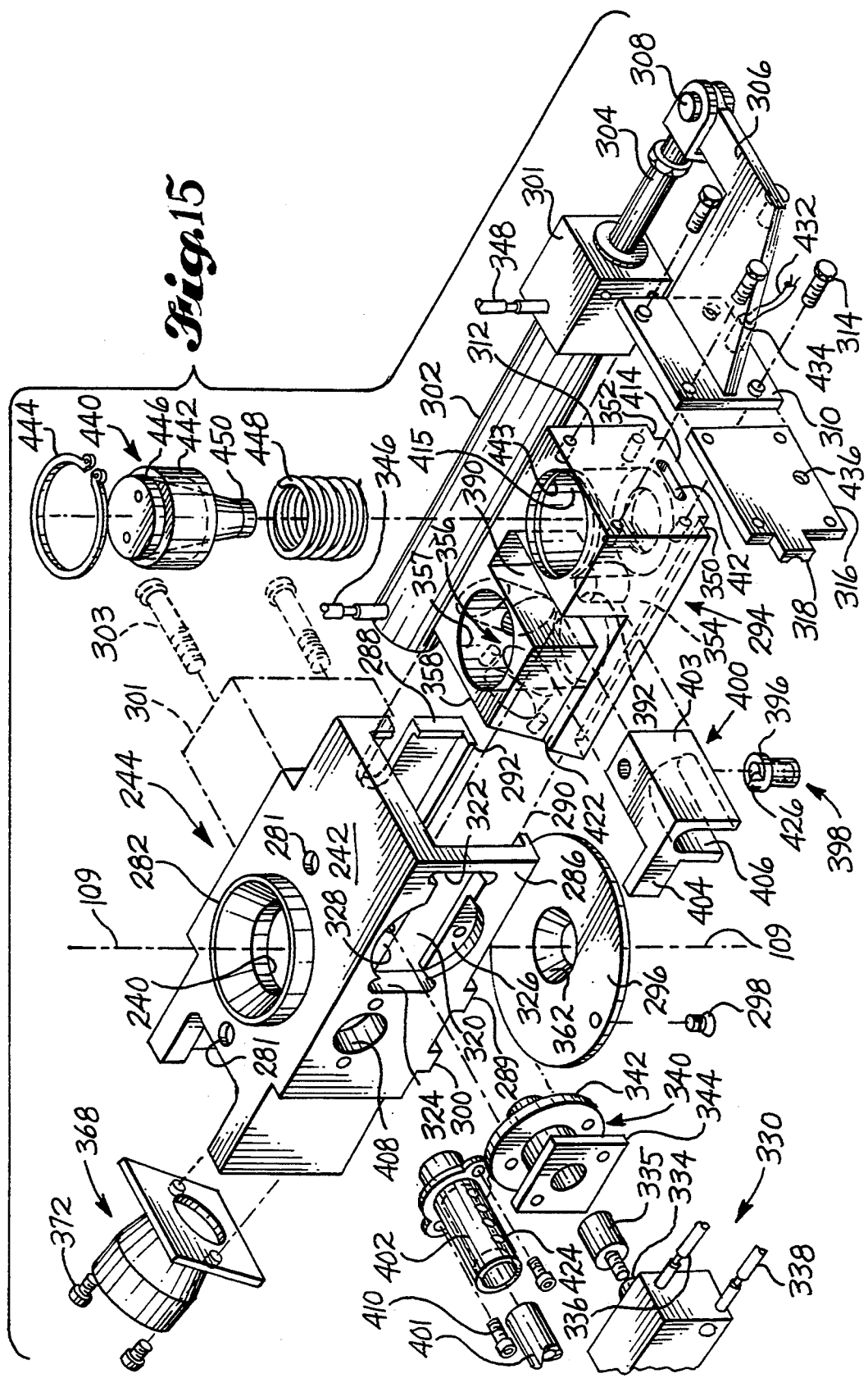
FIG. 15 is an exploded perspective view of the shuttle shown in FIG. 6 for moving the drill cavity, rivet inserter and rivet die stations in order under the axial centerline of the machine.

A shuttle shown in exploded perspective view in FIG. 15, includes a shuttle carrier 244 which is screwed to the underside of the bottom plate by screws 280 extending through holes 281 in the top 242 of the shuttle carrier 244. The top 242 of the shuttle carrier 244 has a cylindrical boss 282 which fits into a hole 284 in the bottom plate 120 on the axial centerline 109 of the machine. The hole 284 is tapered at its top end (as shown in FIG. 13) and the boss 282 is tapered with the same slope to present a uniformly tapered hole in the base plate 120 opening into the shuttle carrier 244. The taper angle of the hole 284 and the boss 282 is the same angle as the taper of the tapered portion 236 of the driver 203 so the driver 203 can have the maximum downward translation without interfering with the sides of the hole 284. The cylindrical lower portion of the driver 238 fits snugly in the opening 240 in the shuttle carrier to provide a lateral bearing for the lower end of the driver.

The cross section of the shuttle carrier 244 is generally an inverted U-shape, having two opposed side walls 286 and 288 depending from the lateral edges of the top wall 242. Each wall 286 and 288 has a short inwardly extending flange 290 and 292 which support a shuttle body 294 for longitudinal sliding movement within the shuttle carrier 244. A circular pressure foot 296 is secured to the underside of the shuttle carrier 244 by a pair of screws 298 (only one of which is shown in FIG. 15) and the pressure foot 296 is precisely located on the axial center line 109 of the machine by a raised rib 300 on the bottom face of the flanges 290 and 292, within which the pressure foot fits.

The shuttle body 294 is moved by an air cylinder 302 having an attachment block 301 fastened to the side 288 of the shuttle carrier 244 by screws 303. The cylinder 302 has a piston rod 304 connected to an arm 306 by a pivot connection 308. The arm 306 is welded to an end plate 310 which is fastened to the rear end 312 of the shuttle body 294 by screws 314. A stop plate 316 having a projecting ear 318 is fastened between the rear end 312 of the shuttle body 294 and the end plate 310.

The ear 318 of the stop plate 316 extends through an opening 320 in the depending side 286 of the shuttle carrier 244. The opening 320 has a flat face 322 at its rear end and a parallel flat face 324 spaced at the other end of the opening 320. A recess in the form of a circular segment 326 and 328 is provided adjacent the top and bottom edges of the opening 320 to receive a pin guide sleeve 340 which receives and guides a pin 335 threaded to a piston 334 of a mid-stop air cylinder 330. The pin guide sleeve 340 is secured in place in the recess 326/328 by screws (not shown.) A cylindrical flange 342 on the guide sleeve 340 fits into the circular segment recess 326/328 for accurate placement. The outer end of the pin guide sleeve 340 has a square flange 344 to which the air cylinder 330 is fastened. The cylinder 330 is a double acting cylinder having two air fittings 336 and 338 whereby the piston 334 can be extended or withdrawn under control of a detented double air solenoid supplying pressurized air to one side or the other of the piston 334 through the air fittings 336 and 338.

Figure 16:
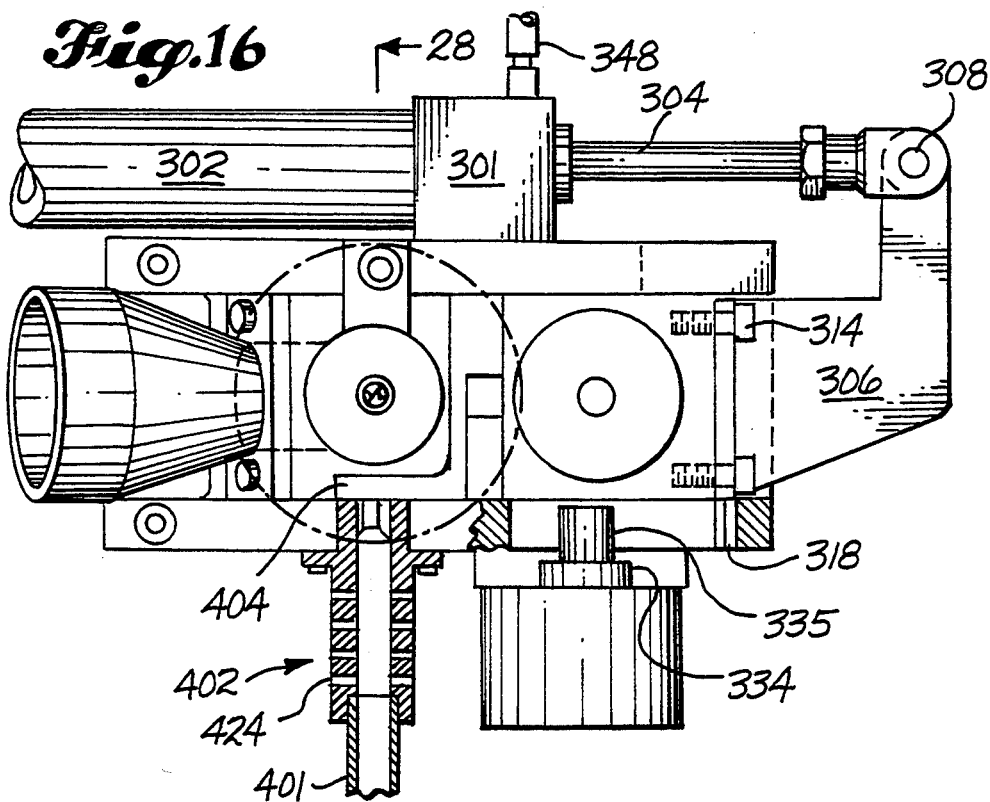
FIG. 16 is a plan view of the shuttle shown in FIG. 15., and showing the drill cavity aligned with the axis of the machine.

The operation of the shuttle body movement under control of the cylinder 302 and the mid-stop air cylinder 330 is as follows: with the mid-stop piston 334 retracted and the pin 335 withdrawn into the pin guide sleeve 340, the cylinder 302 is pressurized through an air line 346 connected at the remote end of the cylinder 302 to fully extend the piston rod 304 and move the shuttle body to its rear or rightmost position, as illustrated in FIGS. 15 and 16, with the ear 318 against the end face 322 of the opening 320. The mid-stop air cylinder 330 is pressurized through the fitting 336 to extend the piston 334 so the pin 335 protrudes into the path of travel of the ear 318.

When it is desired to move the shuttle body to its mid position, the cylinder 302 is depressurized through the fitting 346 and is pressurized on the other side of the piston through the fitting 348 to cause the piston rod 304 to move to the left in FIG. 15 to the position illustrated in FIG. 16. This moves the shuttle body 294 to the mid position, illustrated in FIG. 17, where the ear 318 engages the pin 335. When it is desired to move the shuttle body 294 to its extreme left-most position, the piston 334 is retracted by pressurizing the cylinder 330 through the fitting 338 and venting the pressure through fitting 336 which withdraws the piston 334 and retracts the pin 335 into the pin guide sleeve 340 where it clears the ear 318 and allows the shuttle body 294 to be pushed by the piston rod 304, under the influence of the air pressure in the cylinder 302, and the arm 306 to its left-most position, as illustrated in FIG. 18, where the ear 318 contacts the forward face 324 of the opening 320 to accurately locate the shuttle body at the desired position.

The shuttle body 294 includes a pair of longitudinal recesses 350 and 352 along both its bottom longitudinal edges. The recesses 350 and 352 receive the flanges 290 and 292 of the shuttle carrier 294 to guide the shuttle body 294 for smooth longitudinal sliding motion within the shuttle carrier 244. The bottom face 354 of the shuttle body 294 is flush with the bottom surface of the flanges 290 and 292, so the pressure foot 296, fastened to the bottom of the shuttle carrier 244, is also flush with the bottom surface 354 of the shuttle body 294.

A drill cavity 356 in the shuttle body 294, shown in FIGS. 15 and 24–28, includes a vertical cylindrical bore 357 opening in the top surface of the shuttle body 294 adjacent the front edge 358 of the shuttle body 294. The very bottom of the cylindrical bore 357 is tapered inwardly at 360. As shown in FIG. 24, the angle of the taper 360 corresponds to the angle of a tapered hole 362 through the pressure foot 296 to present a uniform tapering bottom of the drill cavity 356 for the purpose of facilitating removal of all the drill chips created when the drill bit 176 drills a hole in the workpiece.

The shuttle body 294 has a front face 364 extending downwardly and forwardly from the front edge 358. An angled opening 366 extends from the front face 364 through the front of the shuttle body 294 and opens into the drill cavity 356. A fitting 368 for attachment of a vacuum hose 370 is attached to the front face 364 of the shuttle body 294 by screws 372. The vacuum hose 370 is connected to a source of vacuum 371 for drawing air, mist lubrication, drill chips and long or short rivets out of the drill cavity 356 in a manner to be described below.

Figure 28:
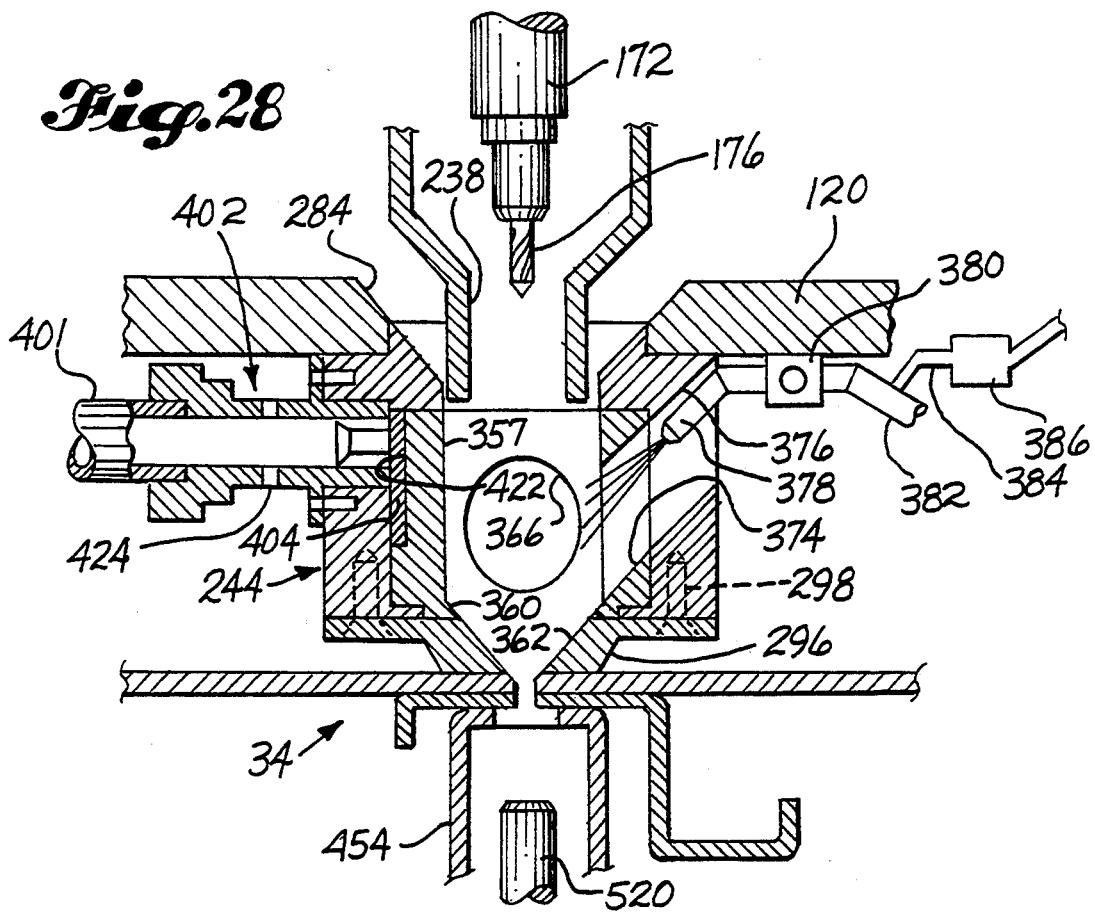
FIG. 28 is a sectional elevation along lines 28—28 in FIG. 16

As shown best in FIG. 28, a downwardly angled opening 374 communicates from the side of the shuttle body 294 into the drill cavity 356. The angled opening 374 registers with an angled opening 376 in the side of the shuttle carrier 244 to permit an air nozzle 378 secured to the underside of the bottom plate 120 by a clamp 380 to blow air delivered from an air line 382 and blow mist lubrication metered through a lubrication line 384 from a metering lubrication pump 386 into the drill cavity 356. The air from the air line 382 is controlled by an air solenoid valve under central control of the end effector control system 80, as will be described in more detail below.

The operation of the drill operating in the drill cavity 356 will now be described. Under control of the end effector controller 80, to be described below, the drill motor 160 is turned on and, operating through the cog wheel 166, the cog belt 168 and the cog wheel 170, rotates the spindle 172 supported in the drill quill 174. Likewise, the controller 80 turns on the drill feed motor 150 to rotate the ball screw 140 through the cog wheels 154 and 156 and the cog belt 158 to plunge the middle plate 130 toward the bottom plate 120 to cause the drill bit 176 to drill a hole in the workpiece. At the same time that the spindle is turned on, the vacuum pump 371 connected to the vacuum hose 370 is turned on and, as the drill descends through the drill cavity 356, the air through the air nozzle 378 is turned on and the lubrication pump 386 meters a small amount of lubrication into the air line 382 to cause a lubricating mist to be sprayed onto the drill 176 as it passes through the drill cavity 356. Only a small amount of lubricant is metered into the air line 382 so that excess lubricant does not contaminate the workpiece. Moreover, the capacity of the vacuum pump drawing air through the vacuum port 366 is greater than the capacity of the air line 382 so that the drill cavity 356 is at a slightly lower air pressure and air will be drawn in through the top opening and through the angled opening 374 which then is all drawn out through the vacuum port 366 so that mist lubrication is blown only onto the drill bit 176 and then out through the vacuum port 366, and does not settle onto the workpiece. In this way, distribution of the lubricant is controlled to prevent it from contacting the other parts of the machine or becoming entrained in the air around the work area where it could settle onto the equipment, work surfaces or the workpiece.

As the drill drills into the workpiece, the vacuum continues to draw air through the vacuum port 366 and air continues to blow through the nozzle 378, although no more lubricant is metered into the air line 382 after the initial pulse which was timed to lubricate the drill bit 176. The drill bit cuts into the workpiece and creates drill chips which spiral up into the drill cavity 356. As the chips break off, they are entrained in the air swirling through the drill cavity 356 and are drawn through the vacuum port 366 to be deposited in a container from which they may be periodically emptied. Since the tapered bottom 360 of the drill cavity 356 matches the size and slope of the tapered hole 362 in the pressure foot 296 at the interface therebetween when they are aligned, and since the opening in the bottom of the pressure foot 296 is nearly the same size as the drill bit 176, there is no surface on which the drill chips can collect, so they are all drawn up and out through the vacuum port 366. Any tendency for the drill chips to collect in the tapered opening 360 and 362 is further negated by the air blown through the nozzle 378 which tends to swirl the chips in the drill cavity 356 to keep them entrained in the air in the cavity and facilitate their removal through the vacuum port 366.

Figure 22:
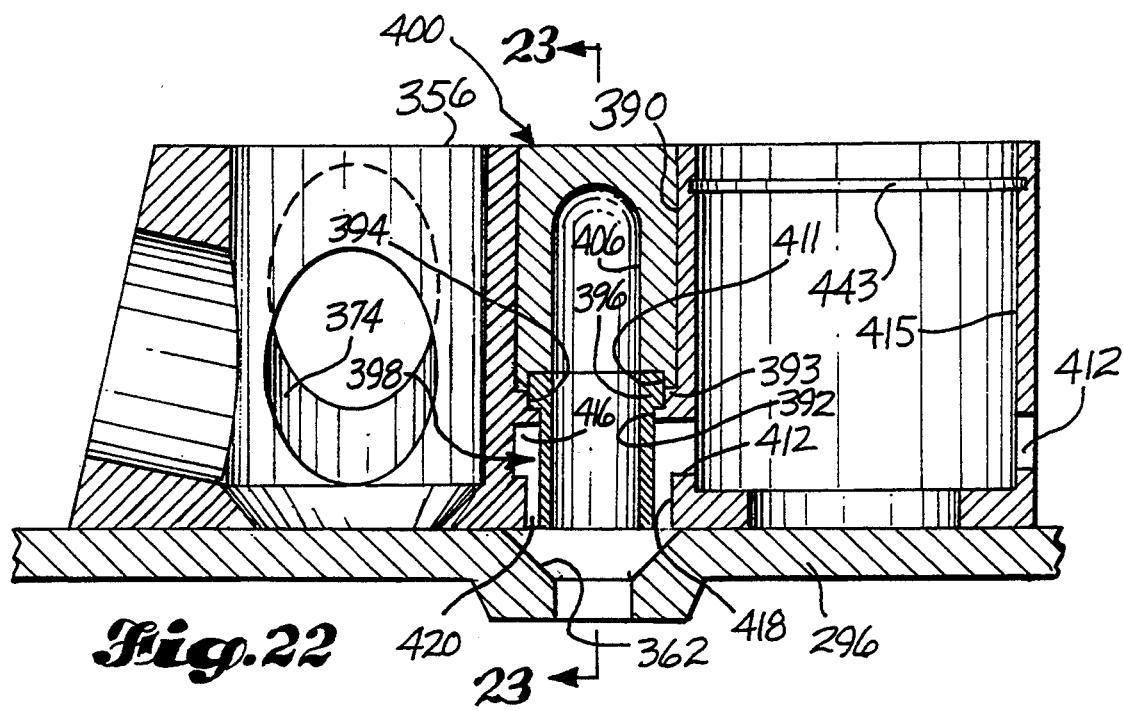
FIG. 22 is a sectional elevation of the shuttle showing the rivet insert station of the shuttle aligned with the machine axis.
Figure 23:
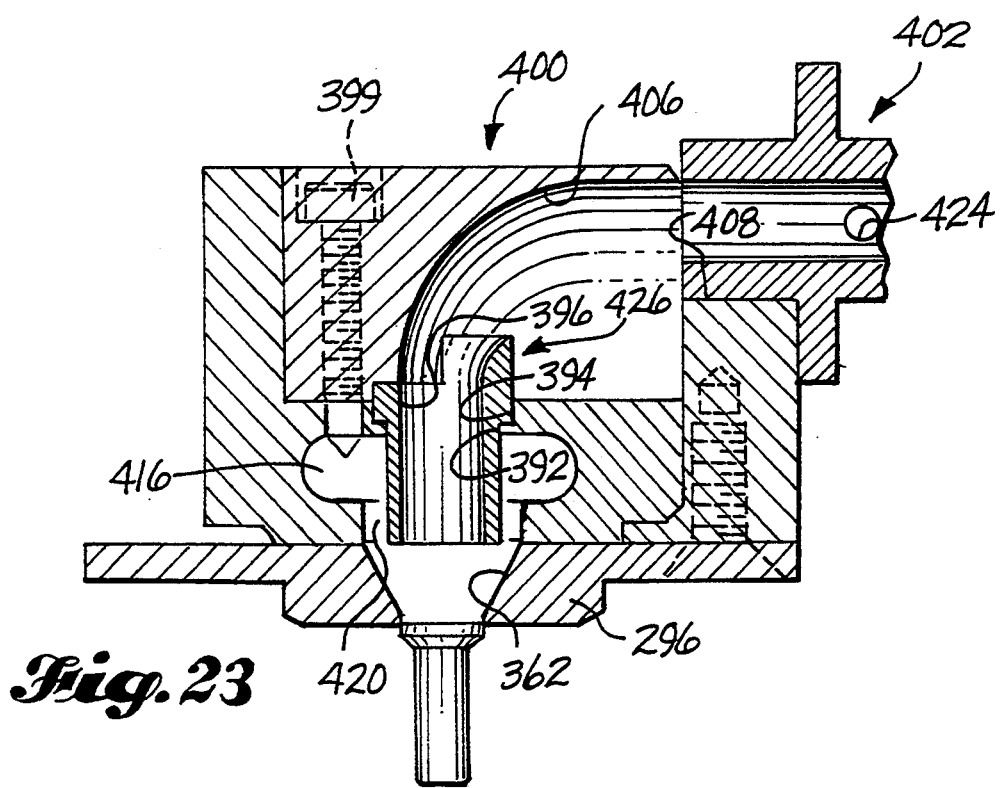
FIG. 23 is a sectional elevation along lines 23—23 in FIG. 22.

After the hole has been drilled and countersunk, the drill feed motor reverses and withdraws the drill bit from the hole just drilled in the workpiece and out of the drill cavity 356. The shuttle cylinder is pressurized through the air line 348 to move the shuttle body 294 to its midstop position, shown in FIGS. 17 and 25, with the ear 318 against the pin 335. At the midstop position of the shuttle body 294, a slot 390 in the shuttle body 294 is aligned with the machine axis and the hole 362 in the pressure foot 296. The slot 390, as shown in FIG. 15, is open at the top of the shuttle body 294 and on the left side facing the side of the shuttle carrier 244 in which the midstop cylinder 334 is mounted. The slot 390 extends about two-thirds into the depth of the shuttle body 294. A bore 392, shown in FIGS. 22 and 23, extends vertically through a center section 393 in the shuttle body 294 below the slot 390, and opens in the bottom thereof. The bore 392 is counterbored at 394 to provide a small step in which a flange 396 in the top of a rivet guide tube 398 can be seated.

The slot 390 in the shuttle body 294 receives a rivet guide shoe 400 which is secured in place in the slot 390 by a screw 399. The guide shoe 400 receives a rivet sent from a conventional rivet blow feeder 405 (shown schematically in FIGS. 17 and 30) through a rivet supply line 401 to a rivet brake and staging tube 402 attached to the side 286 of the shuttle carrier 244. The rivet brake tube 402 is aligned with a hole 408 in the side 286 of the shuttle carrier 244, and is fastened thereto with screws 410. The rivet is guided by the rivet guide shoe 400 through a 90° bend and into the rivet guide tube 398 through which it is inserted into the hole drilled into the workpiece.

The rivet guide shoe 400 through the slot 412, as shown in FIGS. 15, 19, 20, 22, and 23, is a rectangular block 403 of aluminum having a projecting arm 404. A slot 406 is machined in the block 403 in the form of a quarter sector of a circle opening into the bottom and side of the block 403, and the inside surface of the slot 406 is coated with PTFE impregnated aluminum oxide to give a tough, low friction surface on which the rivets can glide smoothly around the slot when they are being fed into the holes in the workpiece. The slot 406 opens in the block 403 on the side facing the side 286 of the shuttle carrier 244 and, when the shuttle body 294 is in its rivet insert position, aligns with the hole 408 in the side 286 of the shuttle carrier 244. The slot 406 has a rounded or arched outside periphery to ensure stable travel of the rivet around the 90° bend of the slot 406. The outside periphery of the slot 406 at the bottom side of the block 403 has a cylindrical recess 411 to receive the top end of the flange 396 on the rivet guide tube 398 to ensure exact alignment of the rivet guide tube with the slot 406.

A slot 412 is cut horizontally into the rear end 312 of the shuttle body 294 just above the bottom edge 414 of the rear end 312 and extends all the way through the shuttle body 294 into the center section 393 below the recess 390. The slot 412 intersects both a rivet die cavity 415, shown in FIGS. 22, 24–27, and 29, and the bore 392. The slot 412 ends in an end portion 416 which forms an air plenum around the rivet guide tube 398 in the bore 392. The bore 392 is counterbored to produce a larger diameter lower portion 418 of the bore 392 approximately equal in diameter to the diameter of the tapered hole 362 in the pressure foot 296 at its top periphery. An annular space 420 thus exists between the enlarged diameter lower portion 418 of the bore 392 and the outside surface of the rivet guide tube 398 through which an annular curtain of air enters from the plenum 416 into the tapered hole 362 in the pressure foot 296 to guide a rivet through the hole 362, as will be described below.

The operation of the rivet feeding station of the shuttle is as follows: A rivet is sent by the rivet blow feeder 405 through the rivet supply line 401. The rivet is fed from the blow feeder while the shuttle body 294 is in its leftmost or drilling position, shown in FIGS. 16, 24, and 28, with the drill cavity 356 aligned with the machine axis. In this position, the arm 404 on the guide shoe 400, lying in a recess 422 in the side of the shuttle body 294, lies in line with and blocks the end of the rivet brake and staging tube 402 thereby forming an effective dead end in that tube. It is advantageous for the rivet blow feeder to feed the rivet through the rivet supply line 401 at high speed so that it can be staged and waiting at the arm 404 when the rivet feeding station of the shuttle is ready to receive the rivet, so no time is lost waiting for the rivet to arrive. However, it is necessary to slow the rivet velocity before it reaches the shuttle to prevent impact damage to the rivet when it hits the arm 404. To accomplish the high speed feed rate and the low speed arrival rate, the rivet brake and staging tube 402 has a series of holes 424 drilled laterally through the tube so air can exit the tube and an air flow be established to convey the rivet from the rivet blow feeder to the rivet brake and staging tube. When the rivet arrives at the tube 402, it runs into an air cushion created by the arm 404 blocking the end of the tube 402. The air cushion slows the rivet velocity so that it comes to a gentle rest against the arm 404. The holes 424 in the rivet brake and staging tube permit a flow of air behind the staged rivet at the arm 404 which provides the dynamic pressure to hold the rivet in place against the arm 404 until it is needed in the rivet feed station.

The rivet guide shoe 400 is coated with a tough, low friction coating such as teflon impregnated aluminum oxide so that when the shuttle moves and carries the arm 404 of the rivet guide shoe 400 across the end of the rivet brake and staging tube 402, it produces very low friction and no significant wear to the guide shoe or to the rivet.

Figure 17:
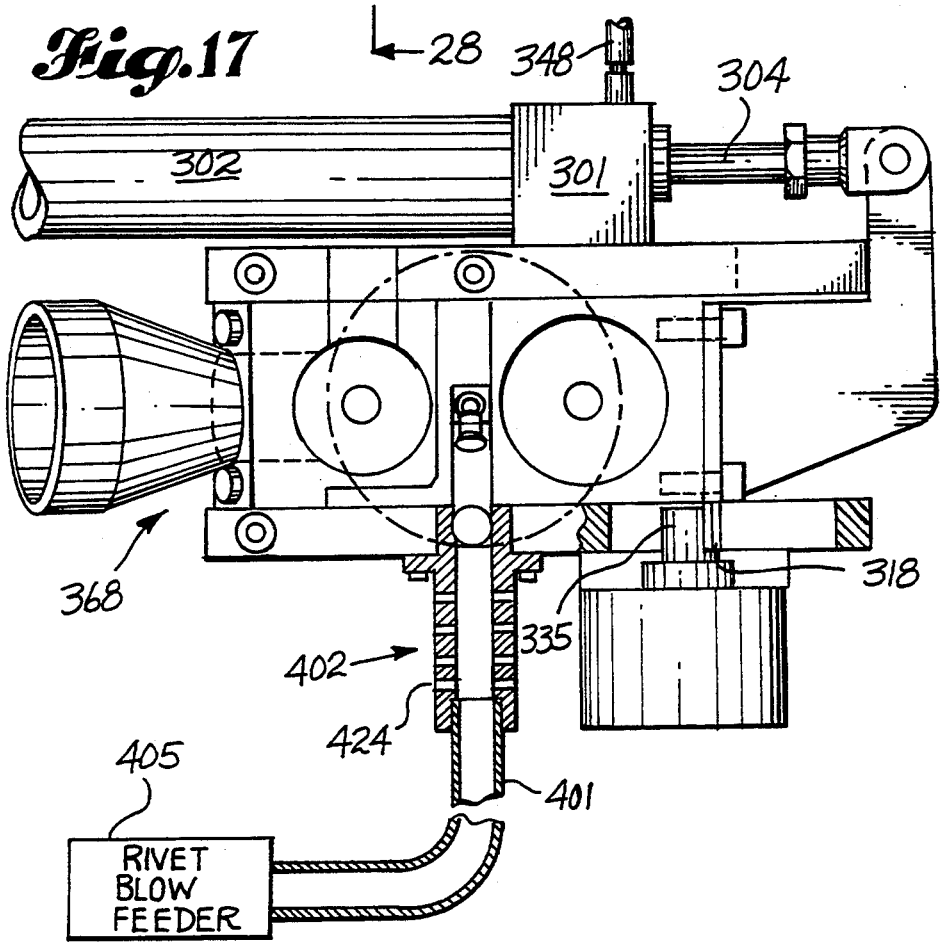
FIG. 17 is a plan view of the shuttle shown in FIG. 15 with the rivet insert station aligned with the axis of the machine.

After the hole has been drilled in the workpiece 34 and the drill retracted, the shuttle body 294 is moved leftward to the center position by pressurizing the cylinder 302 through the air line 348 and which causes the shuttle body to shift to the left in FIG. 15 until the ear 318 on the plate 316 engages the pin 335 on the midstop cylinder. At this position, the slot 406 in the rivet guide shoe 400 is aligned with the rivet brake and staging tube 402, as shown in FIGS. 17 and 20, and the air pressure in the rivet supply line 401 blows the rivet through the end of the rivet brake and staging tube 402 into the slot 406. Because of the holes 424 in the tube 402, the air pressure acting on the rivet to blow it into the slot 406 is very low, viz. on the order of 1 psi, so the rivet does not gain enough speed in the rivet guide shoe 400 to damage the workpiece as it enters the hole in the workpiece.

The rivet enters the slot 406 and, held against the circular, arched periphery of the slot by centrifugal force, slides around the surface and enters the rivet guide tube 398. The rivet guide tube 398 has a raised ear 426, shown in FIGS. 21 and 23, which has a curved top surface 427 curving from a top peripheral lip 428 to taper and blend smoothly with a bore 430 of the rivet guide tube 398. The width of the ear 426 is exactly the width of the slot 406, and the diameter of the bore 430 of the rivet guide tube is the same as the width of the slot 406 so that the rivet is guided into the rivet guide tube 398 without interference from any edges or obstructions of any kind. The rivet passes into the rivet guide tube 398 whose length is at least about ninety percent of the rivet length to stabilize the rivet and remove any angular momentum it may have when it enters the guide tube 398, so that when it passes out of the end of the tube 398 it will travel in a straight line without turning or rotating.

When the rivet nose exits from the end of the rivet guide tube 398, it enters the tapered opening 362 in the pressure foot 296. The sides of the opening 362 are too far apart to give any guidance to the nose of the rivet. Because the rivet head is larger in diameter than the leading nose, it is unstable when the pressure behind the head is greater than the pressure in front of the nose. This would normally cause the rivet to rotate within the confines of the rivet guide tube. After exiting from the rivet guide tube, the rotating rivet would strike the tapered hole 362 in the pressure foot 296, or the countersink of the hole drilled in the workpiece at an arbitrary point and possibly jam diagonally. If the rivet nose were to contact the countersink in this manner, it would be acted upon by the pressure differential, forcing the nose increasingly harder against the countersink as the airflow transitioned from dynamic to static. This would serve to place the entire pressure differential across the rivet with no line loss.

Accordingly, means are provided to guide the nose of the rivet straight into the hole in the workpiece and counteract any tendency of the rivet tail to drift off of the centerline 109 as it passes through the opening 362. This guide means is the air curtain blowing downward through the annular gap 420. The air curtain blows straight down through the gap 420 and then is converged inwardly toward the rivet shank by the converging sides of the hole 362. If the rivet tail starts to drift off center toward one side of the hole 362, the dynamic air pressure from the air curtain impinging against the side of the rivet shank closest to that side of the hole 362 will be greater than on the opposite side of the rivet shank, tending to straighten it back toward the centerline 109. Moreover, if the rivet is canted to one side in the rivet guide tube 398, there will be an air flow restriction on that side which results in a high pressure area on that side of the rivet relative to the opposite side, creating a force which tends to straighten the rivet along the axis of the rivet guide tube. Finally, there is a pressure drop from the air flow through the rivet hole resulting from suction applied, as discussed in more detail below, and shown in FIG. 28, through a buckside pressure nose 454 and the annular air flow creates a pressure in the cavity between the countersink and the rivet head. By adjusting the annular air flow, the cavity pressure at the moment the rivet hangs on the countersink can be such that the pressure differential acting across the length of the rivet is greatly reduced. This serves to enhance the effect described above by reducing the normal force at the rivet nose which results in reduced frictional resistance.

The vacuum source on the buck side unit 102 acts on the nose of the rivet as its brought in line with the hole in the workpiece 34 and serves to provide the required pressure differential to draw the rivet into the hole. It also greatly increases the annular air flow which is used before reaching the cavity pressure defined above which results in a greatly enhanced effect.

The converging annular curtain of air through the gap 420 is provided by air blown from the air plenum 416 through the slot 412, as shown in FIG. 15, between the end of the rivet guide tube 398 and the enlarged lower end 418 of the bore 392. The air enters the air plenum 416 from an air line 432 connected to a fitting 434 attached to the end plate 310. Air is delivered under pressure to the air line 432 from a connection (not shown) with the air line 348 to the retract side of the shuttle body cylinder 302 so that air is delivered to the air line 432 whenever the retract side of the air cylinder 302 is pressurized. Air is supplied through the fitting 434 on the end plate and a corresponding hole 436 in the stop plate 316 and hence into the slot 412 milled through the shuttle body 294.

After the rivet has been installed in the hole drilled in the workpiece, the shuttle body 294 is advanced to align the die cavity 415 with the machine axis. The shuttle body 294 is advanced by pressurizing the midstop cylinder 330 through the fitting 336 to withdraw the piston 334 and pull the pin 335 back into the pin guide sleeve 340 which allows the pressure in the air cylinder 302 to push the shuttle body 294 to its forwardmost position, shown in FIGS. 18 and 27, with the ear 318 of the stop plate 316 against the front face 324 of the opening 320 in the side 286 of the shuttle carrier 244.

Figure 29:
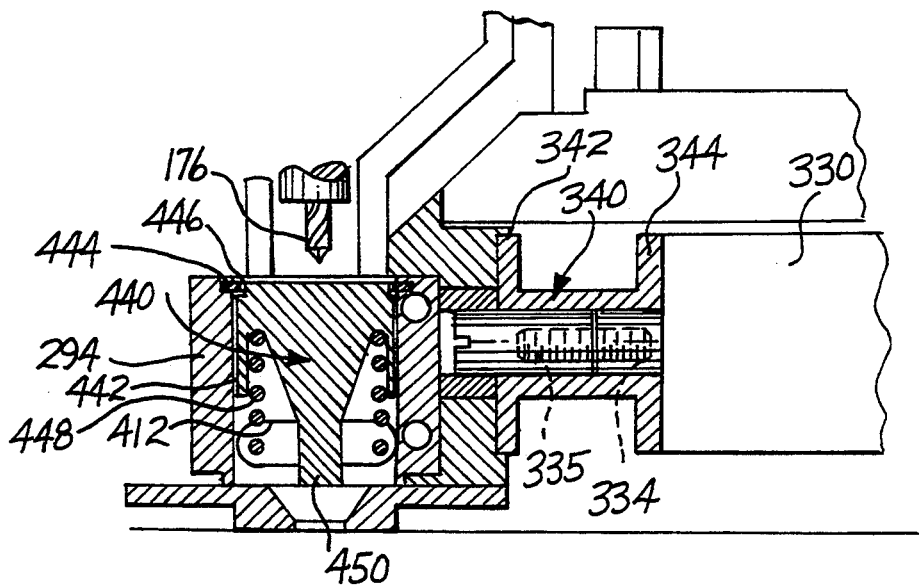
FIG. 29 is a partial sectional elevation along lines 29—29 in FIG. 18.

A rivet die 440, shown in FIGS. 15 and 29, is mounted in the rivet die cavity 415. The rivet die 440 has a cylindrical skirt 442 attached to the die near the top end thereof and depending downwardly in concentric relationship to the axis of the die 440. The outside diameter of the skirt 442 is just slightly smaller than the diameter of the rivet die cavity 415 and functions to guide the die to slide smoothly on the axial centerline 109 and ensure that it does not bind or become canted in the die cavity 415.

An annular groove 443 in the die cavity 415 near the top end thereof receives a snap ring 444 which cooperates with a cylindrical recess 446 at the top outside peripheral edge of the die 440 to hold the die from upward movement above the top surface of the shuttle body 294. The die is urged upwardly by a helical coil spring 448 so that the normal position of the die is at its uppermost position, with the shoulder of the recess 446 in contact with the snap ring 444 and the top surface of the die 440 flush with the top surface of the shuttle body 294. The die is proportioned lengthwise to position a nose 450 of the die 440 just above the lower surface of the shuttle body 294 to clear the pressure foot 296 when the shuttle body 294 moves.

In operation, the die 440 is carried by the shuttle body 294 into alignment with the machine axis when the pin 335 is withdrawn by the cylinder 330 to allow the shuttle body 294 to move to its fully leftmost position in FIG. 15, to the position shown in FIGS. 18, 27, and 29. At that position, the die 440 in the die cavity 415 is aligned with the machine axis 109 and the driver lower cylindrical portion 238. When a rivet is to be upset, the pop back cylinder 230 is depressurized to allow the recoil cylinder 246 to carry the electromagnetic riveter down as shown in FIG. 27, so that the lower end of the lower cylindrical portion 238 of the driver 203 is in contact with the top surface of the rivet die 440. The downward force exerted by the recoil cylinders 246 also compresses the coil spring 448 to allow the die 440 to descend through the pressure foot 296 into contact with the rivet. At this point there is now hard contact all the way from the coil 210, through the transducer 218, the driver 203 and the rivet die 440 to the rivet. Momentarily later, to ensure that the rivet is seated first by the headed side die, the buck side die 520 is brought into contact with the nose of the rivet, and the corresponding structure from the electromagnetic riveter on the buckside unit is similarly in hard contact with the nose of the rivet. The machine is now ready to upset the rivet.

The electromagnetic riveters on both units are now actuated to produce a force stroke against the rivet dies on both sides of the rivet to upset the rivet. The timing of the force stroke on both sides of the rivet and the magnitude and duration of the force stroke on the two sides are adjustable so as to produce the optimum force pulse on each side of the rivet, optimized for the particular rivet being upset. Rivets of different kinds and different kinds of workpieces sometimes will require different combinations of timing, magnitude and duration of the force pulse on the dies on the two sides of the rivet, and this will be discussed in more detail below.

Figure 30:
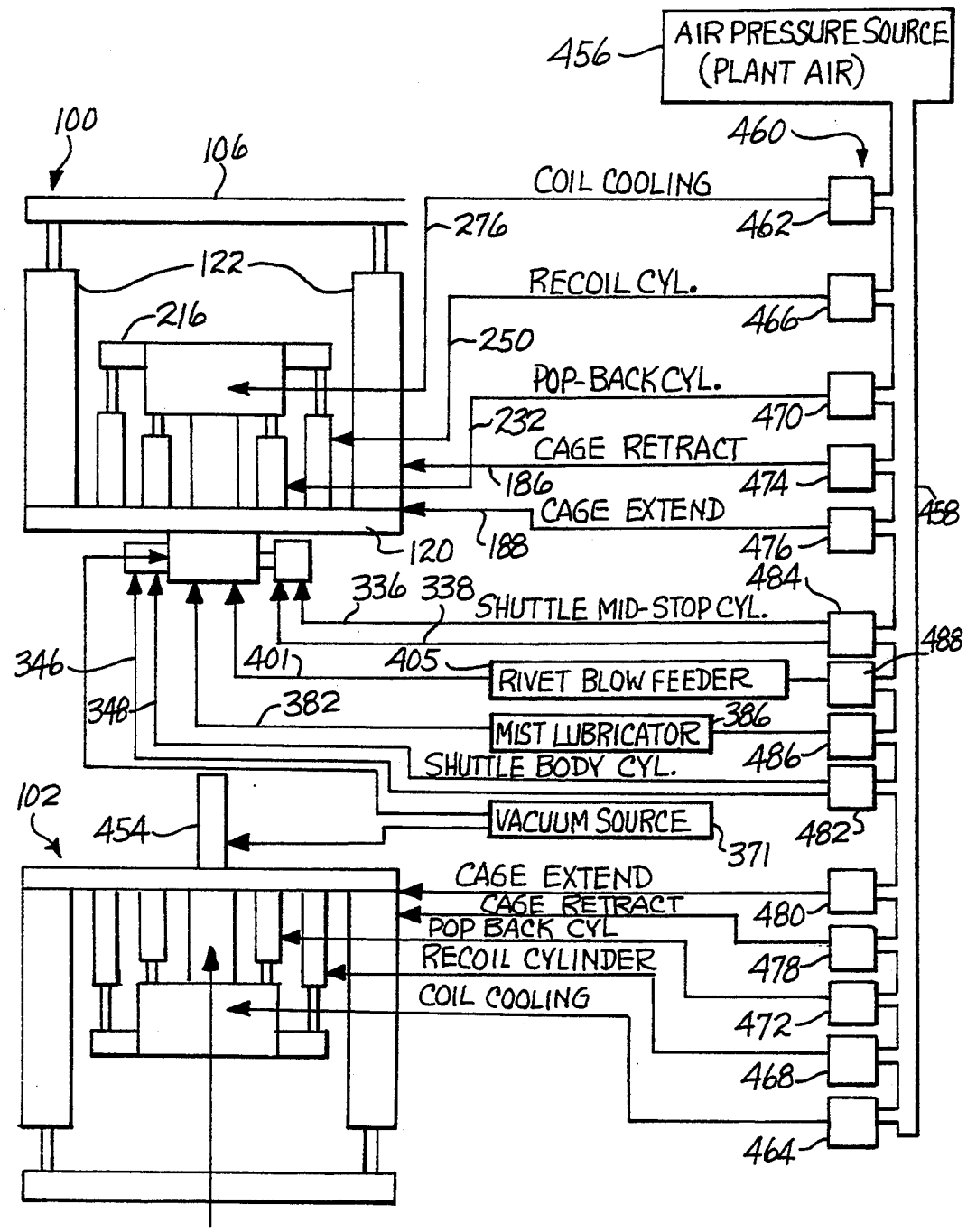
FIG. 30 is a schematic diagram of the pneumatic system for controlling the motive functions of the machine.

Turning now to FIG. 30, the pneumatic actuating system for control of the pneumatic motive elements in the machine is shown schematically. All of the pneumatic elements are powered by air pressure provided by an air pressure source 456 such as plant air existing in the plant in which the riveter is to be installed. The air pressure source 456 is connected in parallel through an air supply line 458 to a bank of solenoid air valves 460 which control the flow of air to the pneumatic elements in the machine. The valves 460 are solenoid operated under the control of the end effector controller 80, to be described below.

The flow of cooling air through the air line 276 on the drill rivet unit 100 is controlled by a spring return, single solenoid 462, and the corresponding cooling air flow to the coil on the rivet buck unit 102 is controlled by a similar spring return single solenoid 464. The air pressure to the recoil cylinder 246 is controlled by a similar spring return single solenoid 466 on the drill/rivet unit 100, and a spring return single solenoid 468 on the rivet buck unit 102. These coil cooling and recoil air solenoid valves are always on or open to provide air flow whenever the riveter is turned on. Likewise, the vacuum source 371 is always turned on when the unit is on, except if a malfunction occurs and the vacuum is not needed in which case it is timed to turn off in about four seconds.

Air supply to the air line 232 for the pop back cylinders 230 is controlled by a detented double solenoid 470, and the corresponding function on the rivet buck unit 102 is provided by a similar detented double solenoid 472. The detented double solenoids are used on the pop back cylinders to insure that, if power is lost, the solenoid will remain in its detented position so that when power is restored to the machine the position of the pop back cylinder will remain as it was when the power went off. This facilitates the initialization of the machine and prevents the various moving parts from moving into interfering positions with respect to each other.

The cage cylinders 122 are controlled by two separate solenoids. Air flow to the retract side of the cage cylinders through the air line 186 is controlled by a spring return single solenoid 474, and air flow to the cage extend side of the cylinders 122 through the air line 188 is controlled by a spring return single solenoid 476. Similarly, the cage retract function on the rivet buck side 102 is controlled by a spring return single solenoid 478 and the cage extend air flow is controlled by a spring return single solenoid air valve 480.

Air flow to the pneumatic motive elements for the shuttle is controlled by a detented double solenoid 482 for selectively pressurizing the shuttle body cylinder 302 through air lines 346 to move the shuttle body to the extreme right most position in which the drill cavity 356 is aligned with a machine axis 109, or toward the extreme left most position when pressurized through air line 348 to move the shuttle body to its left most position in which the rivet die cavity 415 is aligned with the machine axis 109. Another detented double solenoid 484 controls the air flow to the air lines 336 and 338 of the mid stop cylinder 330.

The air through the air nozzle 378 provided through air line 382 is controlled by a spring return single solenoid 486. The lubrication metering pump 386 is triggered and powered by the air pressure in the line 382 and pulses once when the solenoid 486 is activated. The metering pump 386 does not inject another drop of lubricant until the solenoid 486 is turned off and then turned on again.

The air to the rivet supply line 401 which conveys rivets from the rivet blow feeder 405 is controlled by an air solenoid 488 incorporated in the rivet blow feeder 405 as part of the conventional device.

Figure 31:
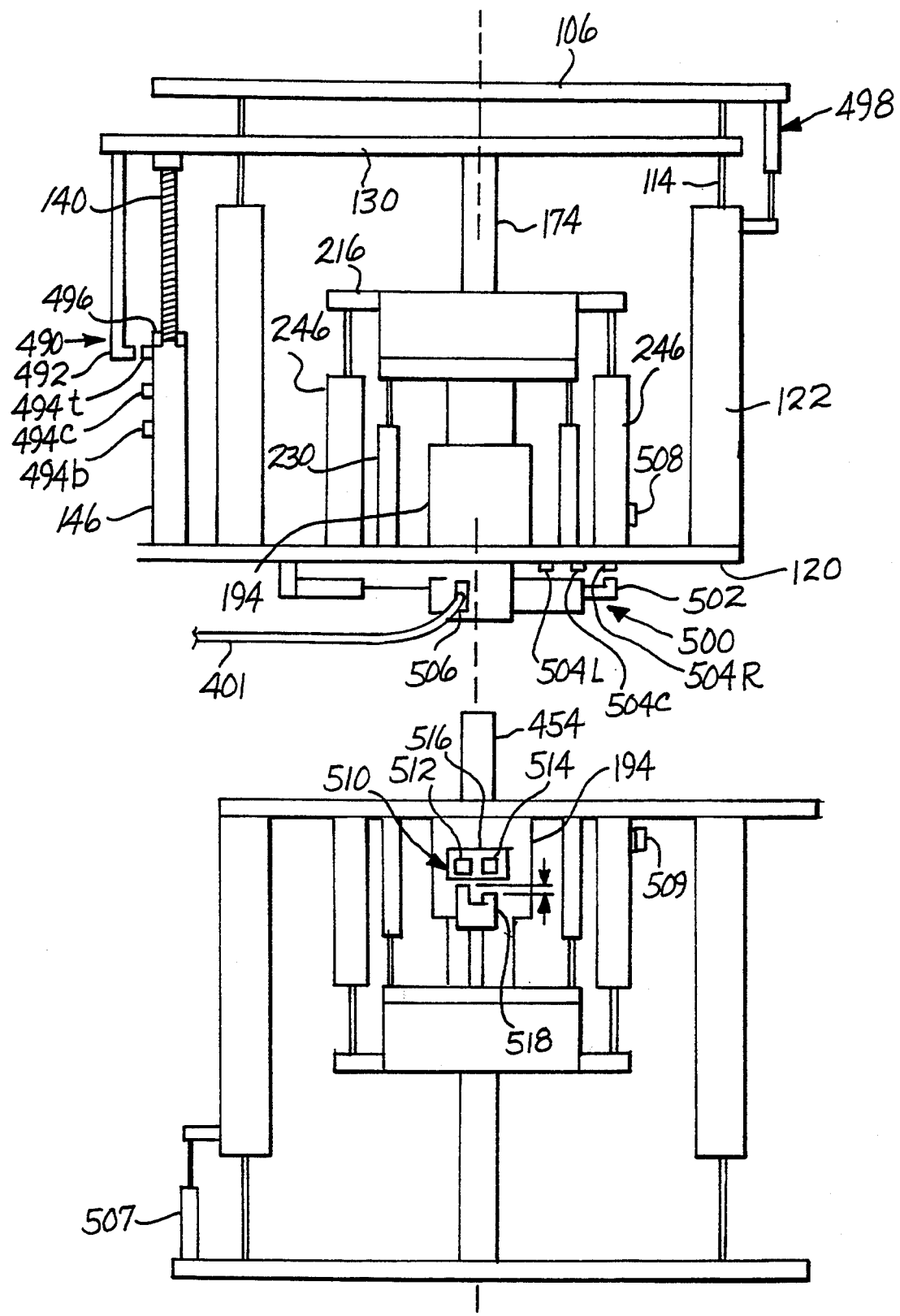
FIG. 31 is a schematic drawing of the sensor suite for the drill/rivet machine shown in FIG. 6.

The sensors which provide feedback to the end effector controller 80 about the position and other conditions of the end effectors 40 are shown in FIG. 31. This sensor suite includes a feed limit switch 490 having a vane 492 attached to the middle plate 130 and a series of three hall effect switches 494 to sense the presence of the vane and thereby indicate when the middle plate 130 has arrived at the three positions, for a purpose that will be explained below. A thrust sensor 496 is positioned at the top of the ball screw receptacle 146 to sense the thrust exerted by the ball screw 140, and hence the pressure exerted by the point of the drill bit 176 on the workpiece. A linear potentiometer 498 is attached to the top plate 106 and has a plunger attached to the cage cylinder 122 for measuring the extension of the cage. A shuttle position switch 500 includes a vane 502 and three hall effect switches 504 positioned to register the presence of the vane when the shuttle body, to which the vane is attached, moves to the drill, rivet insert, and rivet position respectively.

A proximity switch 506 is positioned around the rivet supply tube 401 for detecting and signaling when a rivet passes through the tube on its way to its staged position in the rivet brake and staging tube 402.

The rivet buck unit 102 has a cage linear potentiometer 507 which is identical to the linear potentiometer 498 for the drill/rivet unit 100 and performs the same function. The rivet buck unit does not have a feed limit switch like the switch 490 on the drill/rivet unit 100 since it does not have the middle plate 130 and the drilling equipment supported by the middle plate 130 in the drill/rivet unit 100. Similarly, the rivet buck unit 102 does not have a shuttle and so lacks the shuttle position sensor 500 which is on the drill/rivet unit 100. A gravity sensor 508 is fastened to one of the recoil cylinders 246 on the drill/rivet unit 100, and a similar gravity sensor 509 is fastened to one of the recoil cylinders on the rivet buck unit 102. The gravity sensors 508 and 509 provide information to the end effector controller 80 regarding the orientation of the machine relative to the direction of gravity. The end effector controller 80 uses this information to adjust the pressure regulator in the solenoids 466 and 468 to account for the changes in weight hanging on the recoil cylinder when the machine is moved by the robot 30 to change the orientation of the machine relative to the direction of gravity. Since the pressure in the recoil cylinders is adjusted to provide the desired stroke and recoil force when the electromagnetic riveter is actuated, and also to provide the differential force which insures that the rivet is held in its countersunk hole on the drill/rivet side while the length of the rivet is measured by a rivet length sensor 510 on the rivet buck side, it is desirable that the proper force differential be maintained despite the change in orientation of the machine. In the absence of an adjustment of air pressure in the recoil cylinders, it would be necessary to build in a larger pressure differential to account for the changes in force exerted on the recoil cylinders and if that were done it would be more difficult to optimize the recoil cylinder pressure to achieve the desired recoil stroke and recoil force during the recoil of the electromagnetic riveter.

The rivet length sensor 510, shown schematically in FIG. 31, has two hall effect switches 512 and 514 mounted on a flat area 516 milled onto the outside wall of the quill bearing support member 194. A vane 518 is fastened to the transducer shroud 273 and the length of the vane 518 and the position of the hall effect switches 512 and 514 is arranged to indicate if a rivet inserted into a hole in the workpiece is too long or too short. This is accomplished in the normal riveting cycle and operates as follows. After the rivet is inserted into the hole in the workpiece by the shuttle at the insert position, the shuttle moves to the rivet position as shown in FIG. 29. The pop back cylinders 230 are depressurized and the recoil cylinders 246 pull the electromagnetic riveter down to press the lower cylindrical end 248 of the driver against the die 440. This compresses the spring 448 and presses the nose 450 of the die 440 against the top of the rivet, as shown in FIG. 27.

The pop back cylinders on the buck side unit 102 are likewise depressurized, allowing the recoil cylinders to pull the electromagnetic riveter toward the bottom plate to push the lower cylindrical portion of the driver, in which a rivet die 520 is mounted, through the pressure nose 454 and against the nose of the rivet. The pressure in the recoil cylinder on the rivet buck side unit 102 is less than the pressure in the recoil cylinders in the drill/rivet unit 100 so that the rivet die 440 on the drill/rivet 100 holds the rivet seated in a fixed reference position which, in this case, is the counter-sunk hole drilled in the workpiece 34. Thus, the axial position of the rivet die 520 in the buck side unit 102, when in contact with the nose of the rivet in the workpiece 34, accurately reflects the axial extension of the rivet through the workpiece 34. By measuring the axial position of the driver on the buck side unit 102, it is possible to get an accurate measurement of the length of the rivet in the workpiece 34 held seated in the countersunk hole by the rivet die 440 on the drill/rivet unit 100.

The two Hall effect switches 512 and 514 are spaced apart a distance equal to the length tolerance for the rivet. Thus, if the vane 518 fails to reach the first Hall effect switch 512, that indicates that the rivet is too long because the long rivet stops the rivet die and the associated driver and transducer on the buck side unit 102 from extending far enough to carry the vane 518 into the Hall effect switch 512. When the vane reaches the Hall effect switch 512 but has not reached the Hall effect switch 514, that indicates that the rivet is within the required tolerance. When the vane 518 reaches the Hall effect switch 514, that indicates that the rivet is too short, that is, falls outside of the length tolerance of the rivet, because it has allowed the rivet die and associated driver and transducer on the buck side 102 to extend far enough to reach the Hall effect switch 514.

A typical length tolerance for a rivet would be on the order of 0.060". With a length tolerance that small, it is convenient to mount the hall effect switches 514 and 512 at equal axial positions on the quill bearing support 194, as shown in FIG. 31, and use two vanes of different length, differing in length by the permissible length tolerance of the rivet. In this arrangement, a rivet within length tolerance would be registered when the long vane would have entered the hall effect switch 512, but the short vane had not entered the Hall effect switch 514.

When a rivet that is outside the length tolerance is sensed, it must be removed from the hole in the workpiece 34 and replaced with a properly sized rivet, because a long or short rivet will not produce an acceptable rivet when upset by the riveter. The rivet recovery sequence is described below.

The operation of the machine will now be described in connection with the system logic schematic in FIGS. 32 A-F. When the machine is first turned on, the system software initializes the components by moving them in a predetermined sequence to a position in which the cycle may be started without danger of the components clashing by moving into interfering positions. In initialization, the cage 104 is retracted, the middle plate 130 is withdrawn to its uppermost position, the recoil and pop back cylinders are pressurized, and the pistons in both the shuttle cylinder and then the shuttle midstop cylinder are extended, in order.

With the components initialized, the machine executes a routine to teach the end effector controller what the revolution number and angle of the drill feed ball screw is when the tip of the drill bit is in contact with the plane of the workpiece surface. To accomplish this, the cages 104 are extended to clamp the part and the drill spindle is advanced until the drill bit contacts the workpiece, as indicated by the thrust sensor 496. The feed motor is then reversed and retracts the drill spindle until the vane 492 enters the center Hall effect switch 492c. The number of rotations of the feed screw is counted in a spindle rotation counter and angular position indicator (not shown) in the drill motor, and that number is recorded in the memory of the end effector controller 80, so the controller 80 knows exactly how far it is from that reference position to the workpiece. Likewise, the depth of the countersink can be preset by clamping a coupon with a countersink of the correct depth, and repeating the above procedure. The drill is then instructed to drill to that same depth (i.e. the same number of revolutions of the ball screw and to the same angle on the last revolution) to redrill to the same countersink depth.

The distance (i.e. the number of revolutions of the drill feed ball screw 140) from the plane of the workpiece is already recorded in the controller memory, so the controller 80 can instruct the feed motor to retract the drill bit to a "ready" position in which the tip of the drill bit lies just above the plane of the top surface of the shuttle body 294. At this position, the drill bit does not interfere with the shuttle body when it slides from the drill position to the rivet insert position and rivet upset position, but it is close to the workpiece to minimize cycle time.

The top and bottom Hall effect switches 494t and 494b are "soft" upper and lower limit positions for the drill, to prevent it from retracting or extending to, and jamming against, the top or bottom structural limits of the equipment.

After the components are initialized the cycle is started. At cycle start, the charging of the capacitors of the electromagnetic riveter power circuit is started, as will be described in more detail below in connection with the machine control system. Simultaneously, the spindle is turned on and the feed motor is energized to rapidly advance the middle plate toward the bottom plate. The vacuum is turned on and the shuttle midstop cylinder is pressurized to extend the midstop pin 335. A message is sent to the rivet blow feeder to send a rivet through rivet supply line 401 toward the shuttle.

A series of adjustable delays is built into the controlling software to provide a time period in which certain actions can take place. This is a control methodology which assumes that, once initiated, a process or action will be carried out within a certain maximum time period, and if that action is not completed within the given time period then a problem is presumed. The EMR charging circuit is given about four seconds to reach full charge, although it normally takes less than three seconds. If the capacitors have not been fully charged within four seconds, an error message is generated by the software and the machine is shut down to permit the operator to determine what has happened.

The cage extend command initiates a timed period of about one second in which the cage is given to extend and contact the part. The end effector controller 80 recognizes part contact when the linear potentiometer 489 on both the drill rivet unit and the buck side unit indicate full extension to the location of the part. If the full extension signal is not received by the end effector controller 80 from the linear potentiometers 489, an error message is generated and the machine shuts down for service by the operator. A time period is initiated after the rivet blow feeder is directed to send a rivet to allow the rivet to travel the length of the rivet supply line 401 and be registered on the rivet proximity switch 506. If the rivet is not sensed within the set time period, the machine automatically shuts down for intervention by the operator.

The cage is given a certain amount of time to settle after contacting the part, and then mist lubrication air flow is turned on by energizing the solenoid 486 which actuates the metering pump 386 to inject a drop of lubricant into the air line 382 to blow mist lubricant into the drill cavity 356 and onto the drill bit 186 which is parked at the lower end of the drill cavity 356. The drill feed motor is then turned on again to advance the drill at drilling speed toward the workpiece. As the drill bit drills into the workpiece, the thrust sensor 496 is monitored by the end effector controller 80 to insure that the thrust level registers within a predetermined range. A thrust that is too low indicates that the drill bit is broken and is not contacting the part. A thrust that is too high indicates that the bit is dull and is not cutting fast enough. In either case, a message is recorded on the system monitor for the operator to investigate.

After the hole and countersink are drilled the system may be preprogrammed to dwell at depth to insure that the countersink is drilled cleanly. If the drill feed system is under damped for maximum drilling speed, the dwell at depth feature may be dispensed with since the drill bit would have slightly overshot the lower most static position and would merely turn in the air at the dwell position. If the system is over damped the dwell at depth feature will result in a very smoothly finished countersink.

While the hole is being drilled, the vacuum and mist air is on to remove the drill chips from the drill cavity. The lubrication only flows momentarily, but the air through the line 382 continues to blow to swirl the chips in the drill cavity 356 to facilitate their suction through the suction port 366. At the end of the drilling sequence, the mist air is turned off by deenergizing the solenoid 486, but the vacuum is maintained on so that the rivet will be drawn into the hole drilled by the drill in the workpiece when the rivet is feed to the rivet feeding station, as will be described below.

The drill is now retracted to its home position and, when the revolution counter in the drill motor recognizes that it has reached home position, the end effector controller 80 operates the air solenoid 482 to deliver pressurized air to the opposite end of the shuttle body cylinder 302 through the air line 348 to retract the piston and the piston rod 304 into the cylinder 302 and move the shuttle body 294 to the limit provided by engagement of the ear 318 against the midstop pin 335. When the shuttle body moves to the rivet insert position, the vane 502 on the shuttle body moves into the center Hall effect switch 504c and indicates to the end effector controller 80 that the shuttle body is at the insert position.

At the insert position, the rivet guide tube 398 in the rivet guide shoe 400 is aligned with the machine axis 109 and the rivet guide chute 406 in the rivet guide shoe 400 is aligned with the rivet brake and staging tube 402. The rivet, which has been staged at the end of the rivet brake and staging tube 402, is now propelled by the low air pressure at the end of the tube 402 into and around the rivet chute 406, through the rivet guide tube 398, and across the gap through the pressure foot 296. As it jumps through the hole 362 in the pressure foot 296, the rivet is guided by the annular air curtain blowing through the gap 420 at the end of the guide tube 398, and is drawn into and seated in the countersunk hole in the workpiece 34 by the vacuum in the pressure nose 454 on the rivet buck side unit 102.

The system controller sets a time period to allow the rivet to travel from its staged position at the arm 404 through the rivet guide shoe and into the drilled hole in the workpiece. At the end of this time period, the end effector controller 80 operates the solenoid 484 to pressurize the cylinder 330 through the air line 336 to withdraw the pin 335 and allow the cylinder 302, already pressurized from the previous step, to move the shuttle body 294 to its left most or forward position in which the rivet die cavity 415 is aligned with the machine axis 109. At that position, the vane 502 moves into the left most switch 504L and the controller recognizes that the shuttle body is in the correct position for upsetting the rivet installed during the rivet insert step. If the shuttle fails to move to the rivet position within a time period set in the controller software, typically about 0.3 seconds, an error message is generated and the machine shuts down for operator correction of the failure.

With the shuttle at the rivet upset position, the pop back cylinders 230 are depressurized by the solenoid 470 which cuts off the supply of pressurized air to the pop-back cylinders and vents the cylinders to room air pressure. The recoil cylinders 246 can now pull the EMR support 216 plate down toward the bottom plate 120, bringing the driver lower cylindrical portion 238 down against the die 440 and holding it in a reference position, viz. pressing the head of the rivet in the countersunk hole in the workpiece 34. At the same time, the pop back cylinders on the buck side unit 102 are likewise depressurized in the same manner and the rivet die 520 in the pressure nose 454 moves against the nose of the rivet where it is stopped by the higher air pressure in the recoil cylinders 246 on the drill rivet unit 100 acting through the rivet die 440 on the rivet head.

The end effector controller 80 at this time recognizes the position of the vane 518 of the rivet length sensor relative to the Hall effect switches 512 and 514 to determine whether the rivet length is within tolerance. If it is not, the system controller initiates a rivet recovery sequence.

The rivet length sensor can be used with other types of rivets, as well as with the headed rivets discussed herein. Slug rivets, for example, which do not have heads at all, can be measured by establishing a reference position on one side of the workpiece, at which one end of the rivet can be located, and then measuring the length of the rivet with the other rivet die in the same manner as described above. The reference position can be established by, for example, locating the rivet die at some fixed, known position and using the rivet die surface as the reference position.

Figure 32B:
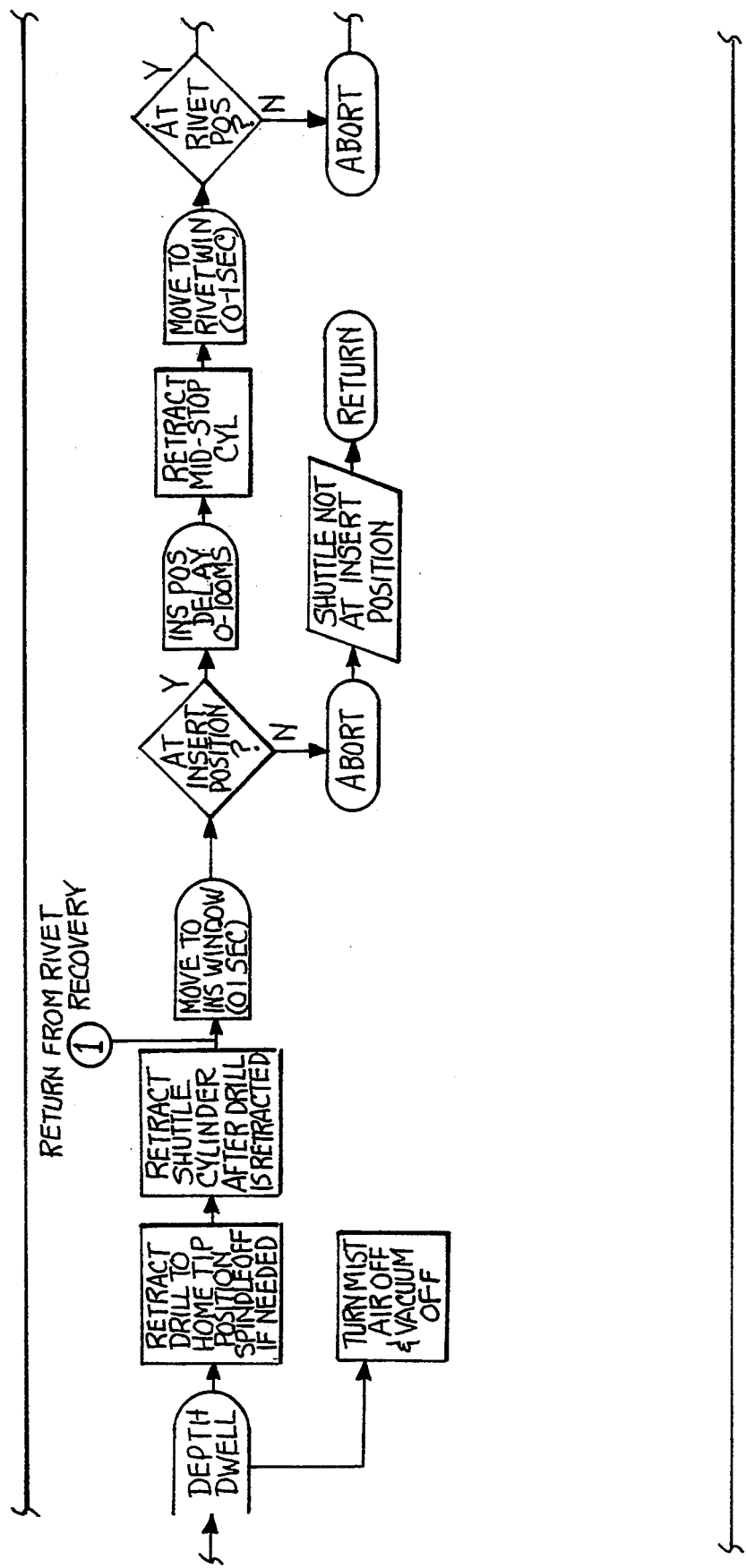
FIGS. 32A–F are sections of a logic diagram and operation sequence chart for the drill/rivet machine of this invention.
Figure 32C:
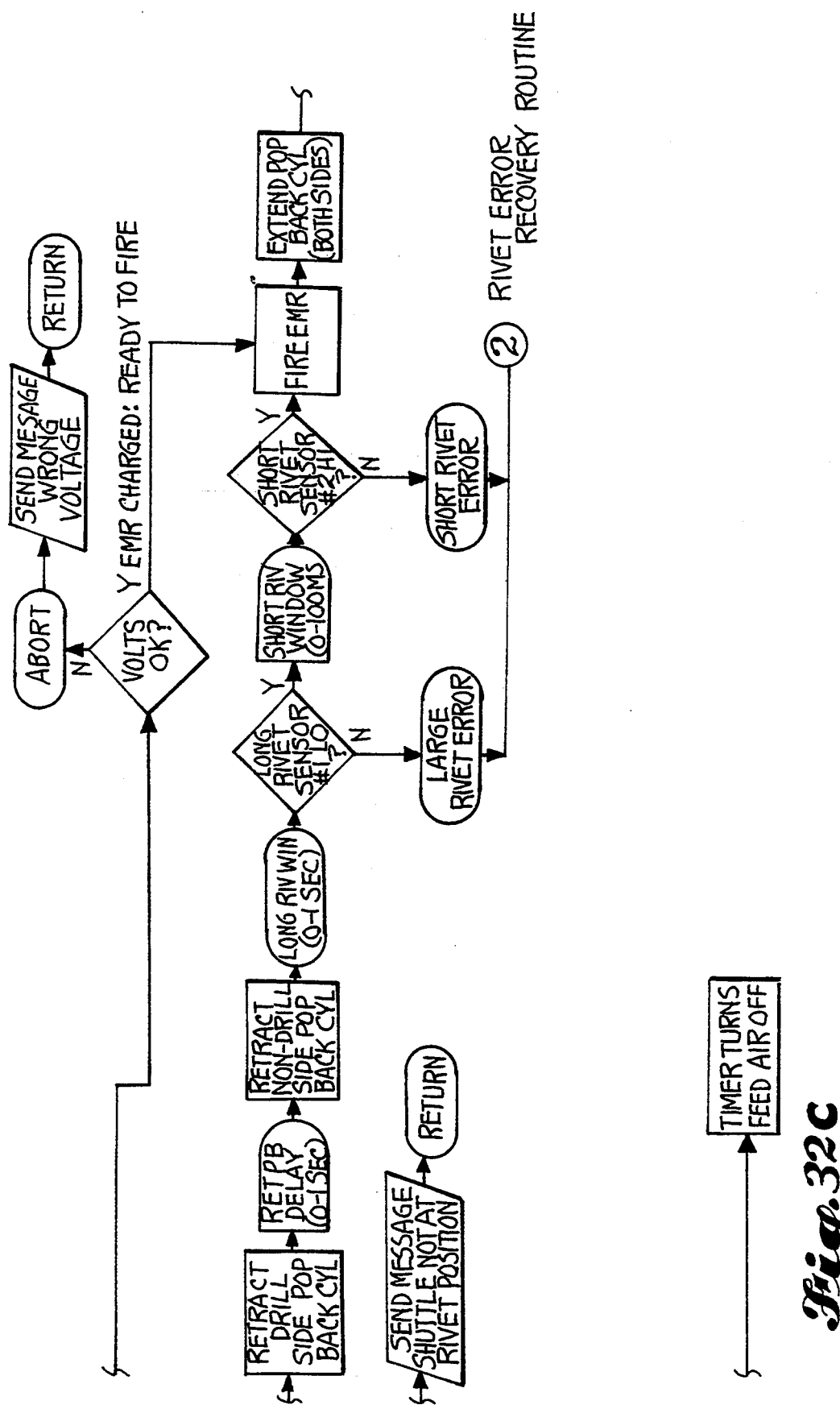
Figure 32D:
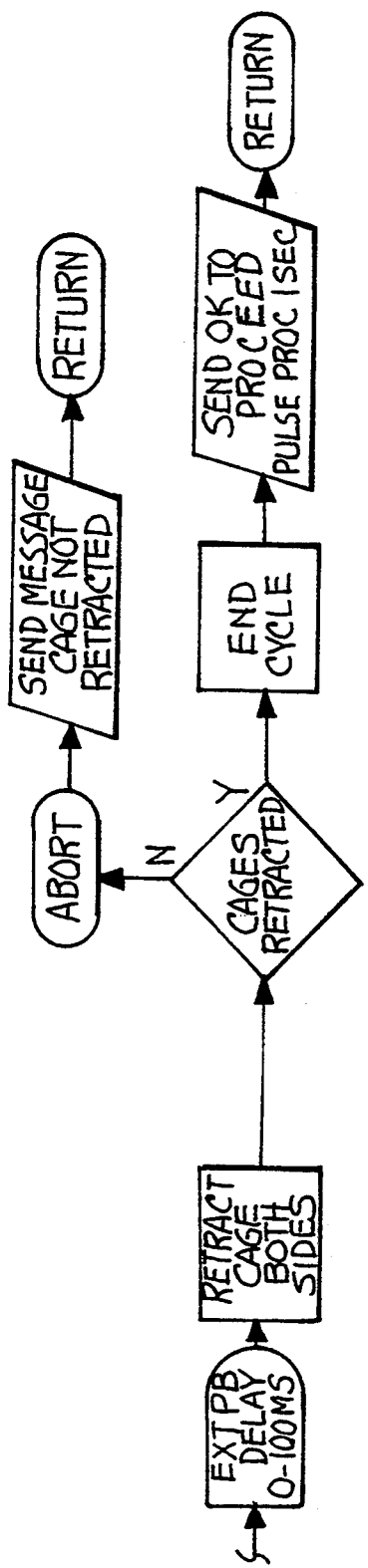
Figure 32E:
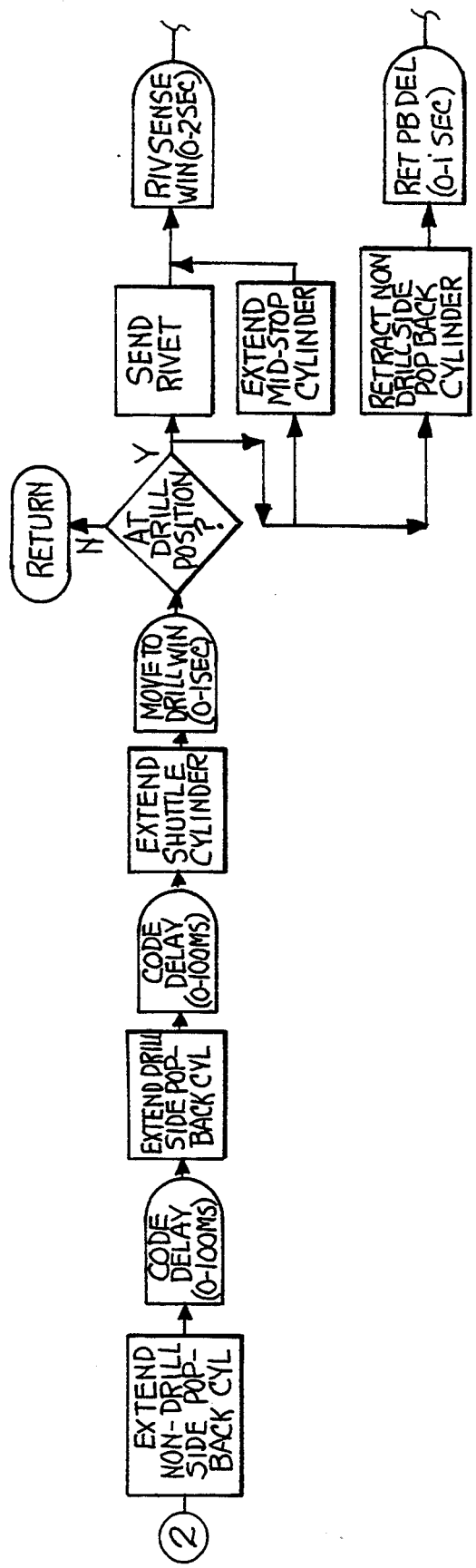
Figure 32:
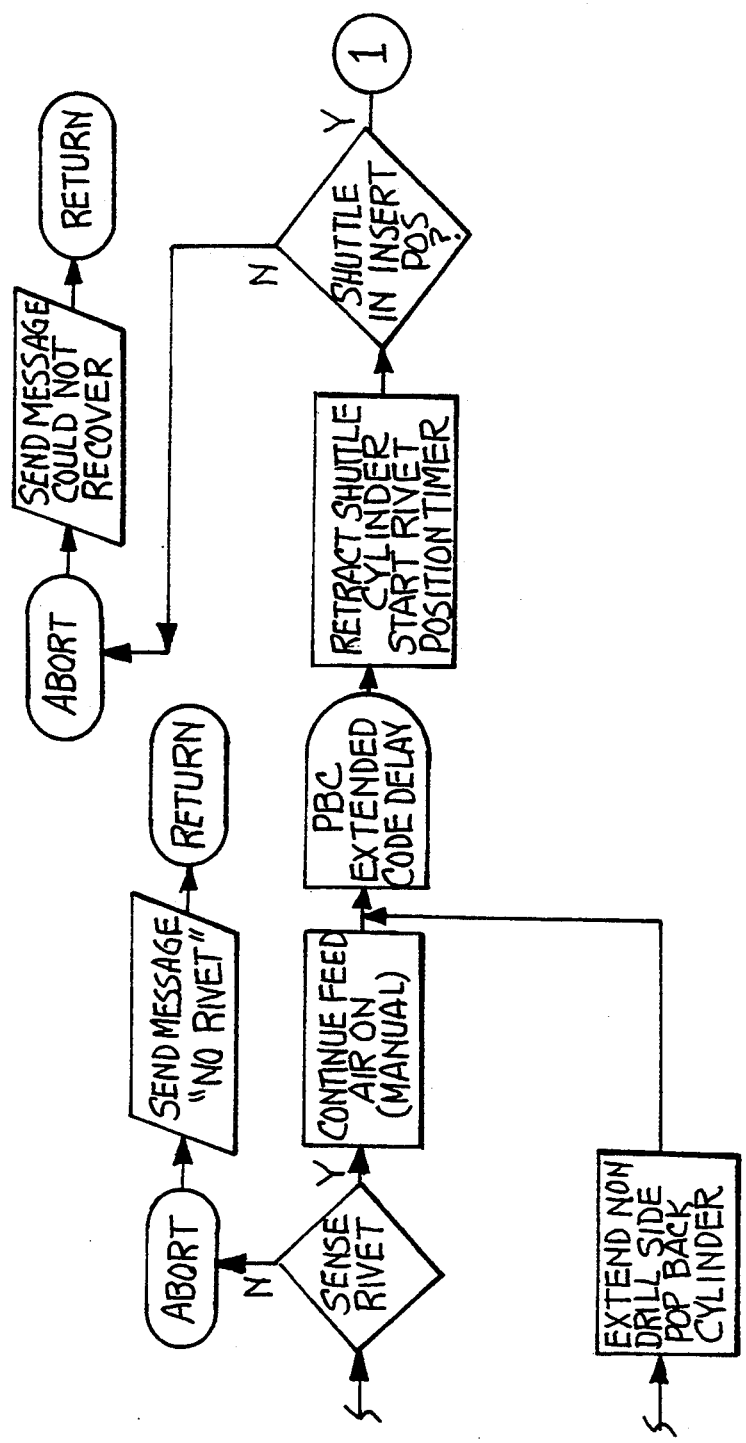

The rivet recovery sequence is illustrated in FIGS. 32E and 33. In FIG. 33A, the machine is shown schematically with both dies 440 and 520 in contact with the rivet. The die 440 presses the rivet into the countersunk hole in the workpiece 34 and the rivet measurement is made by the rivet length sensor 510 on the rivet buck unit 100. Assuming that the rivet was either too long or too short, the end effector controller 80 recognizes an error and initiates the rivet recovery sequence. The first step of the rivet recovery sequence, illustrated in FIG. 33B, is to retract the die 520 away from the rivet on the rivet buck unit 100 by extending the pop back cylinder on that side, while maintaining the vacuum to the pressure nose 454 to hold the rivet in place in the countersunk hole in the workpiece 34.

As shown in FIG. 33C, the second step is to retract the die 440 on the drill/rivet side by extending the pop back cylinders 230 on that side. While the vacuum in the pressure nose 454 holds the rivet in place, the shuttle is moved to the drill position in which the drill cavity is aligned with the machine axis, as shown in FIG. 33D. A rivet is sent from the rivet blow feeder 405 and is staged in the rivet brake and staging tube 402.

Meanwhile, the buck side die 520 is extended, as shown in FIG. 33E, by depressurizing the pop-back cylinder on the buck side unit to push the rivet out of the countersunk hole in the workpiece 34. The rivet die 520, at its fully extended position, blocks the hole in the workpiece 34 so that the vacuum applied to the pressure nose 454 no longer acts to pull the rivet downward into the hole. In its extended position shown in FIG. 33E, the rivet is easily withdrawn by the vacuum applied to the vacuum port 366 and the rivet is sucked out through the vacuum port and disposed of in the chip bin. The buck side rivet die 520 is now retracted by extending the pop back cylinder on that side. The shuttle body 294 is moved to the rivet insert position by pressurizing the cylinder 302 through the air line 348 and retracting the piston rod 304 until the ear 318 engages the stop pin 335, and the new rivet, sent from the rivet blow feeder and waiting at the end of the rivet brake and staging tube 402 against the arm 404, is fed into the hole 34 whereupon the cycle is resumed.

Figure 35:
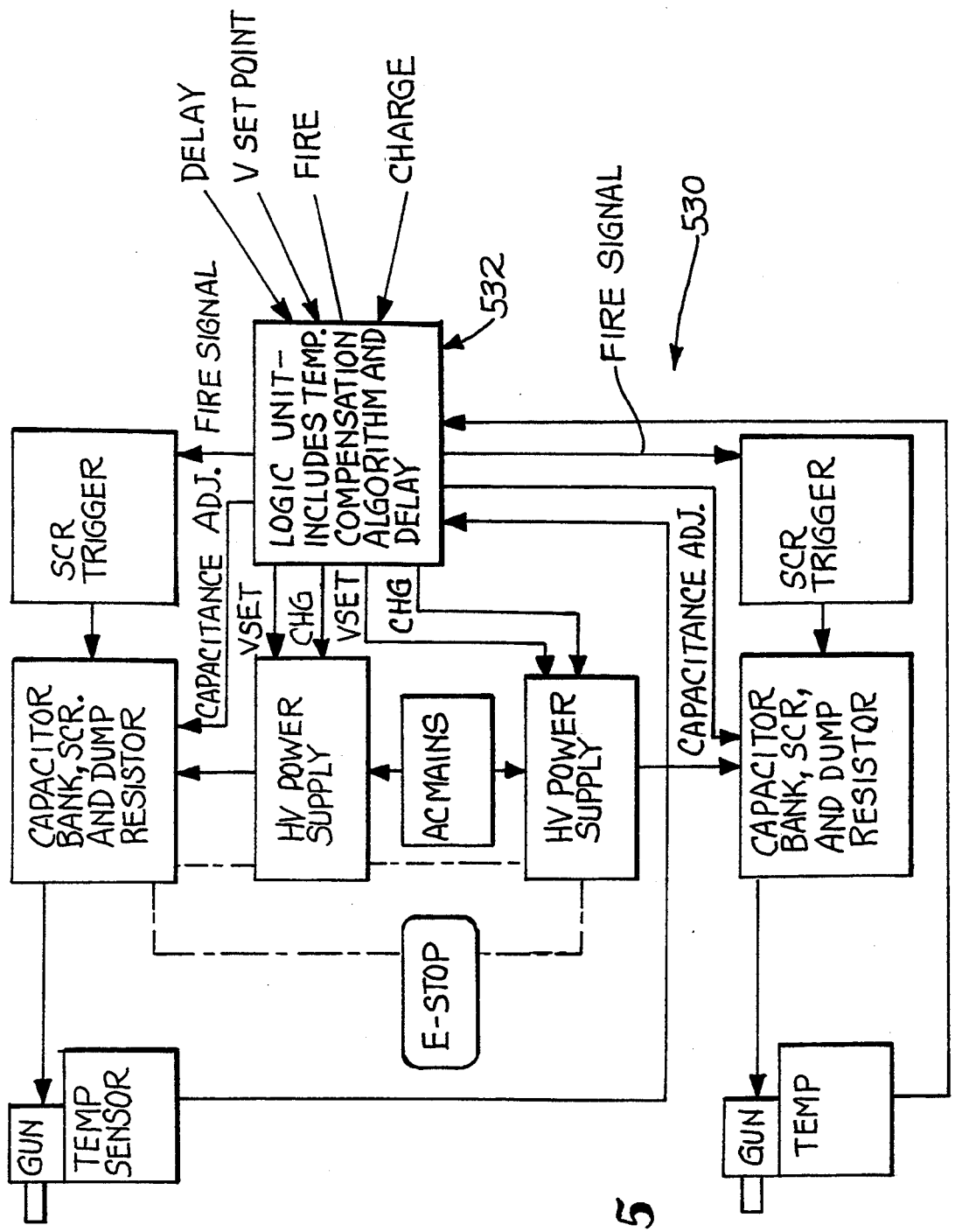
FIG. 35 is a schematic diagram of the control system for the electromagnetic actuator in the drill/rivet machine of this invention.

After the end effector controller 80 has checked the rivet length to insure that the new rivet is within length tolerance, the system controller sends a message to the electromagnetic riveter controller 530, shown schematically in FIG. 35, to initiate or "fire" the actuator in the electromagnetic riveter. The controller 530 for the electro-magnetic riveter will be described below.

After the rivet has been upset by the electromagnetic actuators driving the rivet dies 520 and 440 against the nose and head of the rivet, the pop back cylinders on the drill/rivet unit 102 and the rivet buck unit 100 are extended to allow the spring 448 to lift the die 440 to the top of the rivet die cavity 415, and retract the buck side rivet die 520 into the pressure nose 454. A delay of about 0.25 seconds is programmed into the program software to provide sufficient time for the recoil and rebound of the electromagnetic riveter to subside before the clamping pressure of the cage is released, to prevent any damage to the workpiece that could be caused by the movement of the pressure foot 296 while the cage is unclamping.

The cages on both the drill rivet unit 102 and the rivet buck unit 100 are now retracted by pressurizing the cage cylinders 122 through the lines 186 to release the clamping pressure on the workpiece. When the end effector controller 80 recognizes that the cages are retracted, by a signal from the linear potentiometers 498 and 507, end effector controller 80 signals that the riveting operation is complete, and the system controller 48 sends a message to the positioner 30 to shift the position of the part and or the carrier 36 to reposition the end effectors 40 to the new position on the workpiece where the next set of rivets is to be installed. The cycle is then started again.

Figure 34:
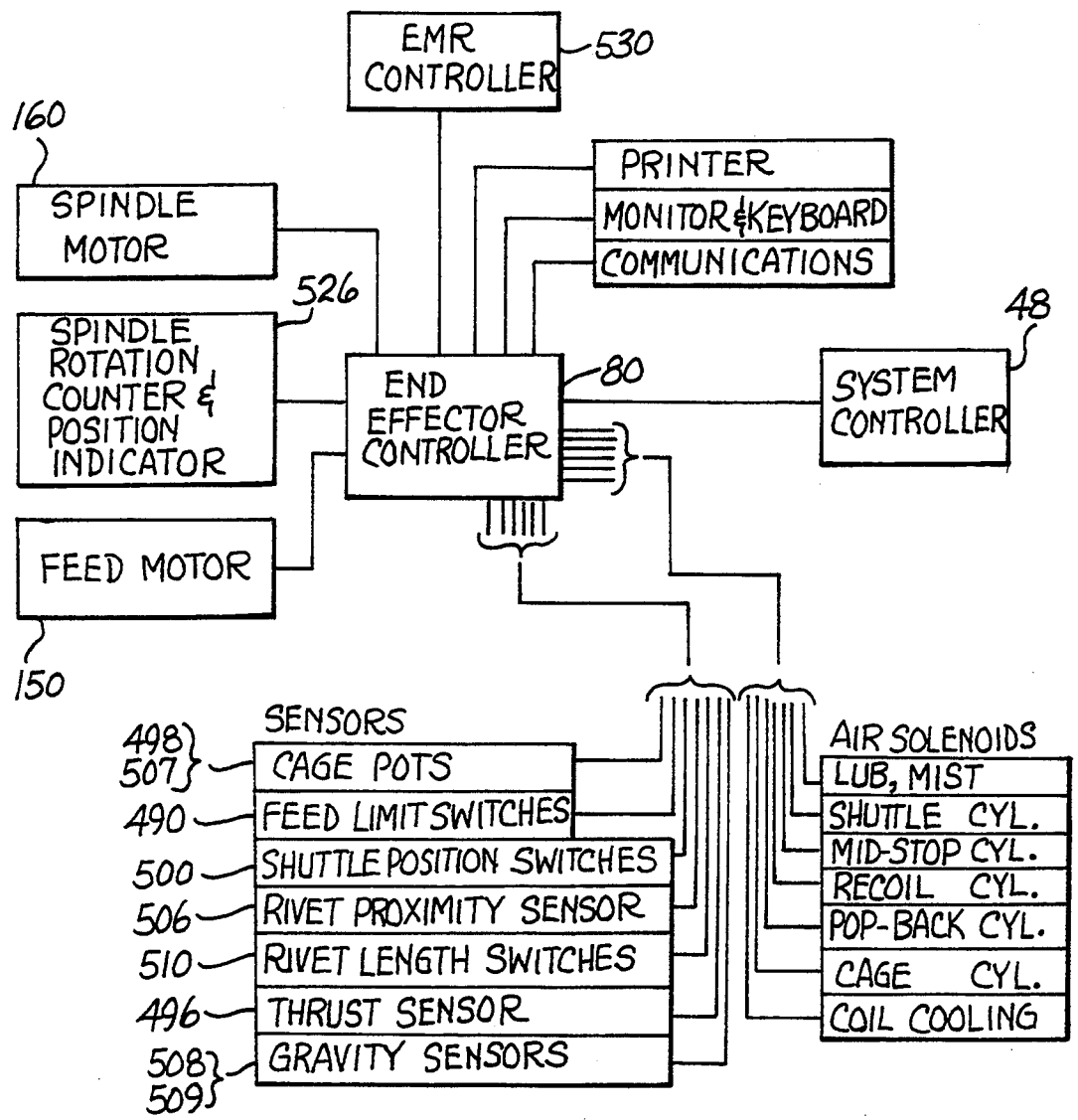
FIG. 34 is a schematic diagram of the end effector controller.

The end effector controller 80, shown schematically in FIG. 34, is a PC programmed to recognize start commands from the system controller 48 and the inputs from the sensors. It is programmed to control the sequence of operations described in the logic diagram of FIG. 32A-F and to provide signals to the electromagnetic riveter controller 530 to coordinate the actions of the electromagnetic riveter with the operation of the drill rivet machine.

Turning now to FIG. 35, the controller 530 for the electromagnetic riveter is shown having a logic unit 532 which is a programmable controller. The software in the controller permits the setting of the system parameters which include time delay, the voltage set point, and the capacitance of the two capacitor banks for power supplies of the two electromagnetic actuators. The capacitance adjustment is accomplished by an SCR switching system that connects to coil 210 of the electromagnetic actuator to the desired one or more capacitors in the capacitor bank, to achieve the desired capacitance within the range of capacitors in the capacitor bank.

The voltage set point, which can be individually set for each power supply, sets the voltage at which the capacitors are charged. The temperature algorithm in the logic unit computes the amount by which the voltage must be increased to account for the increased resistance of the coil 210 as it gets hotter. A thermocouple in the coil informs the logic unit 532 of the coil temperature, and the logic unit computes the voltage increment that must be added to the set voltage to account for the increase in resistance of the coil 210 that accompanies the increase in temperature, to ensure that the power which the coil can actually convert to energy in the magnetic field remains the same despite the temperature increase.

The delay is a time delay between the fire commands issued to the power supplies for the two electromagnetic actuators. By imposing a short delay in the fire command to the power supply on the drill rivet side, the electromagnetic actuator on the buck side unit can begin upsetting the rivet, using the rivet die and its electromagnetic actuator as a rivet bucking bar, before the rivet die 440 on the drill rivet side begins its force stroke on the headed side of the rivet. This delay allows the force exerted on the nose of the rivet to begin deforming the shank of the rivet at the nose end so the shank begins expanding to fill the hole in the workpiece at the lower or nose end of the workpiece. The rivet die 440, after the short time delay, then begins its power stroke and the force it exerts is concentrated on the head of the rivet, rather than being dissipated through the rivet head and into the workpiece through the countersunk hole. The force pulse of the rivet die 440 is thus effective to expand the shank of the rivet and then expand the head of the rivet to seal the head in the counterbore of the hole in the workpiece 34. Without the time delay there is a tendency for the force exerted by the rivet die 440 to be dissipated through the head of the rivet and into the workpiece so that the force exerted by the die 440 is less effective in upsetting the shank at the head of the rivet and in upsetting the head itself to seal the head in the counterbore. The time delay varies with the thickness of the rivet and the mass of the driver and the transducer, but a typical delay would be on the order of 100 to 400 microseconds. The best way we have found to determine the proper delay is to start with a delay of about 250 microseconds and vary that while setting rivets in a test panel. Inspection of the rivets will quickly reveal the optimum range, and then sectioning of the rivets in that range will disclose the best time delay for that workpiece and that rivet.

The voltage set point set into the logic unit 530 is based on the energy necessary to upset the rivet. It varies with the rivet material, length and thickness, but a typical voltage set point would be on the order of 300 volts. A capacitance of 0.028 farads charged to a voltage of 300 volts will deliver 2000–6000 joules of energy in a characteristic capacitor discharge curve shown in FIG. 36.

When using headed rivets, an electromagnetic rivet system which has equal current applied to the coils on both sides can dimple a thin panel because the force created by the actuator on the headed side is exerted on both the rivet shank and the rivet head in the countersink, and through the countersunk rivet head to the panel. The actuator in the electromagnetic riveter creates a force greater than the force required to yield the rivet shank, therefore the resisting force exerted by the rivet shank in opposition to the actuator is insufficient to resist the actuator force. The force balance at the countersink produces a net force that can yield the panel, creating a dimple.

Figure 36:
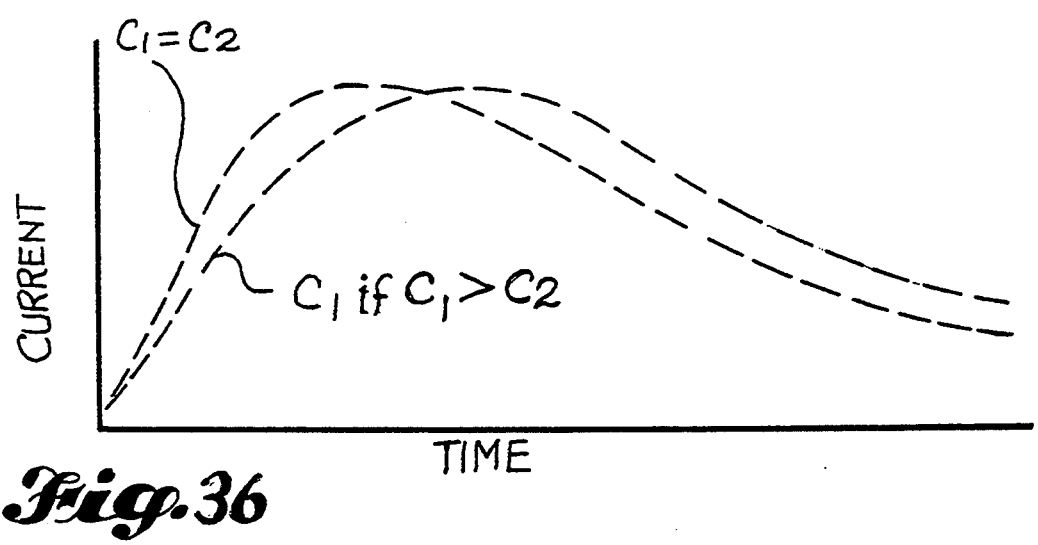
FIG. 36 is a graph showing the time distribution of current from the two capacitors through the coils of the electromagnetic actuators.

If the charging voltage to the capacitor for the head side actuator is turned down so that the panel is not yielded, then the overall current pulse becomes shorter in time as well as in amplitude, since for a given load the wave form characteristic shape is a function of capacitance only as shown in FIG. 36.

Dimpling occurs early in the waveform because of the different functions performed by the riveters on the two sides of the rivet. On the buck side, there is work done through the driver on both the actuator recoil mass and the rivet, but on the headed-side there is little work done on the rivet by comparison because the only deformation of the rivet at the headed side is of the shank under the head, and a slight deformation of the head of a Briles rivet. The total work done by the actuators on the recoil masses on both sides is approximately equivalent. Because of the greater work required to deform the rivet tail on the buck side, the buck side device needs more energy than the head side.

Figure 37:
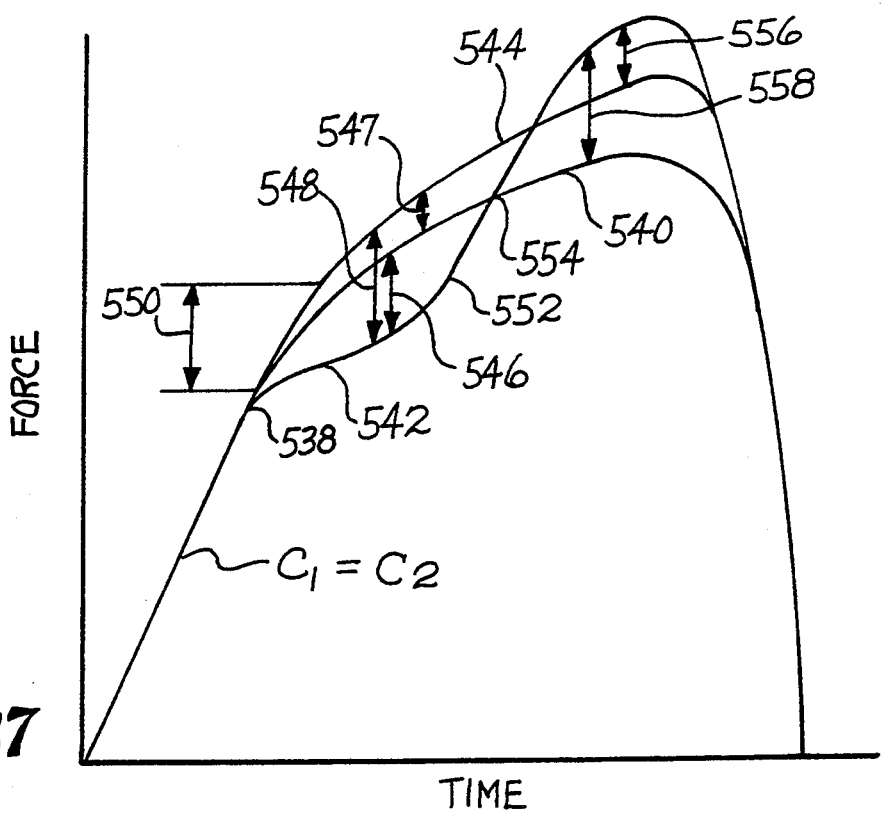
FIG. 37 is a graph showing the force exerted on the drivers and on the buck side of panel by the rivet when the capacitance and voltage are equal in the head and tail riveters.

As shown in FIG. 37, the force exerted by the transducers on the both headed side driver and the buck side driver are equal up until the point 538 when the rivet tail begins to yield. The force exerted on the buck side driver by its transducer, represented by the line 540, continues to increase, but the force, represented by the line 542, transmitted through the rivet on the panel levels off because the yield point of the rivet has been reached and further force can only increase the rate of rivet deformation. As the buckside driver moves to deform the tail of the rivet and form the rivet button, the buck side driver and transducer move away from the coil, thereby decreasing the coupling of the magnetic field between the coil and the transducer and producing less force on the buck side driver than on the head side driver for a given equal input current to the coils. This is represented in FIG. 37 by the arrow 547 between the diverging lines 540 (force on the buck side driver) and 544 (force on the headed side driver.) The movement of the buck side driver is stored as energy of momentum, represented by the arrow 546, which can produce force over time, whereas the headside driver moves only a (relatively) small amount, and therefore has minimal momentum to be dissipated over time. That is, the actuator repulsive force pulse is not extended over time by momentum reduced to work.

The force 542 exerted by the buck side driver through the rivet tail on the buck side of the panel, limited by the yield strength of the rivet tail, is less than the force 544 exerted by the headed side driver on the headed side of the panel directly through the rivet head in the countersink. This results in a force differential, represented by the arrow 548. If the force differential 548 between the force 542 on one side and the force 544 on the other side of the panel is greater than the force, arbitrarily illustrated as the arrow 550, needed to yield the panel, a dimple will result.

As the rivet tail is deformed, the rivet button grows and fills the rivet tail die. The greater area of rivet button will permit a transfer of more force by the buck side driver on the buck side of the panel through the rivet button, so that force 542 begins to increase, as represented by the greater slope of the line 542 at 552. The force exerted by the driver through the rivet button now increases sharply, and actually surpasses (at 554) the force exerted by the transducer on the buck side driver, because of the momentum energy which was stored in the moving buck side driver being transformed into work (represented by the arrow 558) as the driver slows down. Now a reversed differential force is exerted on the two sides of the panel, as represented by the arrow 556 and, if greater than the yield strength 550 of the panel, will create a reverse dimple, or pimple.

The slope at the beginning of the current/time waveform doesn't change much for small changes in voltage settings, with the load and the capacitance held constant. If the head side voltage is turned down sufficiently so that the panel does not yield, then the buck side force pulse is largely unopposed later in the waveform by the energy stored as momentum in the buck side driver which can push the rivet head out of the countersink and cause a gap under the rivet head, or cause a pimple. It is actually possible to dimple the panel at the beginning of the stroke, and then create a gap under the head at the end of the stroke.

By delaying the onset of the head side current, the force applied to the head side is also delayed, the intent being to allow the buck side force to have increased sufficiently to have partially deformed the tail of the rivet (by compressing it against the mass of the headside actuator) and developed sufficient momentum which could exert sufficient force on the partially formed button at the rivet tail to "back-up" the panel and prevent dimpling by the headside actuator when it fires. The head side voltage (hence current and force) would typically be lower as well, which shortens the pulse, but since the pulse on the head side was delayed, the forces later in the pulse are essentially balanced on each side.

A fine balance is required when using the delay method of preventing dimpling. Too much delay could cause a gap under the head if the following head-side pulse doesn't re-seat the head when the head side actuator fires. Too little delay would still allow a dimple. Too little head side voltage will prevent an inward dimple, but might produce an outward one, as well as a gap under the rivet head if the buck side force is unopposed in the later part of its force pulse. If all is balanced properly, a combination of delay and lower head side voltage will produce good results.

In the interest of expanding the "sweet spot" of the machine settings that produce a riveted panel, with no dimple, no head-gap, and the proper button diameter, it was realized that a higher capacitance on the headed side than on the buck side would reduce the slope of the current pulse, hence force pulse, to the driver on the headed side. This differential capacitance provides an additional variable parameter that will permit the force on the headed side to be reduced to close to that exerted by the buck side driver through the yielding rivet tail so that the panel will not be dimpled. This desirable result is accomplished by using a capacitor in the head side actuator power supply that is of higher capacitance than the buck side capacitor, and by setting the buck side voltage higher than the head side, since equal voltages would produce a much longer force pulse on the head side because of the higher capacitance on the head side. It is also necessary to account for the reduced coupling efficiency of the buck side (due to driver movement) at the start of the rivet deformation phase and for the dissipation of momentum of the buck side driver, later in the cycle.

Figure 38:
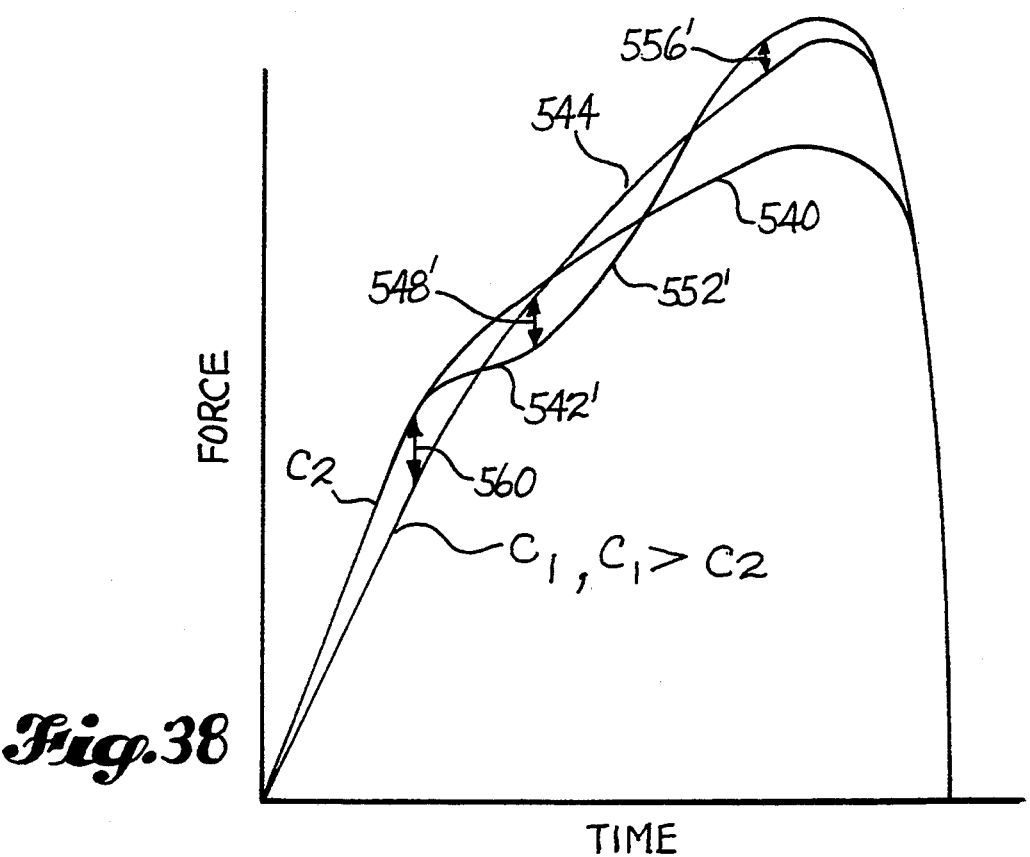
FIG. 38 is a graph showing the force exerted on the drivers and on the buck side of the panel by the rivet when the capacitance and the voltage are uneven in the head and tail riveters.

The capacitance $C_2$ in the buck side power supply needs to be substantially lower (at least about 25% lower) than the head side capacitance $C_1$ to achieve a significantly higher current pulse slope on the buck side, as shown in FIG. 38, which is necessary to prevent dimpling, since the buck side needs a higher current because it produces driver momentum as well as force to yield the rivet, and it has lower coupling efficiently.

The buck side voltage must be substantially higher than the head side to produce the much higher peak current required on the tail side. The higher voltage, combined with the lower capacitance extends the force pulse so that it approximately balances the force pulse of the head side.

As shown in FIG. 38, the lower capacitance C2 of the capacitor in the buck side power supply produces a steeper slope on the capacitor current discharge curve and the force/time slope, so a small reverse force differential 560 on the drivers develops early in the cycle, but it is less than the force 550 needed to dimple the panel. When the tail of the rivet begins to yield and cause the flattening of the force curve 542' representing the force exerted by the buck side driver through the yielding rivet tail on the buck side of the panel, the force differential 548' is significantly less than the corresponding force differential 548 when the capacitance and voltage were equal, as represented in FIG. 37. This reduces the possibility of dimpling the panel.

The greater capacitance C1 and lower voltage on the headed side results in a lower peak on the force curve which corresponds more closely to the peak force exerted by the buck side driver in discharging its momentum into the rivet and therethrough to the panel. The reverse differential force 556' illustrated in FIG. 38 is significantly less than the corresponding force differential 556 when the capacitance and voltage are equal, as represented in FIG. 37. This reduces the possibility of a pimple on the headed side of the panel.

Figure 39:
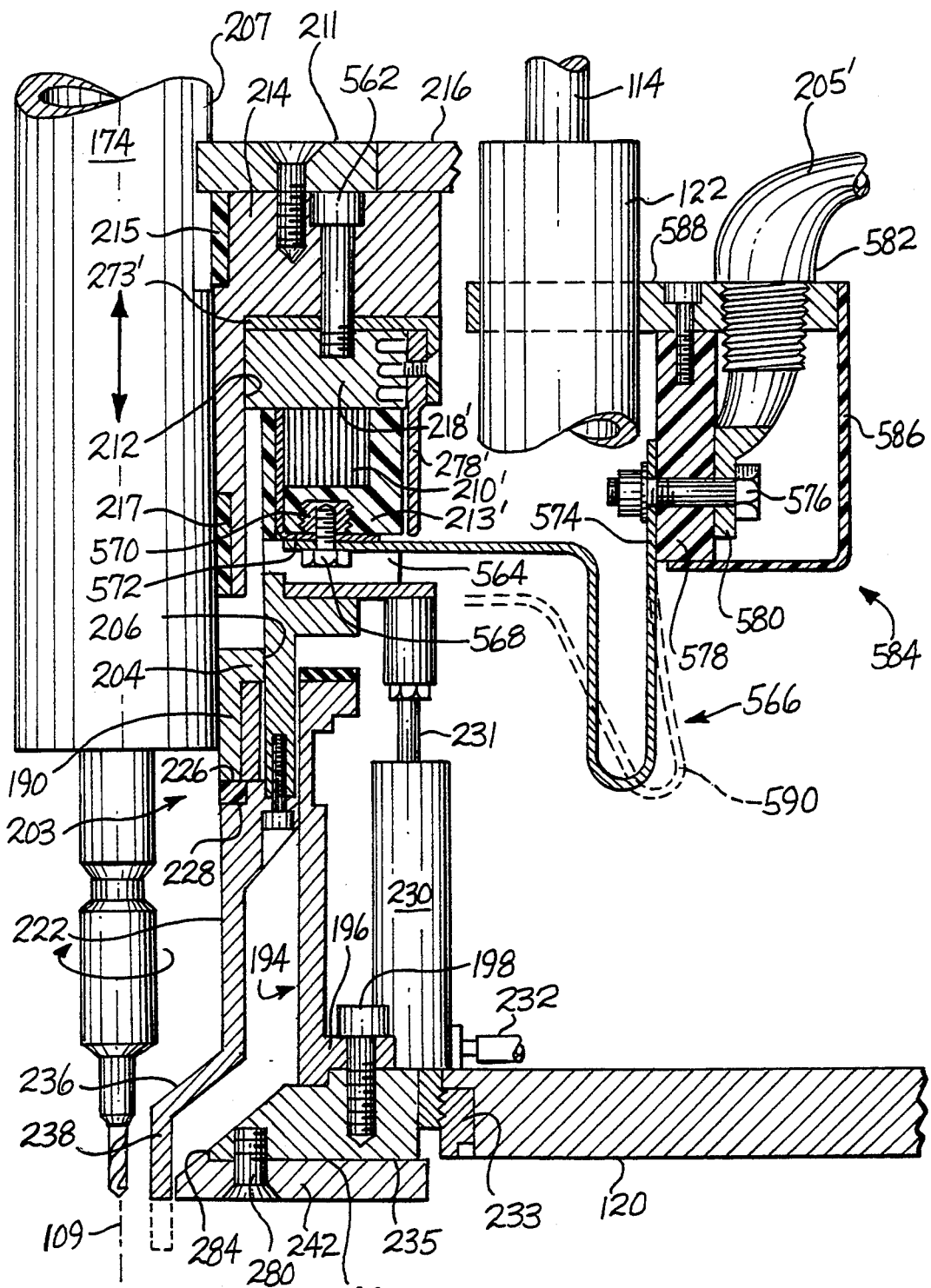
FIG. 39 is a sectional elevation of an alternative embodiment of the electromagnetic riveter of this invention.

Turning finally to FIG. 39, a second embodiment of an electromagnetic riveter is shown in an arrangement which is identical to the embodiment shown in FIG. 13, except for the electromagnetic actuator and the cable connection, which are different. The other elements of the device are the same and have been given the same reference numerals. The description of these same elements given in connection with FIG. 13 also applies to this embodiment of FIG. 39.

A transducer 218' in the form of a heavy copper plate identical to the transducer in FIG. 13 is fastened in the recess 212 in the recoil mass 214 by a screw 562. The transducer shroud 273' is positioned between the transducer 218' and the recoil mass 214. An annular coil shroud 278' is fastened to the transducer shroud 273' and depends therefrom to cover the gap between the transducer 218' and the coil 210' when the device is in operation.

The coil 210' is potted in a potting compound 213' and is fastened to an insulating support ring 564 of epoxy impregnated fiberglass by screws (not shown.) A flexible lead 566 of berillium copper, for example, is connected in a notch in the support ring 564 by a screw 568 to a threaded insert 570 embedded in the potting compound 213'. The inner turn of the coil 210' is bent down and under the coil at 572 and is clamped between the inner end of the flexible lead 566 and the threaded insert 570 to provide a hard electrical contact between the coil and the lead 566.

The lead 566 terminates in a vertically disposed section 574 which is fastened by a screw 576 to an insulating terminal block 578. The screw 576 also secures a conductor 580 of a power cable 205' to the terminal block to establish a hard electrical connection between the power cable conductor 580 and the flexible lead 566.

The power cable 205' is connected by a conventional cable connector 582 to a stationary cable terminal box 584 which is clamped to one of the cage cylinders 122. An insulating cover 586 is secured to the top 588 of the terminal box 586 and the terminal block 578 to guard against accidental contact with the conductor 580. The flexible lead 566 is covered with an insulating coating except for its ends where it must make electrical contact with the coil turn 572 and the screw 576.

In operation of the embodiment shown in FIG. 39, after the rivet is installed and ready to be upset, the pop-back cylinder 230 is depressurized and the electromagnetic riveter is pulled down by the recoil cylinders 246 (not shown in FIG. 39.). The lower cylindrical portion 238 of the driver 203 is pulled down against the rivet die 440, compressing the 448 spring and pushing the nose 450 of the die 440 into contact with the head of the rivet. The vertical travel of the coil 210' causes the flexible lead 566 to flex down and outward approximately to the position shown at 590 in the dotted lines, resulting in very little concentration of the bending stresses at any particular spot in the flexible lead, so the lead life will not be prematurely shortened by fatigue failure.

The electromagnetic actuator receives a current pulse from the power cable 205' at the stationary terminal box 584 and conducts the current through the flexible lead 566 to the coil 210'. The current flows through the coil and out through a similar flexible lead (not shown) to the neutral conductor in the power cable.

The current pulse in the coil generates a rapidly increasing magnetic field which is coupled to the abutting transducer. The rising magnetic field in the transducer generates eddy currents which in turn generate a magnetic field in opposition to the coil field. The opposing magnetic fields in the coil 210' and the transducer 218' result in a strong repulsive force between the coil 210' and the transducer 218'. The force on the coil is exerted through the coil 210', the support ring 564, the driver 203 and the die 440 to the rivet, all of which are in contact in series, so the force on the coil is transferred through a hard mechanical path to the rivet. The rivet head deforms very little so the coil moves less that about $\frac{1}{8}$ inch during the power stroke. This motion is easily accommodated by the flexing of the flexible lead 566.

The upper half of the electromagnetic actuator, including the transducer 218' the recoil mass 214 and the support plate 216 are repelled upwardly, guided by the key 211 running in the keyway 207 in the quill 174. The recoiling actuator compresses the gas in the recoil cylinder 246 (shown in FIG. 13) to store the recoil energy which, at the end of the recoil stroke, is released to return the actuator to its original position, at a gradual speed governed by the damping cylinder 262.

The short stroke of the coil in the embodiment shown in FIG. 39 enables the use of the flexible lead 566 between the coil 210' and the stationary terminal box 584. It is of considerable advantage to be able to connect the power cable 205' to a stationary terminal box because the cable need not be made to withstand the whipping motion it experiences when attached to the coil 210 of the embodiment of FIG. 13, which recoils for the full length of the recoil stroke. Since the recoil stroke is much longer than the power stroke, and since the motion of the recoiling components is sudden and violent, the power cable 205 in the embodiment of FIG. 13 must be reinforced and strengthened at its connection to the coil to give it the service life that a production machine designed for continuous service over many years in a factory must have. This is not a concern in the embodiment of FIG. 39 and the cable 205' can be an ordinary high power cable attached to the terminal box 584 with a conventional connector 582.

Obviously, numerous modifications and variations of the preferred embodiment disclosed herein will occur to those skilled in the art. Accordingly, it is expressly to be understood that these modifications and variations, and the equivalents thereof, may be practiced while remaining within the spirit and scope of this invention, as defined in the following claims:

I claim:

1. A method of changing a traveling rivet's direction of travel in a small radius curve, comprising:

sending a rivet into an inlet of a curved chute having an inwardly facing peripheral wall, and propelling said rivet through said chute with sufficient velocity to hold said rivet in contact with said peripheral wall entirely around said peripheral wall;

receiving said rivet at an exit end of said curved chute in a straight guide tube connected to said curved chute at said exit end thereof, and guiding said rivet into said guide tube with an ear of said guide tube which extends into said chute, said ear having an outwardly flaring surface which tapers in to merge smoothly with a passage through said guide tube; and straightening and stabilizing the travel of said rivet along and approximately aligned with the axis of said guide tube by passing said rivet through said guide tube for a distance at least 90% of the length of said rivet.

2. The method defined in claim 1, further comprising:
holding said rivet in a stationary position in a staging tube prior to sending said rivet into said curved chute;
whereby the starting velocity of said rivet when it is sent into said inlet of said curved chute is zero so that the velocity in said chute is slow enough to maintain said rivet in a stable mode of travel.

3. The method defined in claim 1, further comprising:
surrounding said rivet at the exit end of said guide tube with an annular curtain of air flowing in the direction of said rivet travel, and directing said annular curtain of air radially inward toward said axis to stabilize and center said rivet in its travel from said guide tube toward a hole in a workpiece located axially aligned with said guide tube.

4. The method defined in claim 3, further comprising:
positioning a pressure foot having a tapered hole therethrough in alignment with said guide tube, said tapered hole in said pressure foot also being aligned with said hole in said workpiece;
pressing a pressure foot against said workpiece to provide a continuous funnel shaped surface contiguous with said workpiece to funnel said annular air curtain radially inwardly toward said axis.

5. The method defined in claim 4, further comprising:
applying suction to the end of said hole in said workpiece on the side thereof opposite to the side on which said pressure foot is pressed;
whereby said annular air curtain will be drawn inward and downward into said hole to militate for accurate feeding of said rivet into said hole of said workpiece.

6. A method as defined in claim 1, wherein:
said curved chute is an open sided slot in a rivet guide shoe.

7. A method of guiding a rivet along a path of motion around a curve and straight into a rivet hole in a workpiece, comprising:
propelling said rivet into a curved slot, having a peripheral curved arched wall, with a velocity sufficient to hold said rivet against said wall all the way around said slot with centrifugal force;
guiding said rivet into a guide tube having a straight axis and a straight inside wall which is tangent to and continuous with said peripheral wall;
straightening said path of motion of said rivet in said guide tube along said inside wall; and
guiding said rivet with an annular air curtain into said rivet hole.

8. A method as defined in claim 7, wherein:
said curved slot is an open sided slot in a rivet guide shoe for simplicity of manufacturing.

9. A method as defined in claim 8, wherein said guiding step includes:
extending an ear of said guide tube into said chute, said ear having an inside curved surface to form a tapering surface in contact with a portion of said peripheral wall to smoothly guide said rivet into said tube.

10. A method as defined in claim 7, further comprising:
holding said rivet in a stationary position in a staging tube prior to sending said rivet into said curved chute;
accelerating said rivet from zero velocity to a velocity in said chute that is slow enough to maintain said rivet in a stable mode of travel around said chute and into said guide tube.

11. The method defined in claim 7, wherein said guiding said rivet with an annular curtain of air includes:
surrounding said rivet at an exit end of said guide tube with an annular curtain of air flowing in the direction of said rivet travel and radially inward toward said axis to stabilize and center said rivet in its travel from said guide tube toward a hole in a workpiece located axially aligned with said guide tube.

12. The method defined in claim 11, further comprising:
positioning a pressure foot having a tapered hole therethrough in alignment with said guide tube, said tapered hole in said pressure foot also being aligned with said hole in said workpiece;
pressing said pressure foot against said workpiece to provide a continuous funnel shaped surface contiguous with said workpiece to funnel said annular air curtain radially inwardly toward said axis.

13. The method defined in claim 12, further comprising:
applying suction to the end of said hole in said workpiece on the side thereof opposite to the side on which said pressure foot is pressed;
whereby said annular air curtain will be drawn inward and downward into said hole to militate for accurate feeding of said rivet into said hole.

* * * * *